Nov. 27, 1934.     B. N. MORRIS     1,982,394
SHAFT ROTATING MEANS FOR INTERNAL COMBUSTION ENGINES
Filed May 23, 1933     25 Sheets-Sheet 2

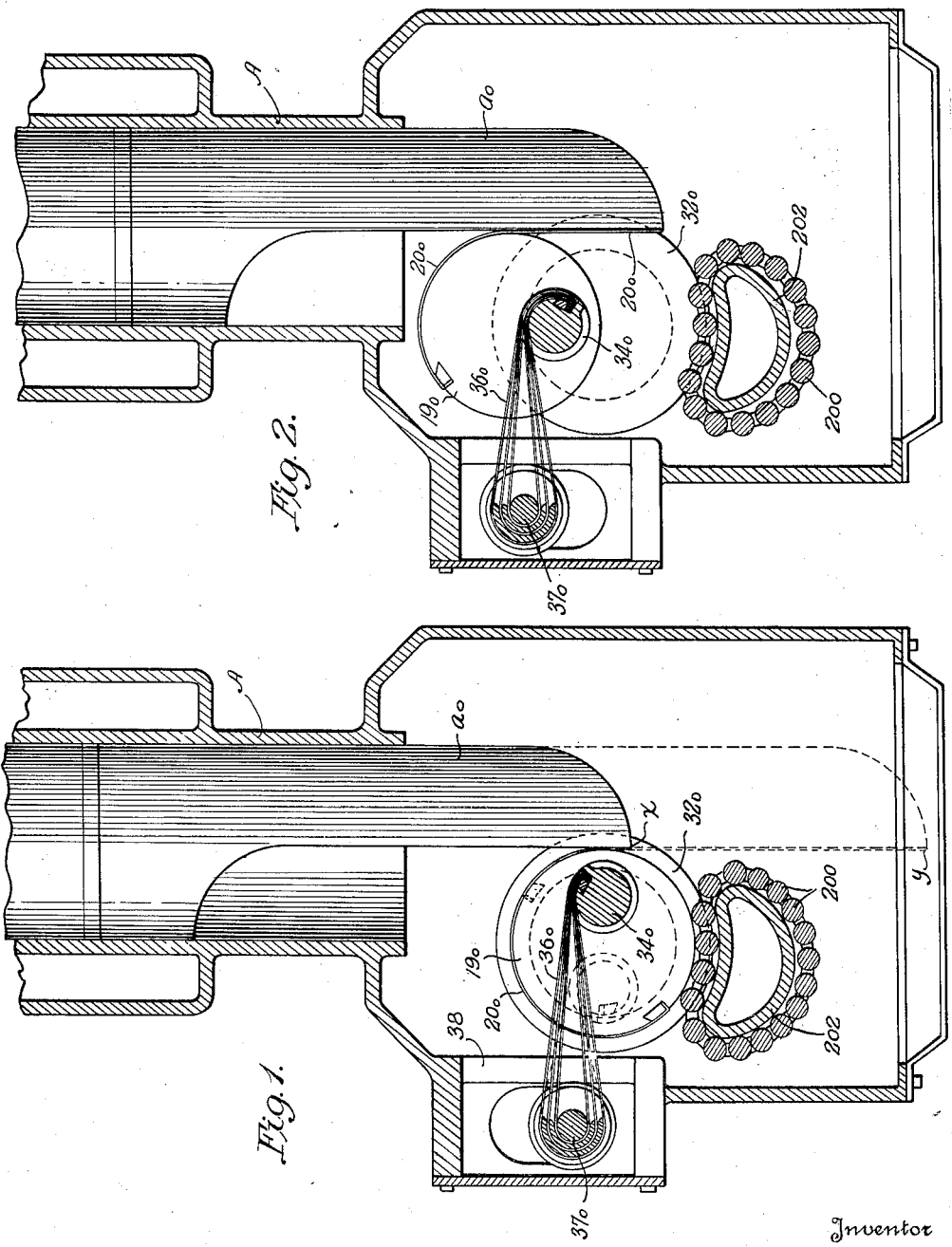

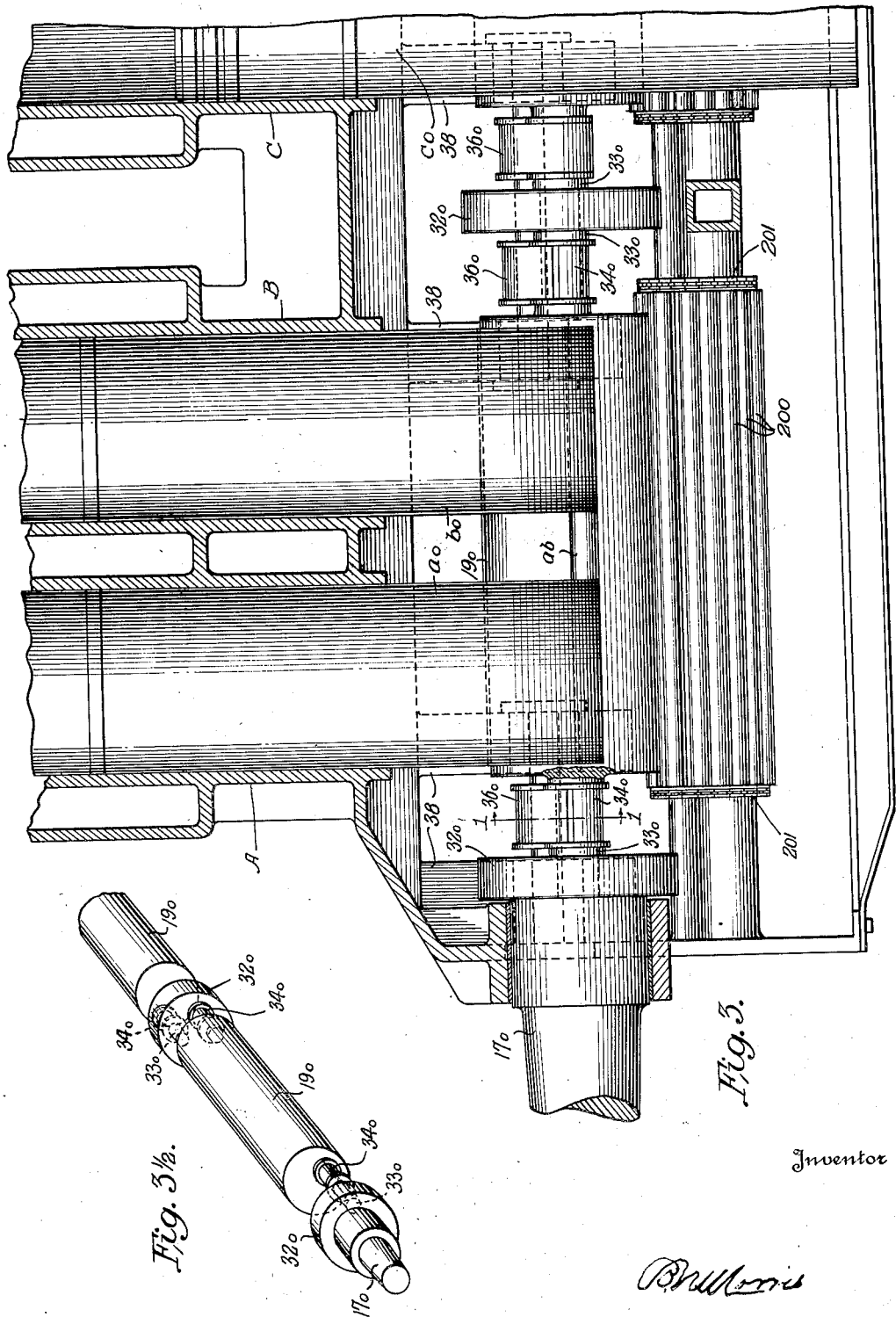

Nov. 27, 1934.  B. N. MORRIS  1,982,394
SHAFT ROTATING MEANS FOR INTERNAL COMBUSTION ENGINES
Filed May 23, 1933  25 Sheets-Sheet 4

Inventor
B. N. Morris

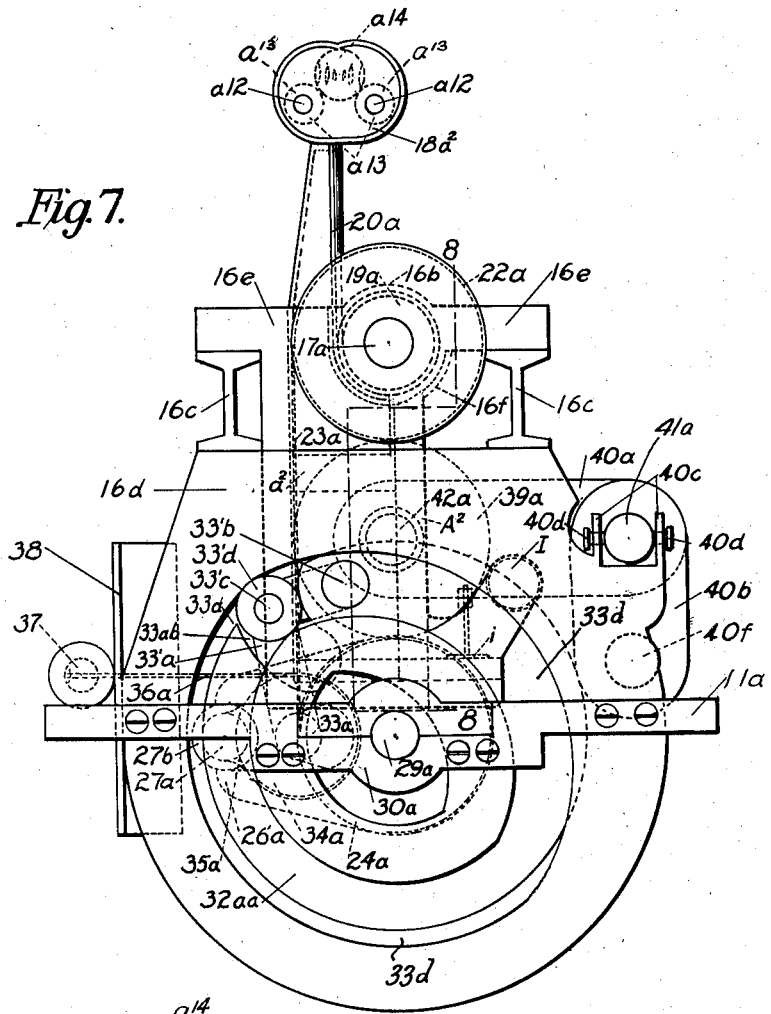
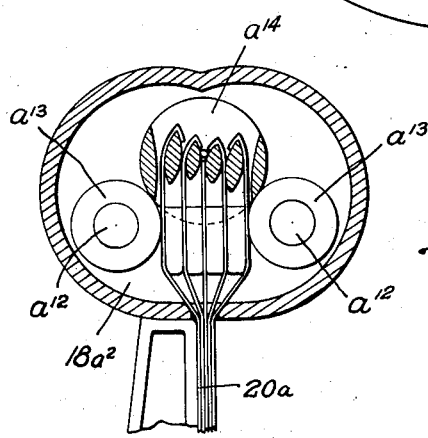

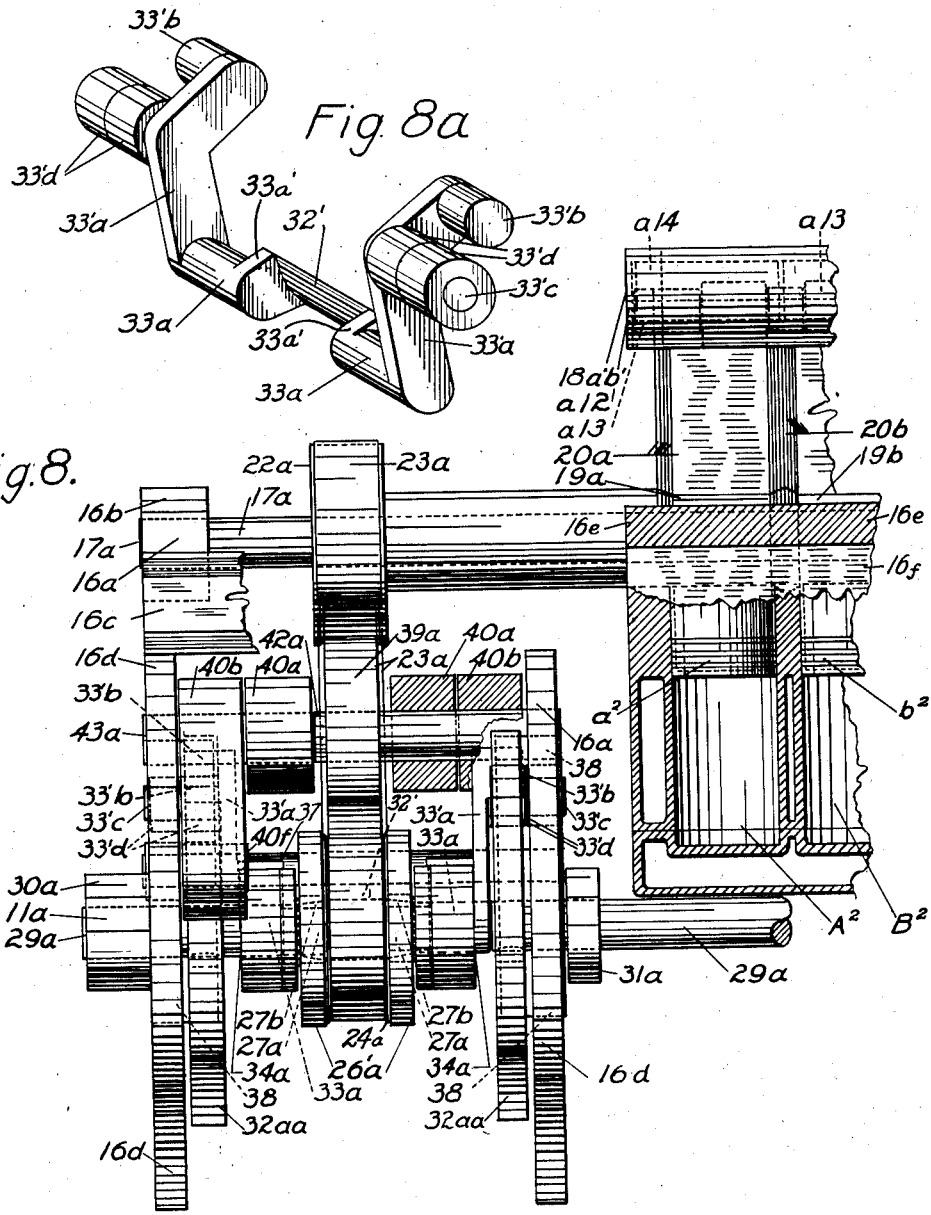

Nov. 27, 1934.  B. N. MORRIS  1,982,394
SHAFT ROTATING MEANS FOR INTERNAL COMBUSTION ENGINES
Filed May 23, 1933    25 Sheets-Sheet 9

Inventor

Nov. 27, 1934.　　　B. N. MORRIS　　　1,982,394
SHAFT ROTATING MEANS FOR INTERNAL COMBUSTION ENGINES
Filed May 23, 1933　　25 Sheets-Sheet 10

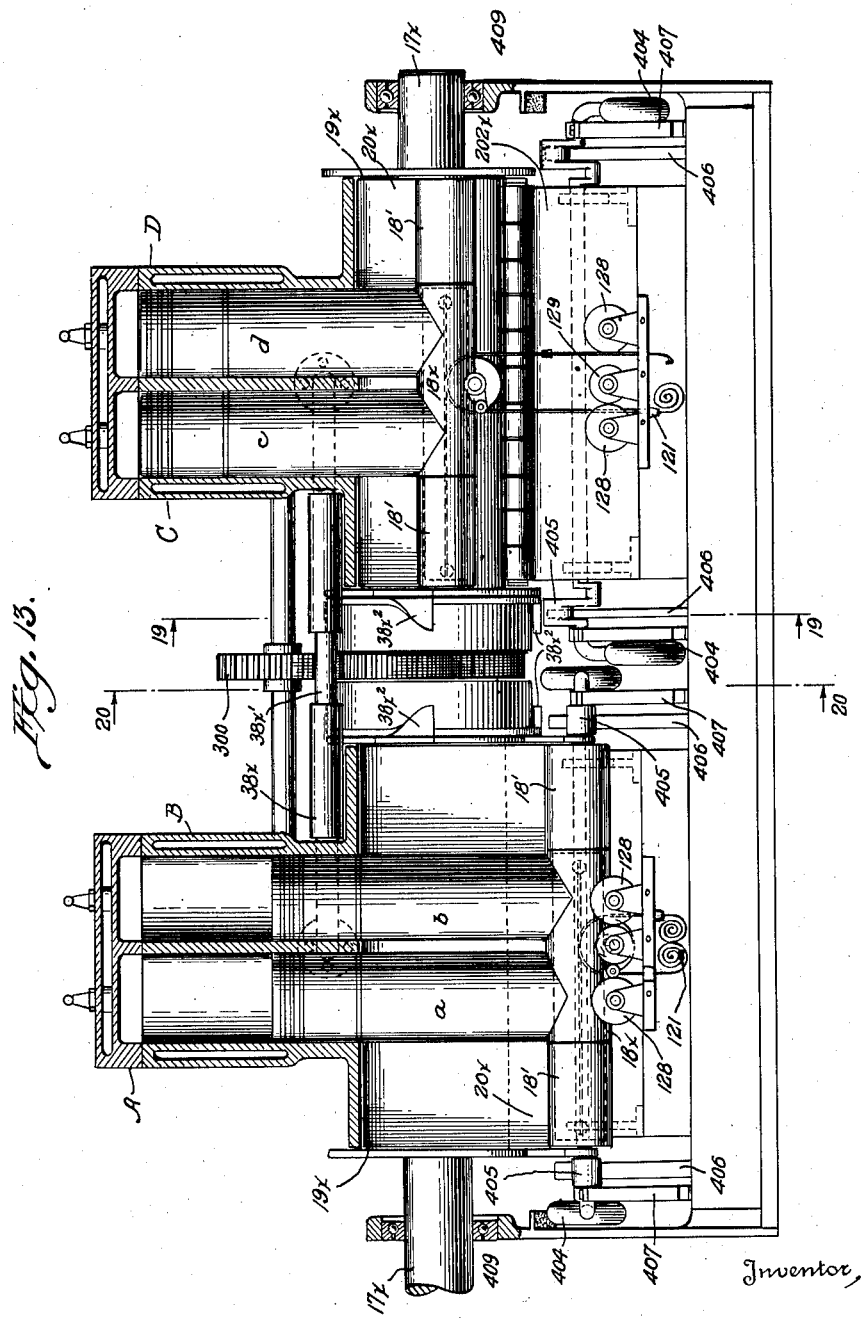

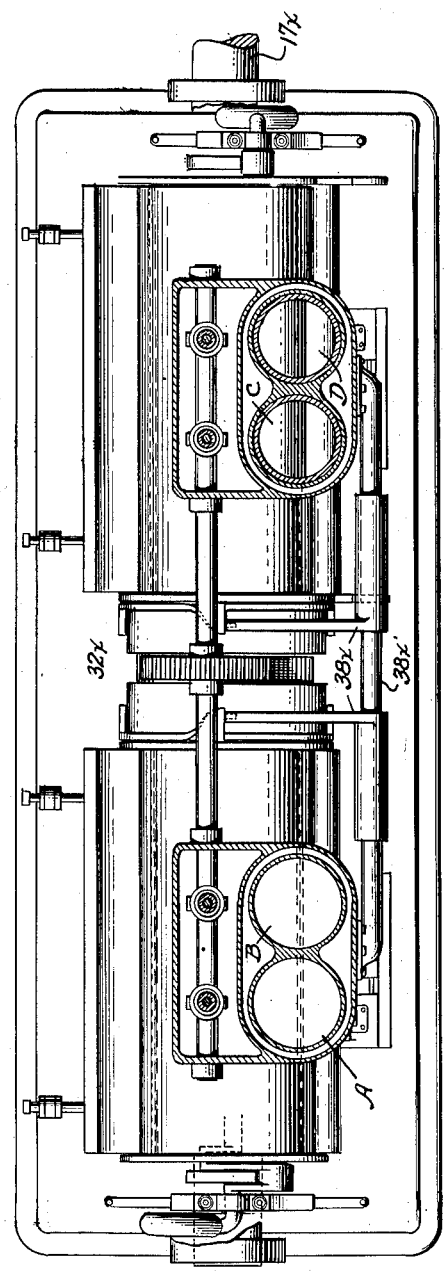
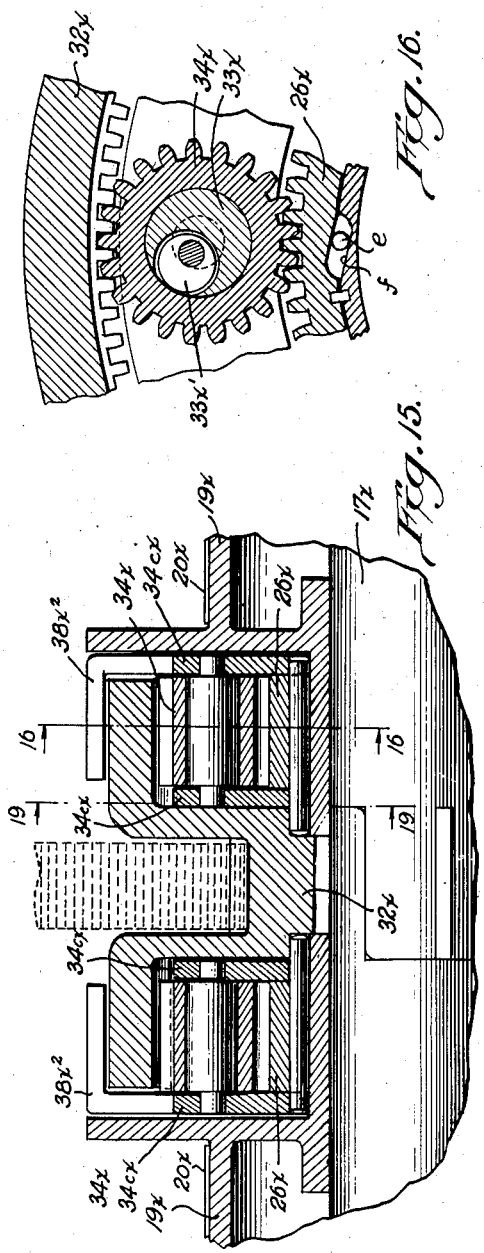

Nov. 27, 1934.  B. N. MORRIS  1,982,394
SHAFT ROTATING MEANS FOR INTERNAL COMBUSTION ENGINES
Filed May 23, 1933  25 Sheets-Sheet 14
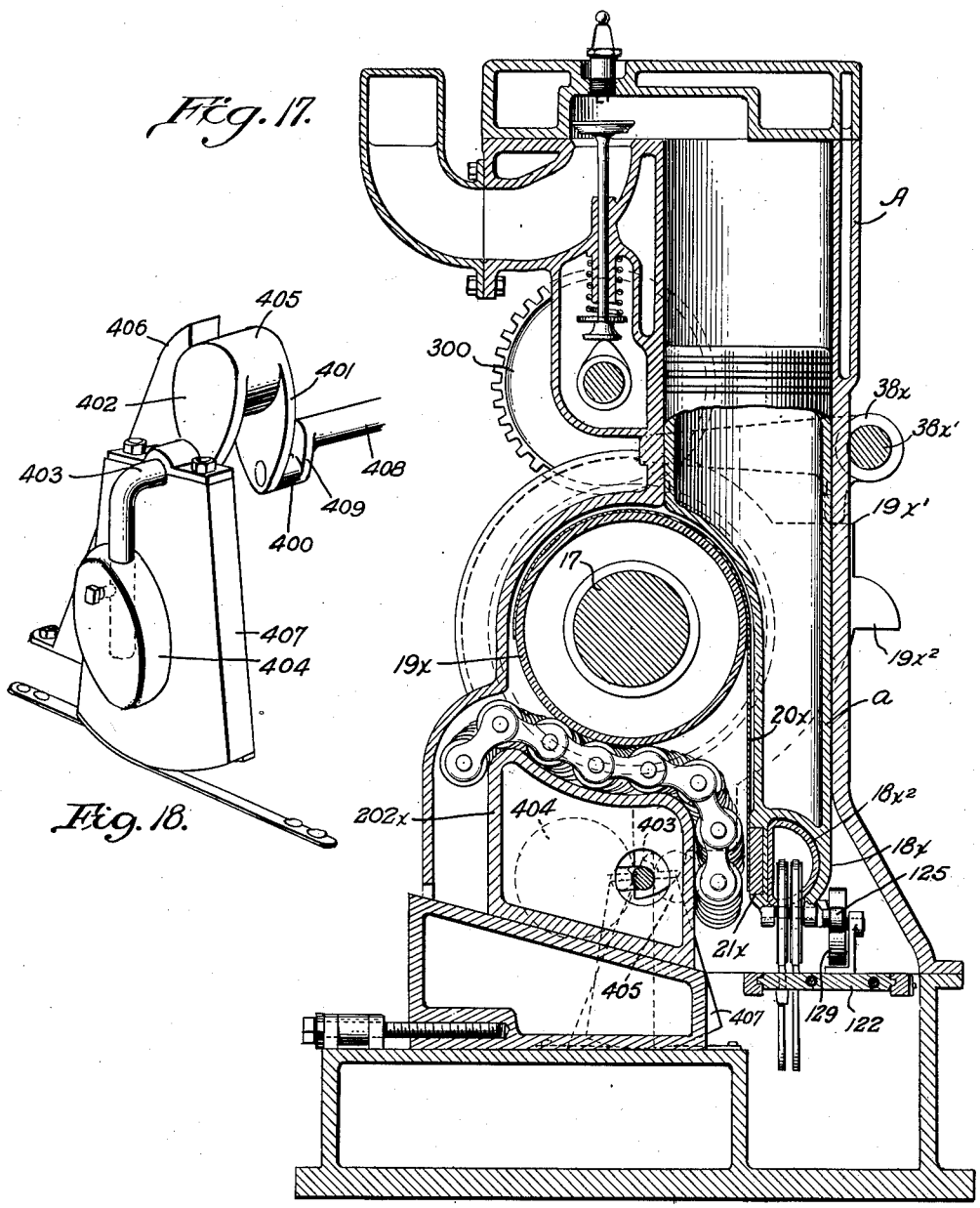

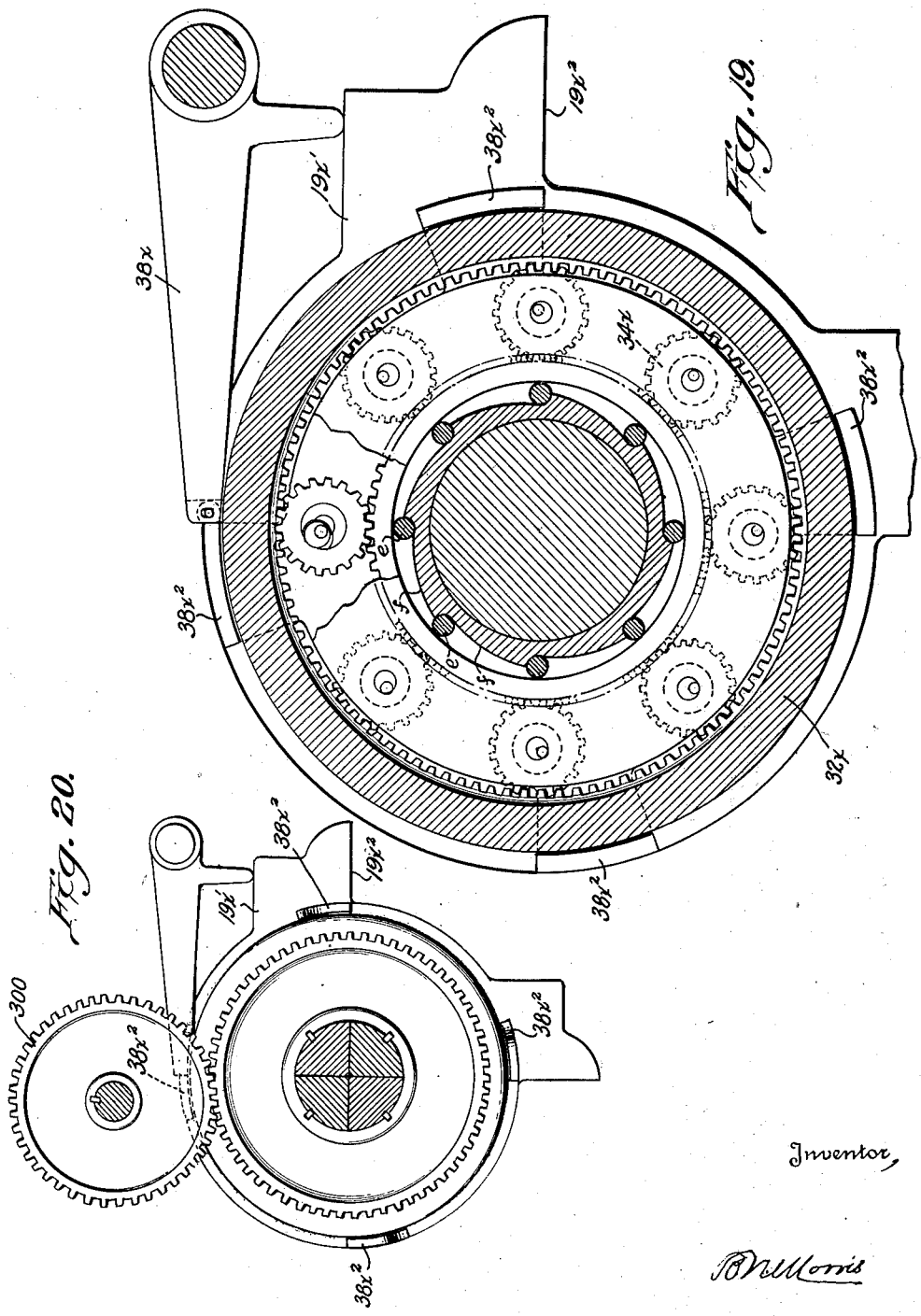

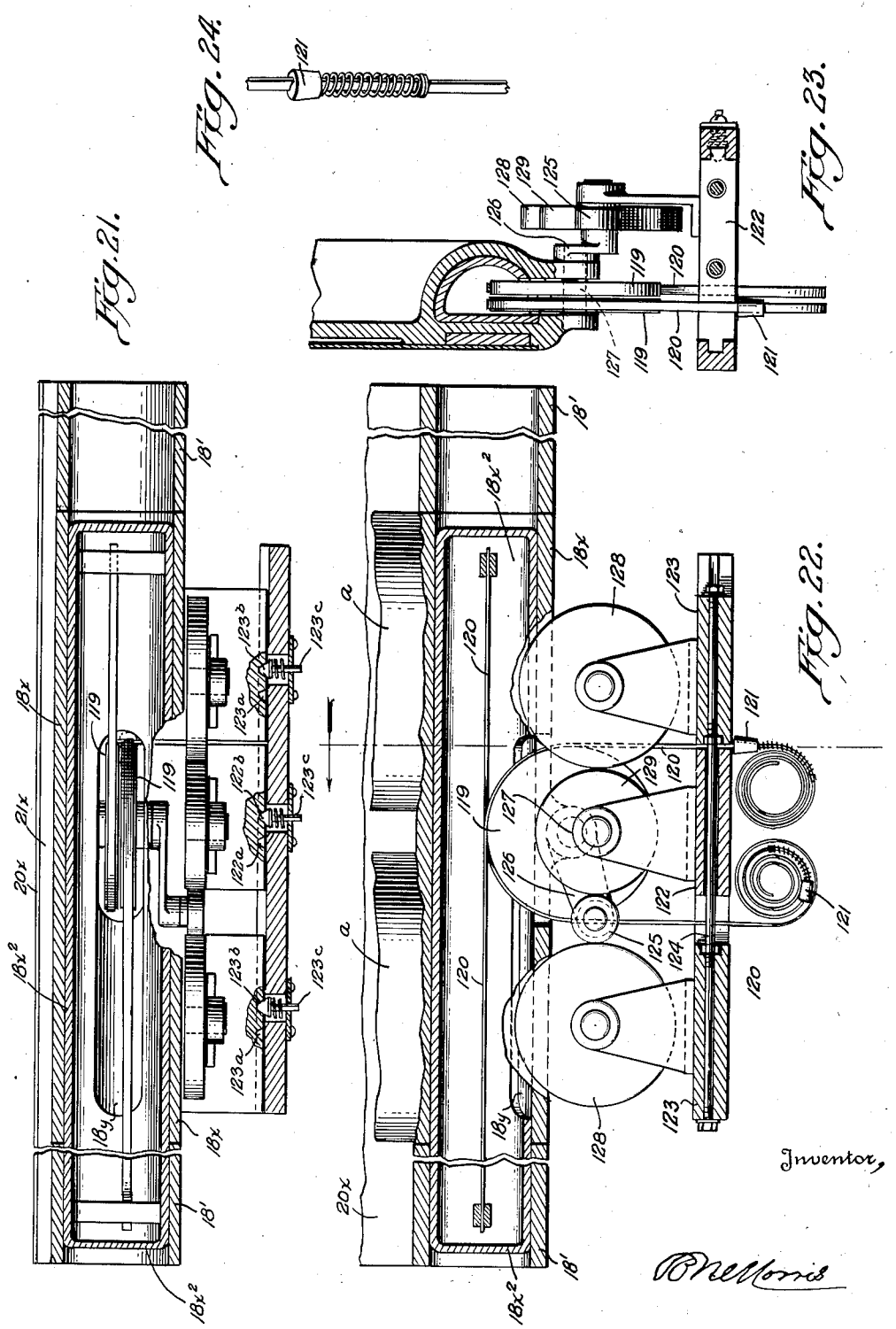

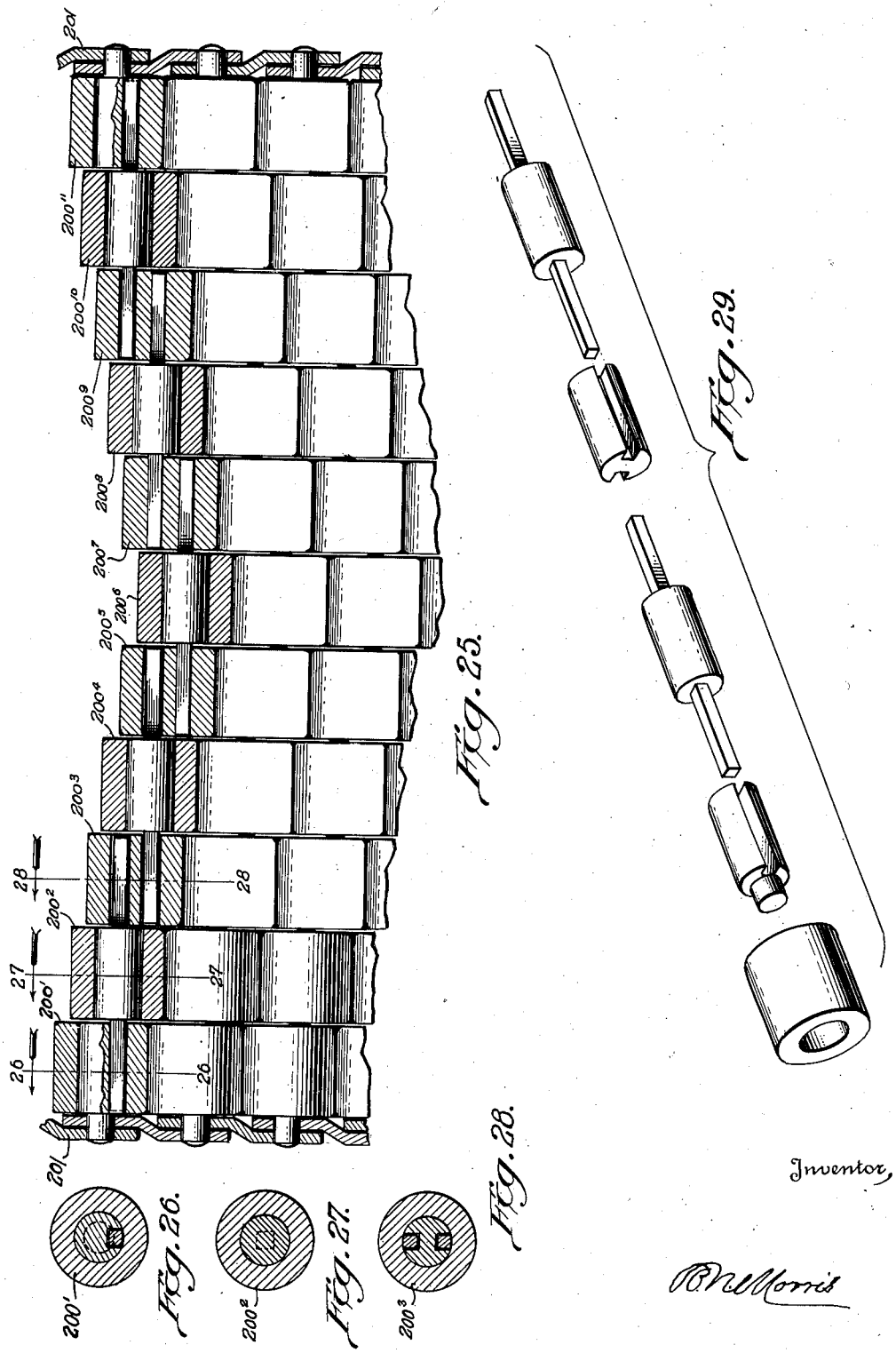

Nov. 27, 1934.        B. N. MORRIS        1,982,394
SHAFT ROTATING MEANS FOR INTERNAL COMBUSTION ENGINES
Filed May 23, 1933    25 Sheets-Sheet 18
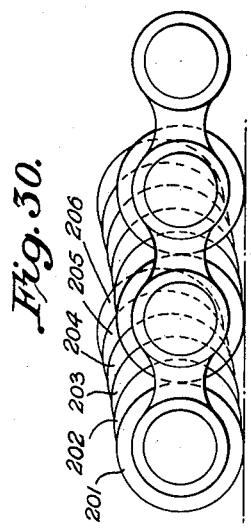
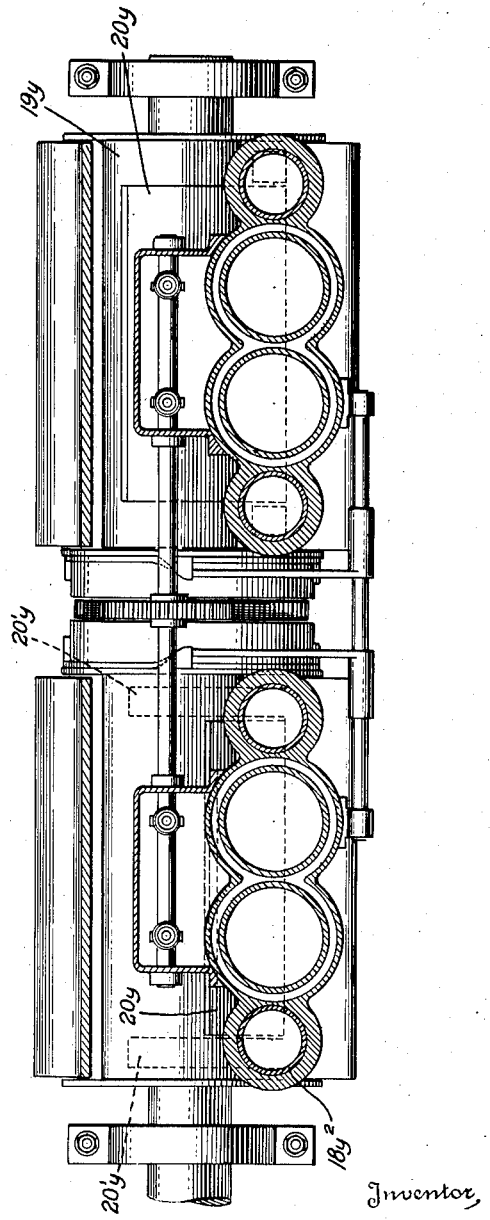

Nov. 27, 1934.   B. N. MORRIS   1,982,394
SHAFT ROTATING MEANS FOR INTERNAL COMBUSTION ENGINES
Filed May 23, 1933   25 Sheets-Sheet 19

Inventor,
B. N. Morris

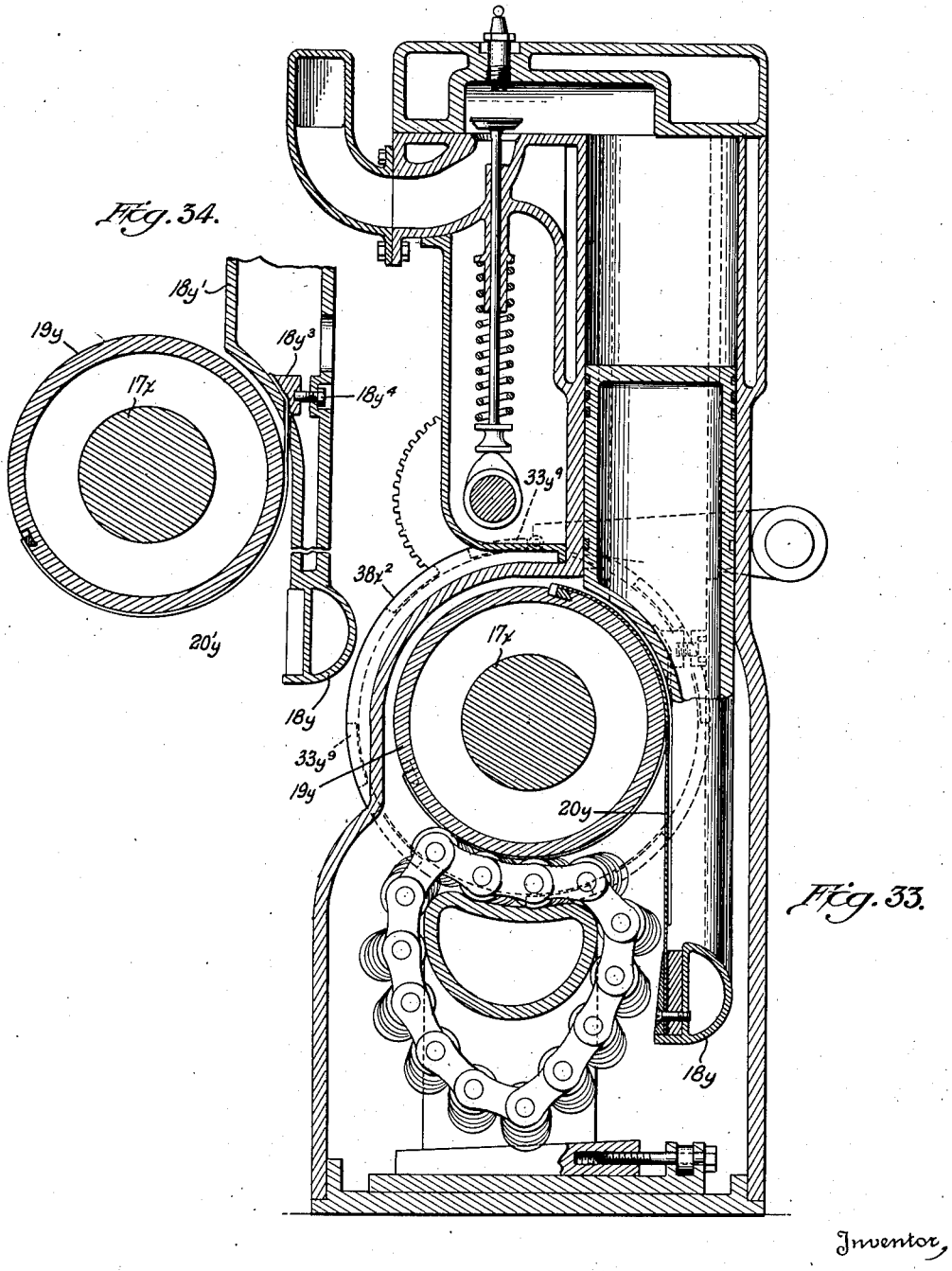

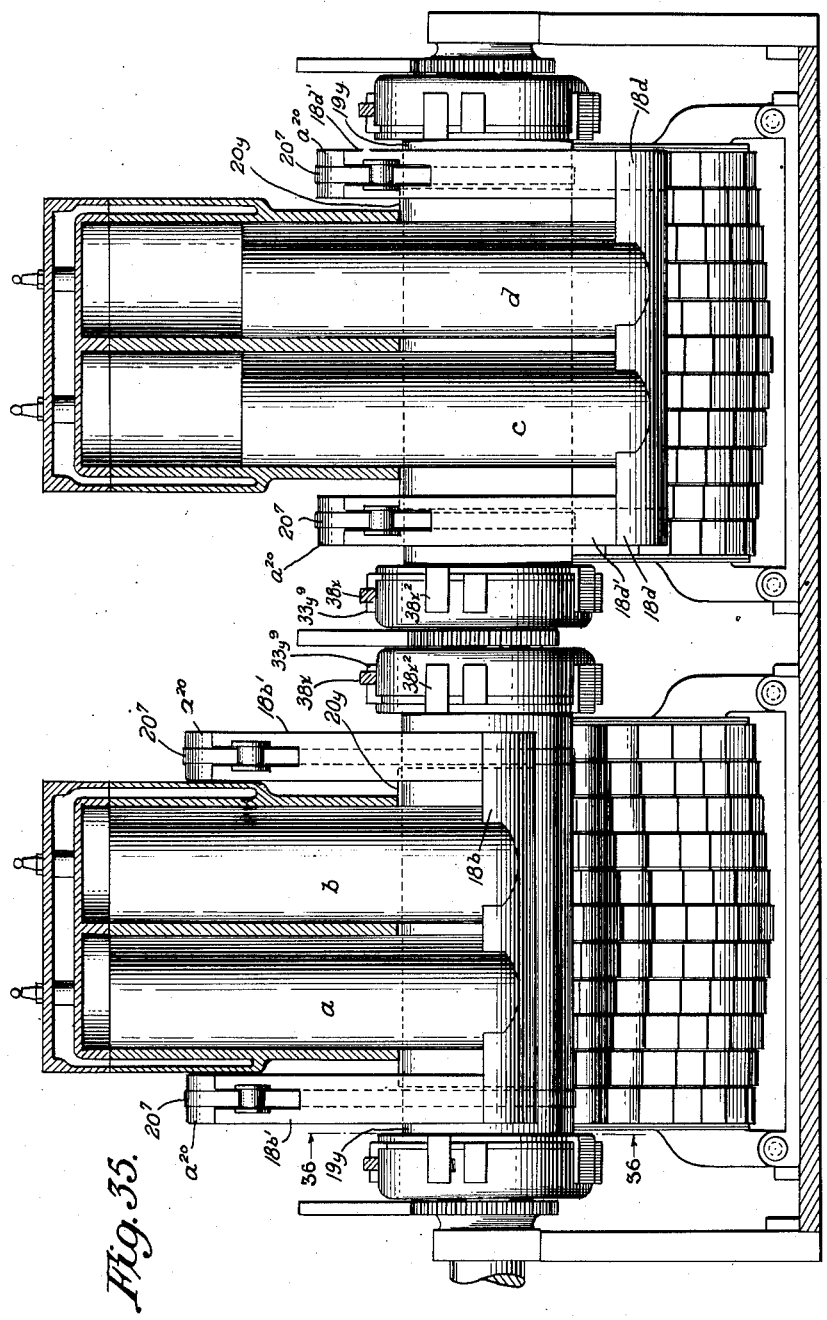

Nov. 27, 1934.  B. N. MORRIS  1,982,394
SHAFT ROTATING MEANS FOR INTERNAL COMBUSTION ENGINES
Filed May 23, 1933  25 Sheets-Sheet 22
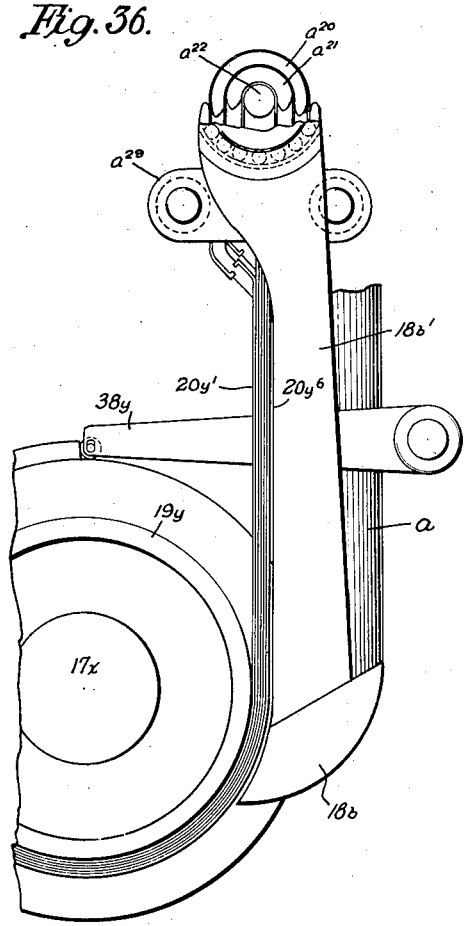
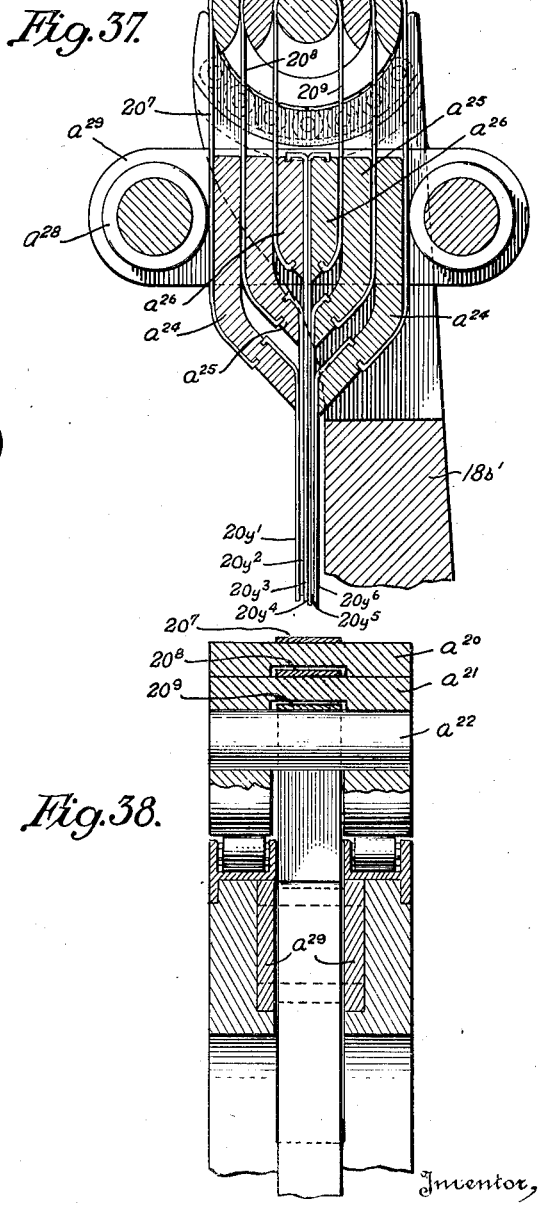

Nov. 27, 1934.   B. N. MORRIS   1,982,394
SHAFT ROTATING MEANS FOR INTERNAL COMBUSTION ENGINES
Filed May 23, 1933   25 Sheets-Sheet 23
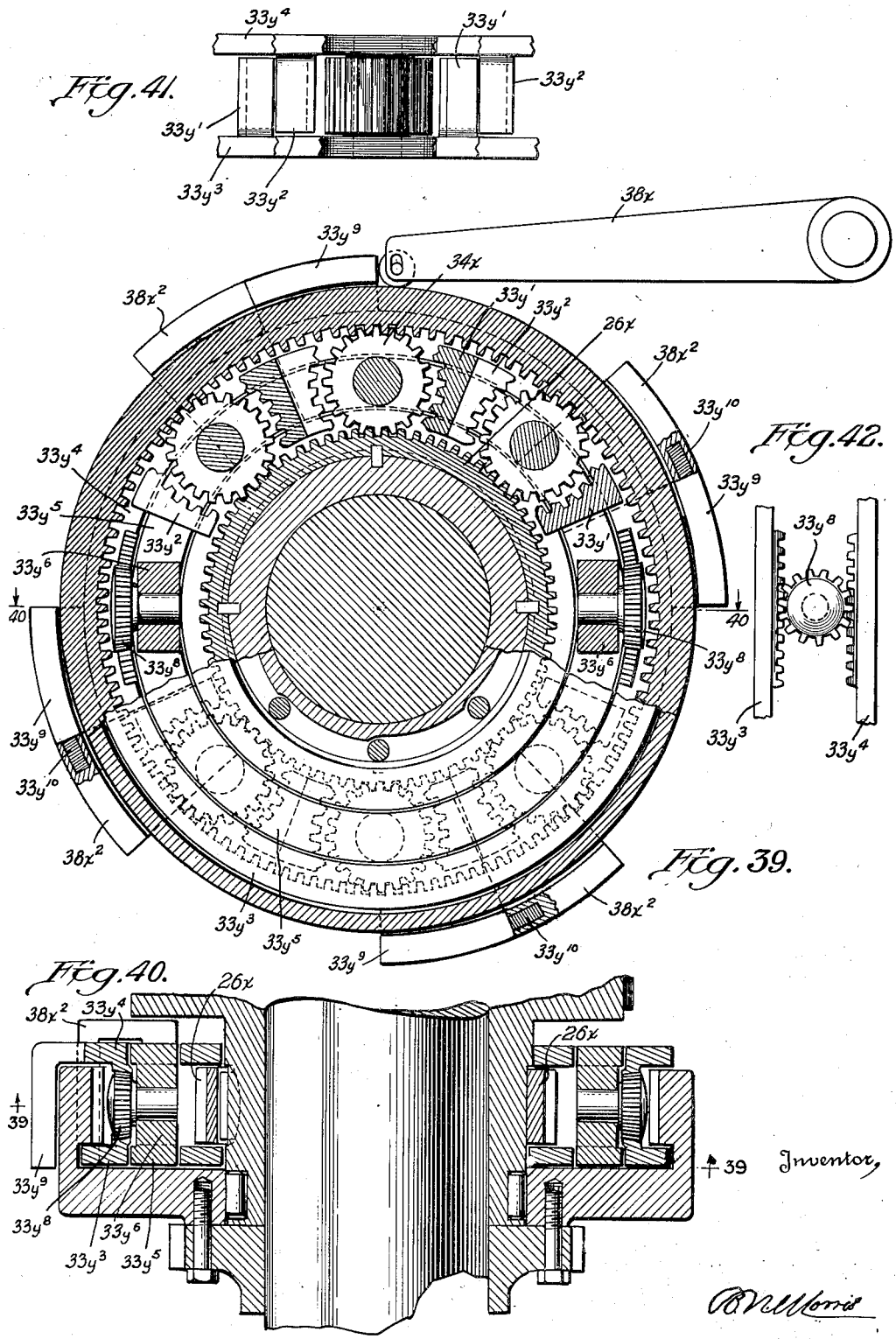

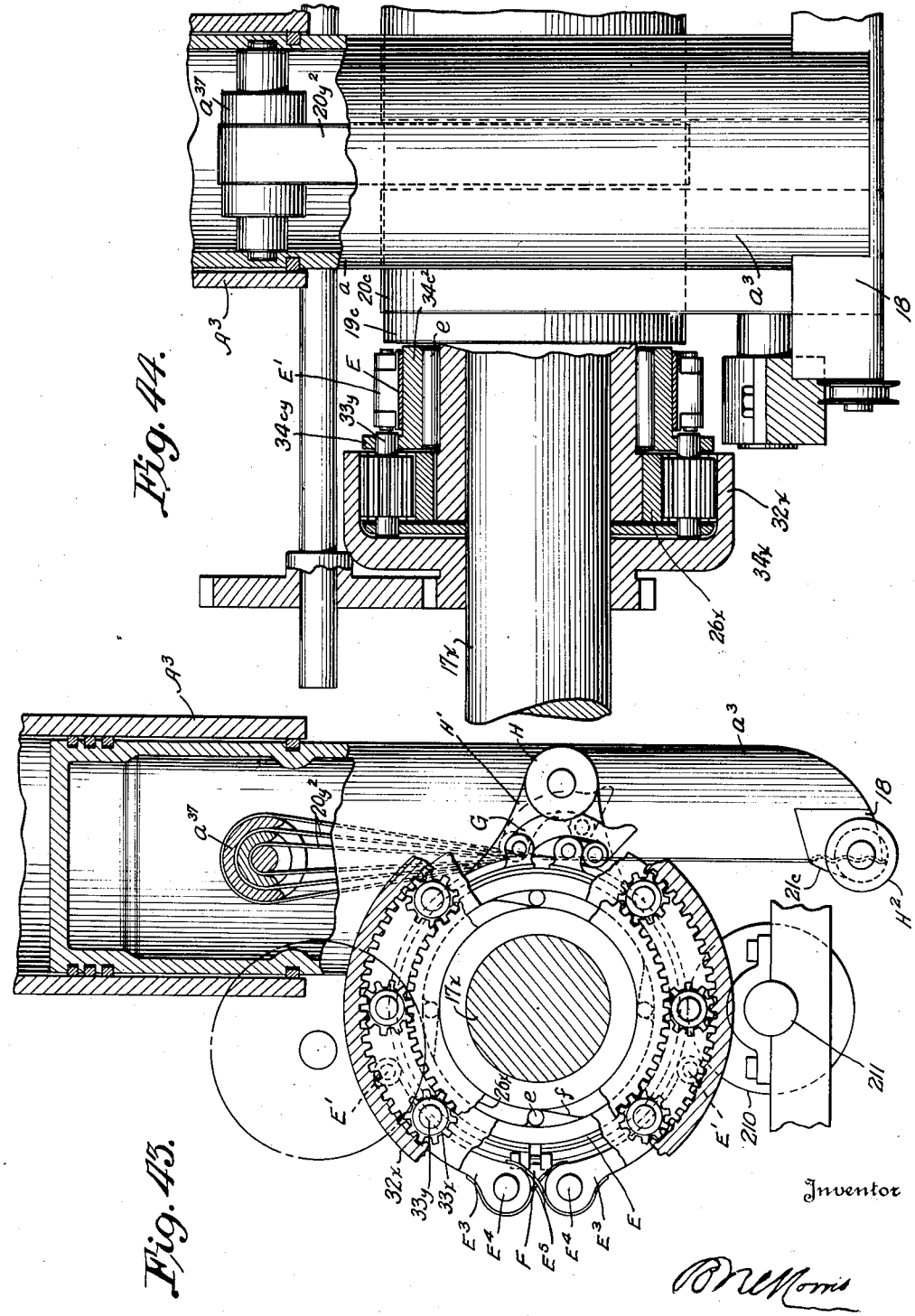

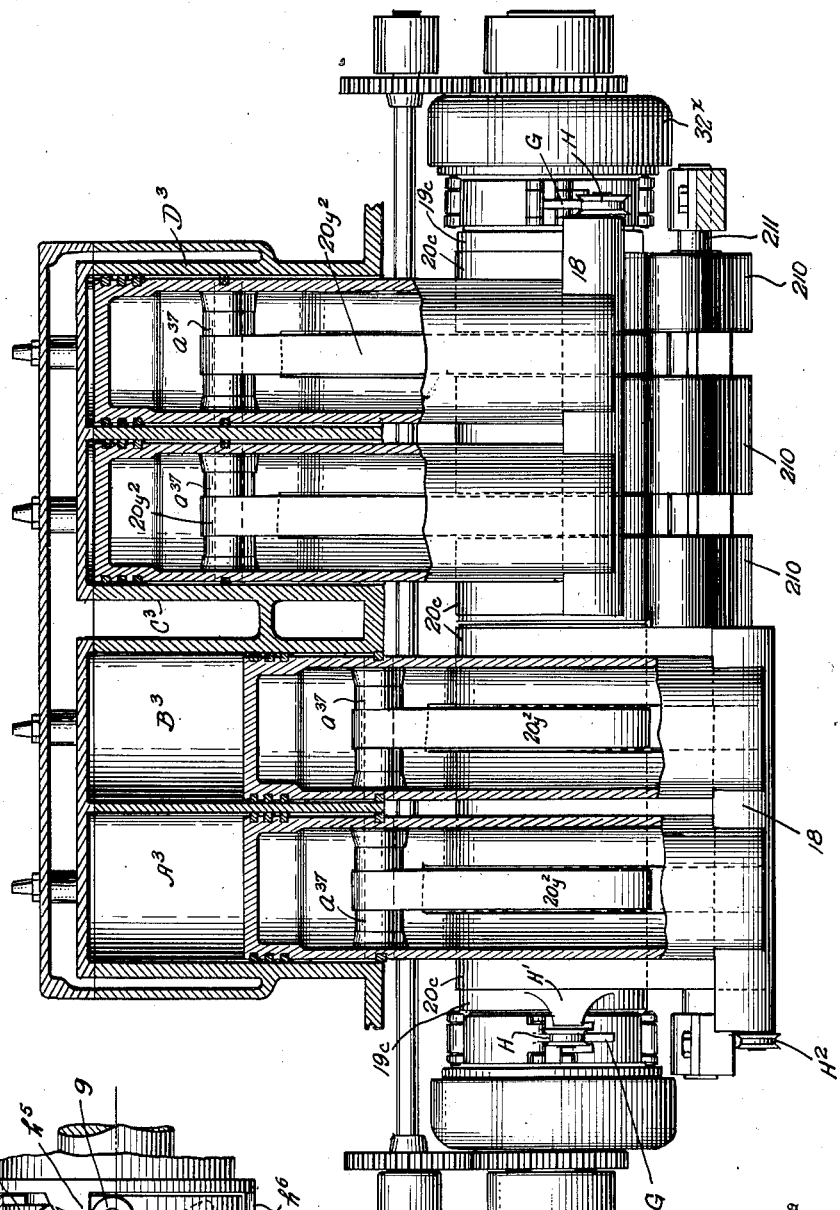

Patented Nov. 27, 1934

1,982,394

UNITED STATES PATENT OFFICE 1,982,394

SHAFT ROTATING MEANS FOR INTERNAL COMBUSTION ENGINES

Ballard N. Morris, Silver Spring, Md.

Application May 23, 1933, Serial No. 672,487

31 Claims. (Cl. 74—25)

The specific disclosure by the drawings herewith and by the detailed description which follows, is of the application to a four-cylinder, four-stroke-cycle, internal-combustion engine, of a special means for resolving the right-line thrust of each piston into a partial rotation of a shaft, the result of two or more successive piston thrusts being a complete rotation which will depart from uniformity of power and speed only to such degree as the motion of the piston, due to the force behind it, may not be uniform. The underlying principles of these means and of each modification thereof shown are of course applicable to the piston of any other type of engine or to any other member given a like motion.

The primary object of this invention is to provide such a connection between a reciprocating member and a shaft, that the power of the former throughout its action may be applied to the latter tangentially only to a curve about the axis of the shaft described by the point or line of connection of the power to the shaft and at a radial distance which either remains constant or if it varies does so only by increasing when the power causing the motion of the reciprocating member decreases. This object I contemplate attaining through a flexible member wound about a drum, to which drum the line of motion of the reciprocating member is tangential; the thrust of such reciprocating member unwinding the flexible member and rotating the drum. The surface of this drum engaged by such flexible member is shown as an arc of a true circle about the axis of a shaft it drives. But I also contemplate that the engaged drum surface may be spirally designed or cam shaped to have its radial distance from the shaft axis increase proportionately as closely as possible, to a calculated or predetermined lessening in force applied by the reciprocating member which might cause a consequent slowing up of its motion and of the shaft, if resistance to rotation of the latter remained the same.

Such a spiral or cam should compensate measurably at least for the fall in pressure behind the piston of an internal compression engine and I am not aware that this has been previously suggested.

The second object of my invention is to secure rewinding on the drum, of the flexible member described (the unwinding of which rotates the shaft) while permitting the shaft which the drum rotates to continual rotating (either by inertia as of a fly wheel, or by being rotated by other means such as a duplicate alternately operating drum, flexible member and reciprocating member) while yet maintaining an unbroken operative relationship between the drum and the shaft such as to permit instant renewal of rotation of the shaft in the first direction when the flexible member has been rewound.

A third object is to drive the reverse or rewind rotation of the drum from a continued rotation of the drum from the axis of the shaft (as in Figs. 1, 2 and 3), or else (as a reversed equivalent) from the continued rotation of the shaft in the first direction through some means maintaining connection between the drum and the shaft. To attain the third object which includes obtaining the second object, I take advantage of the fact that a selected point (as the axis of trunnion 33o in Fig. 3½) spaced from the axis of the shaft (170, Figs. 1 and 3) on an arm, flange or extension, travelling with the shaft, in the course of a complete rotation of the shaft, must move from and towards a fixed point or surface (38, Fig. 1) if such point or surface be not concentric with the travelling point (as in Figs. 11 to 17) or relatively over such point or surface if the latter (as an internal gear 32x in Fig. 16) be concentric with the relative travel of the point (34x in Fig. 16) and I derive the reverse movement of the drum from such relative motion between relatively fixed and movable points, of which one at least has a movement about the shaft axis.

A fourth object is to avoid necessity for or at least sole reliance upon, ratchets, dogs, clutches or the like having a let go and take hold action,—at least in the application of force from the drum to the shaft. This object is obtained by utilizing the same structural elements which connect the drum to the shaft to rotate the shaft and without breaking or changing their connected relation to each as the means for causing the drum to reverse, due to the relative motion between fixed and travelling points and surfaces just above mentioned.

A fifth object is to avoid pivotal joints in the flexible member and although I intend any claim which does not specifically exclude use of sprocket chains, to cover such use, I propose to accomplish this fifth object by the use of a thin flexible band of tough metal such as a chrome and nickel alloy of steel. As an approximate desideratum, I suggest a thickness of about a hundredth of an inch, but the thickness may vary considerably proportionally to the diameter of the drum on which it is to be wound and the angular measurement of the arcuate surface operatively engaged.

A sixth object of my invention is to increase as far as possible the width of the band to be used to compensate for the thickness and to this end I take advantage of the fact that in the two or more pairs of four-stroke-to-the cycle type of internal combustion engine there may be two pistons that travel in the same direction at the same time, to connect them to the same band which may therefore have the same effective width as the sum of the diameter of such pistons or even of the external diameters of their cylinders and of any intervening spacing. But in any case, where it is not possible to make the width of the band great enough to give a single band of the desired flexibility providing thinness, the necessary strength I propose to multiply and superpose bands.

A seventh object, in the case of multiple superposed bands, is to compensate for the fact that each band, as it winds on the drum, increases the operative diameter of the drum and thereby the circumferential travel of each superposed band and therefore the stress upon each outer band increases proportionally to the greater distance it must travel.

I accomplish this compensation by connecting the outer ends of the bands to a pivotal equalizer one form of which comprises a series of concentric semi-annular members merging at their ends in solid cylindrical journals looping bands about the successive annular portions and securing the free ends of all the bands to the drum on which they wind, while another form may be a simple rocking roller.

An eighth object is to facilitate the creeping of the bands upon each other as they wind and unwind to which end means are provided for lubricating those surfaces of the bands which contact with each other or otherwise avoiding friction between them.

A ninth object is to substitute rolling for sliding friction between all the parts upon which the direct impelling force as of a piston is directly applied and either the parts through which the effect of such force is transmitted or between said parts and their supporting means. This is accomplished in one form (see Fig. 4) by so arranging the thrust upon a flexible member rotating one shaft and so transmitting the rotation of such shaft by another flexible member rotating a second shaft, that the strain exerted by such members draws the axes of said shafts toward each other and toward an intermediate rotary member so that the reaction to all strain due to the shifting of the direction of the force moving the reciprocating member into the rotation of the driven shaft, occurs between parts under compression moving in the same direction at the same speed, leaving only the weight of the parts to be carried by the bearings and only the reaction thrust of the cylinders which produces no friction to be sustained by the machine frame.

In another form, I take advantage of the purely tangential thrust of the flexible band to support the axis of the drum upon travelling rollers (see Fig. 33).

A tenth object of my invention is to increase the mechanical advantage (or leverage as it is often called) in the application of the piston power to an engine shaft so that a small engine need not be speeded up to develop its power which often requires as in the automobile, a considerable gearing down when greater power is needed. To this end I arrange the proportion of the drum directly driven from the piston to the piston stroke so that each piston stroke though fully effective throughout may cause less than half rotation of the engine shaft to which it is inevitably limited by the usual crank and pitman. This is illustrated in Figs. 4 and 5 where the stroke gives the engine shaft a one-third rotation which may be varied by changing the proportion of the engine drums 19 to the engine shaft drive pulleys 22 and of these to drive shaft pulleys 24. It is also illustrated in Figs. 13 to 42 when each piston stroke rotates the engine shaft one-fourth which may be further lessened by increasing the circumference of the driving drum in multiples of the piston stroke and correspondingly increasing the number of stop arms of the planetary pinion-carrier.

An eleventh object of the invention is to provide means to absorb the momentum of the moving parts and store energy to reverse the movement, which means are shown in Figures 13 and 17, and particularly in Figure 18.

Description of figures

Fig. 3½ is a perspective view of the greater part of the engine drive shaft assembly.

These three figures show the simplest form of mechanism, I have devised, for applying power by a piston through a strap and drum to rotate a shaft, and by continued rotation, in the same direction, of the shaft, the rewinding of the strap by reverse rotation of the drum about a different axis through the same mechanical connections by which the drum rotates the shaft.

Figure 1A:
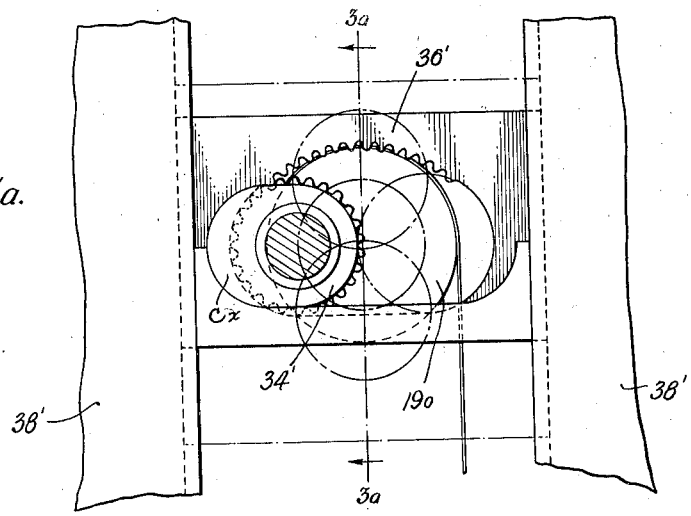
Fig. 1 is a vertical transverse sectional view, partly on line 1—1 Fig. 3, and partly through the center of a cylinder and piston showing in full lines the parts in position at the beginning of a piston stroke and in broken lines the position at the end of a stroke.
Figure 2A:
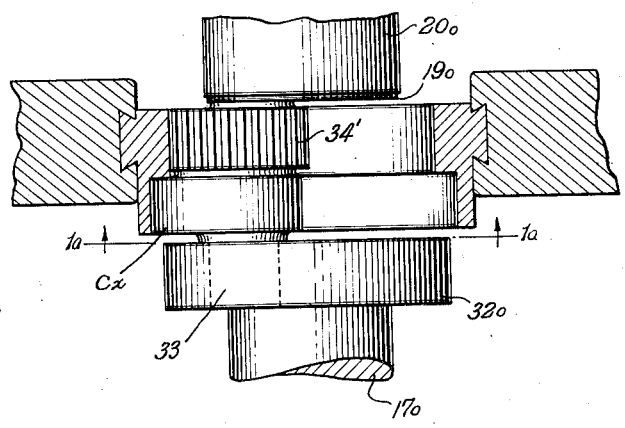
Fig. 2 is a like view taken when the rotary parts have made three-fourths of a rotation and the piston has nearly completed a return stroke.
Figure 3A:
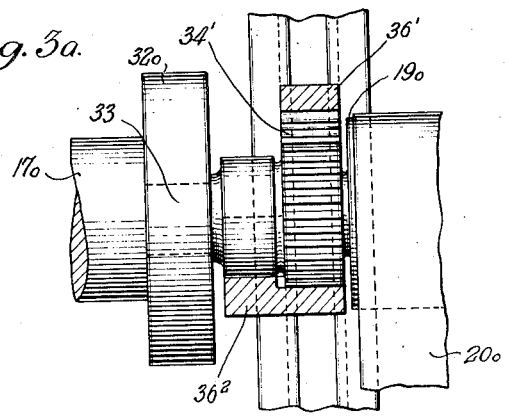
Fig. 3 is a side view (with the housings broken away) of the parts in the position shown in Fig. 1.

Figs. 1a, 2a and 3a Sheet 3, show a modification involving the substitution of a rack and gear for the straps 36o and reversing drum of Figs. 1, 2, and 3; Fig. 1a being a vertical transverse section (similar to Fig. 1) on the line 1a—1a of Fig. 2a; Fig. 2a being a plan view of the same parts and Fig. 3a being a vertical section on line 3a—3a of Fig. 1a.

Figure 4A:
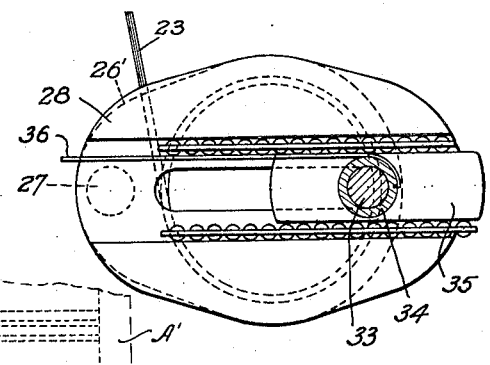
Figure 4:
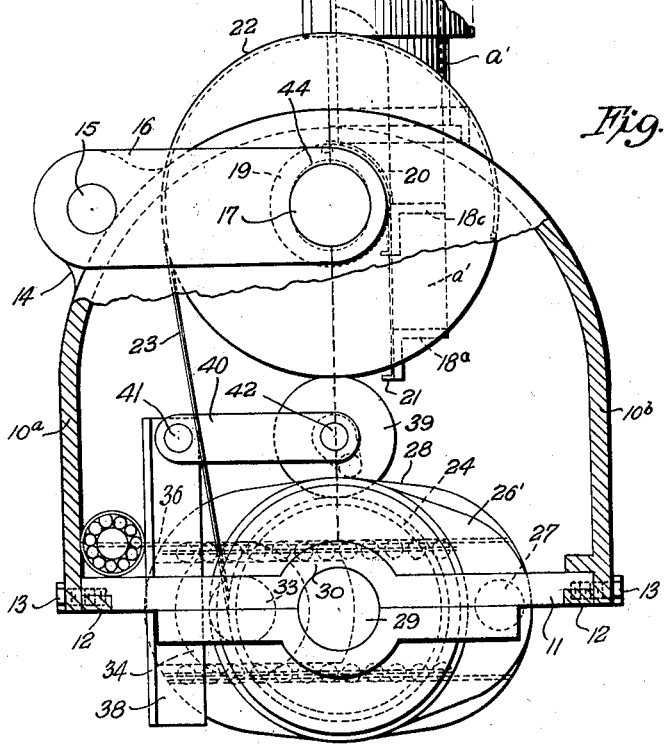

Fig. 4 is an end view of a much more elaborate transmitting mechanism with a portion of the cylinder-supporting housing broken away, showing the end of one piston fully projected and showing, in dotted lines, the retracted position of the piston of a cylinder beyond.

Figure 5:
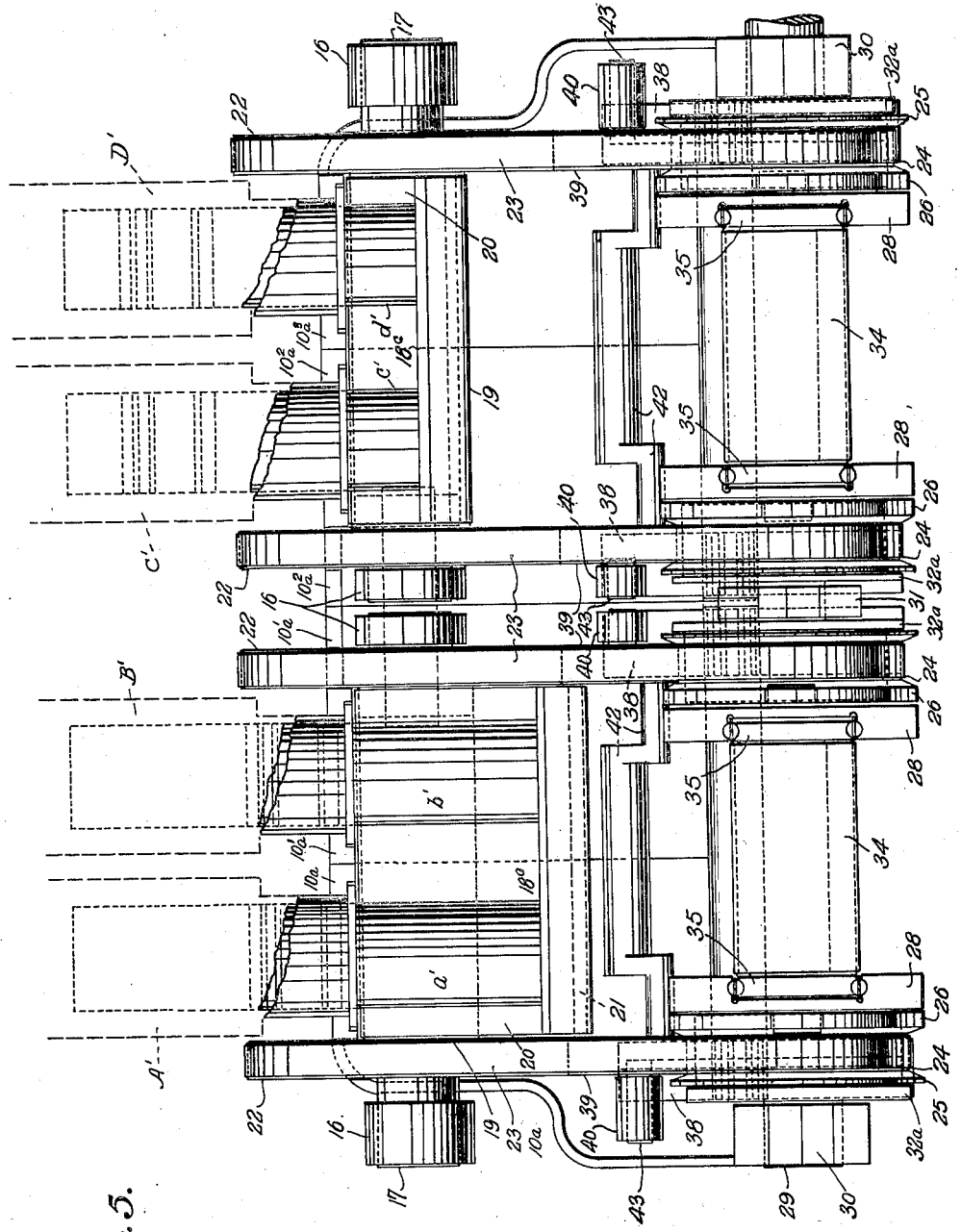

Fig. 4a is a section through the reversing drum 34 at the right in Fig. 5.

Fig. 5 is a side view of a four-cylinder air-cooled engine with a longitudinal half of the housing removed; each half of said housing being made up of four removable sections, one for each cylinder.

In Figs. 4, 4a, 5 and 6 a reversing drum 34 (equivalent to 340 in Figs. 1, 2, and 3) is connected to a crank pin on a flange of the driving drum 24 by a sectionally sliding arm, which reverses drum 24 about axis of the shaft the latter drives.

Figure 6A:
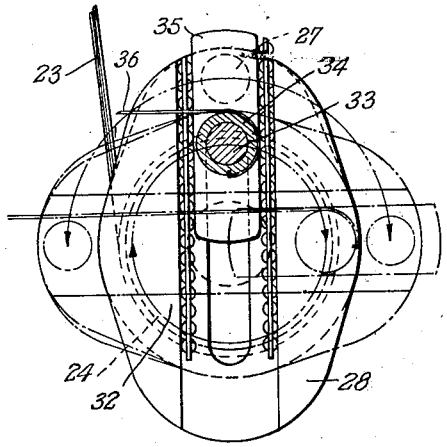
Figure 6:
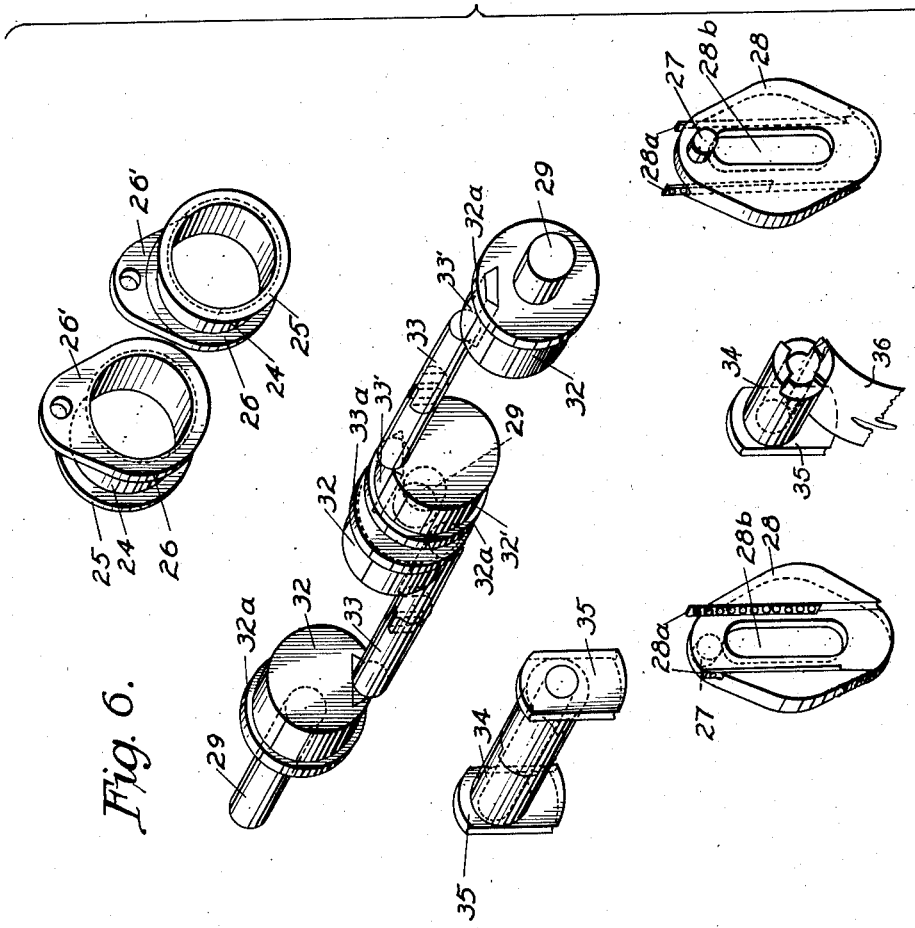

Fig. 6 is a three-dimension group view of all the sections or parts of the drive shaft, which is the lower shaft of Figs. 4 and 5 with the parts (shown mounted thereon in the other views) detached, two of the driving drums and one of the reversing drums being omitted, as they are duplicates of the ones shown.

Fig. 6a (Sheet 4) is a transverse section taken through one of the reversing drums 34 showing in full lines the position of such reversing drum, its slide block 35 and the shuttle-shaped slideway providing member 28 in the positions they occupy when the driving drum 24 shown, has been carried by the travel of its journal 33 clockwise with section 32 of the drive shaft assembly shown in Fig. 6 (as such assembly is rotated a quarter turn by the other driving drum 24), while the strap 36, being secured against horizontal travel, has compelled the reversing drum 34 to make a quarter turn counterclockwise and has compelled the shuttle-shaped member 28 to turn a quarter turn from the position of the shuttle-shaped member shown in interrupted lines, with the circle of pivot 27 at the right. This interrupted line showing of 28, also indicates that upon a further quarter rotation of the parts, the shuttle-shaped member 28 will then have the pivot-pin 27 at the left.

Figs. 7 and 8 respectively are an end view and a side view of an application of my invention to a water-cooled engine with the cylinders in inverted position below the engine shaft and between it and a drive shaft analogous to the drive shaft of Fig. 4, but in Fig. 8 rather less than half of such engine is shown, the half not shown being a duplication of that shown. In Fig. 7 the near end bar carrying the engine shaft bearing has been omitted and Fig. 8 is partly broken away on line 8—8 of Fig. 7.

Fig. 7a is a cross-sectional view of the crosshead or shell at the upper end of the pistons in Fig. 7.

Fig. 8a is a three-dimension view of a drive shaft assembly at one end of the drive shaft 29a of Fig. 8.

Figure 9:
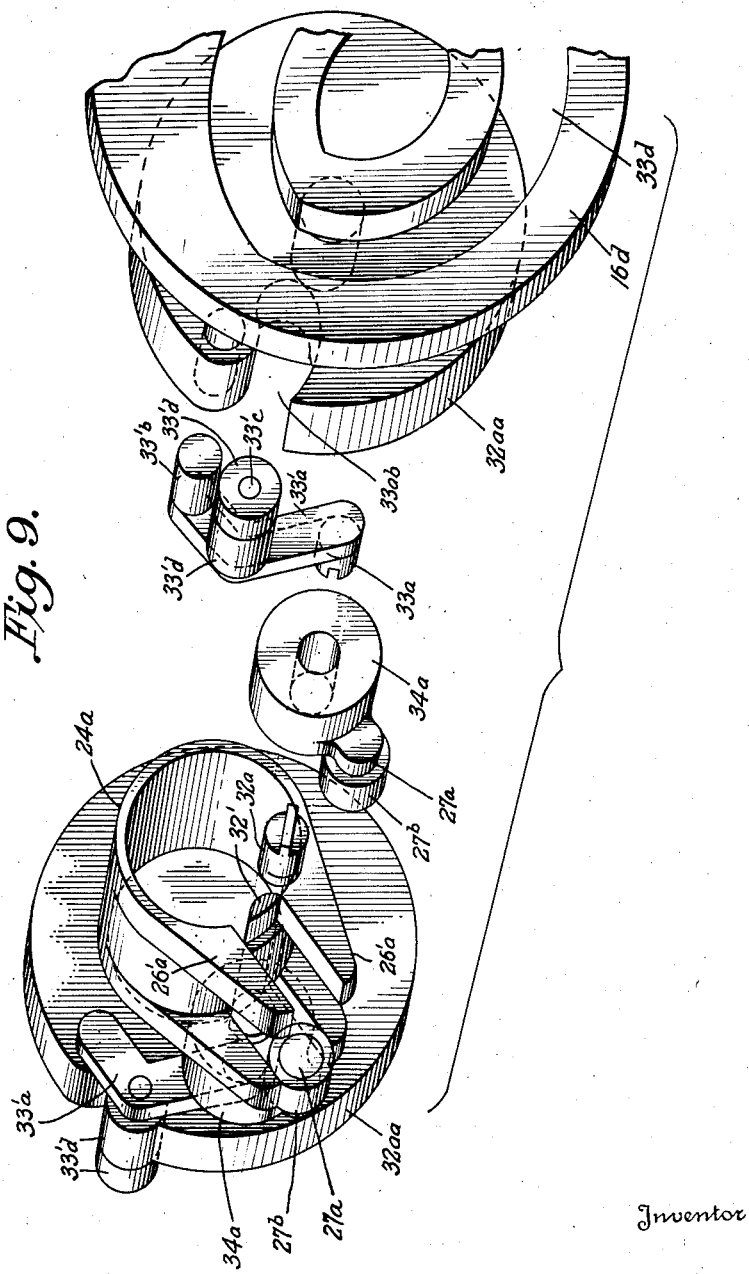

Fig. 9 is a spread perspective view of parts associated with the drive-shaft-assembly parts of Fig. 8a showing the relation of other parts thereto.

Figure 10:
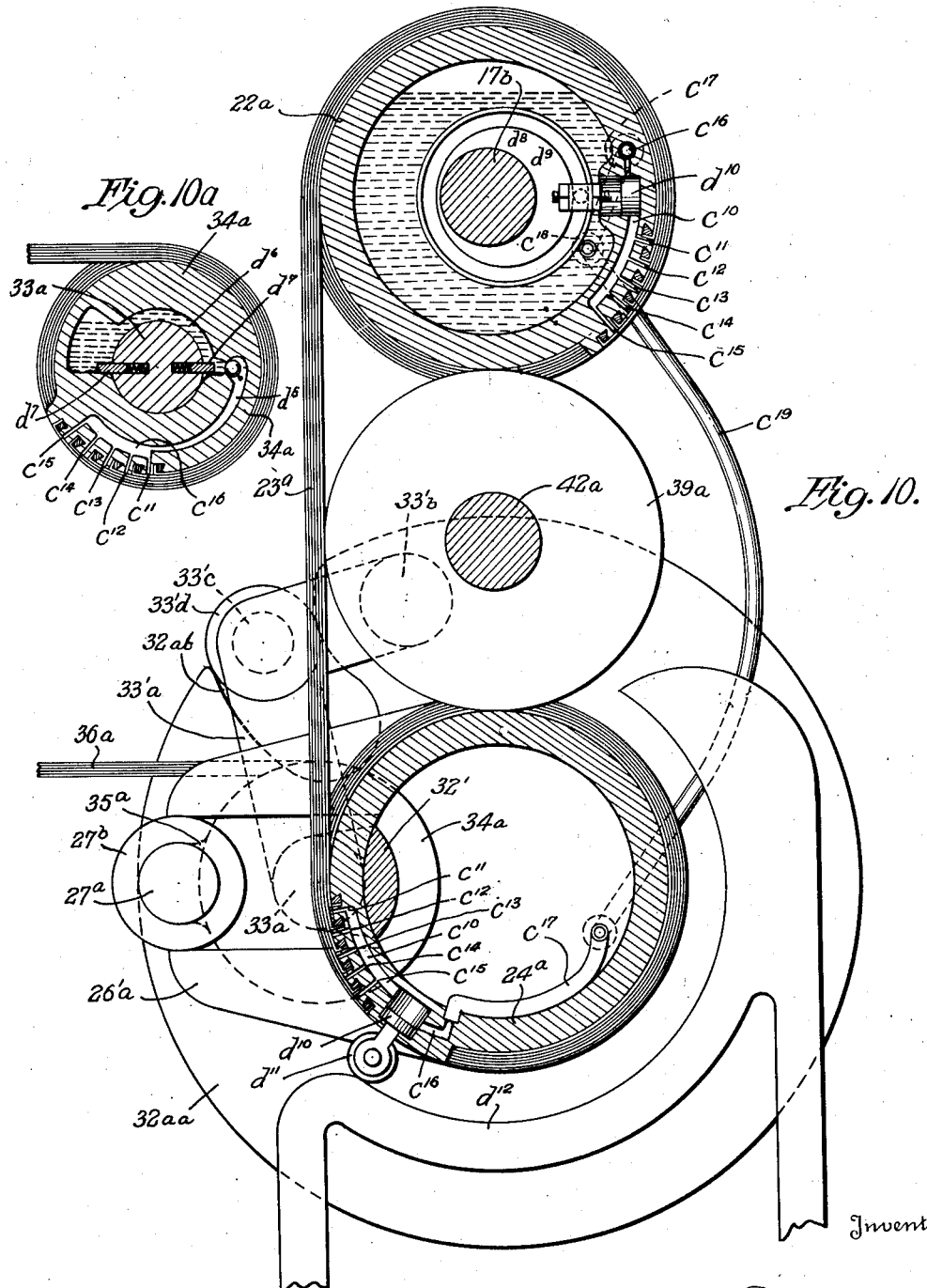

Fig. 10 is a vertical sectional view on a larger scale through the drive pulley 22a and drive drum 24a of Figs. 7 and 8 but showing a greater number of bands 23a and 36a than shown in those figures and showing means for lubricating the adjacent faces of bands 23a.

Fig. 10a shows a transverse section through the reversing drum 34a showing lubricating means for bands 36a (also showing more bands than in Figs. 7 and 8).

Figure 11:
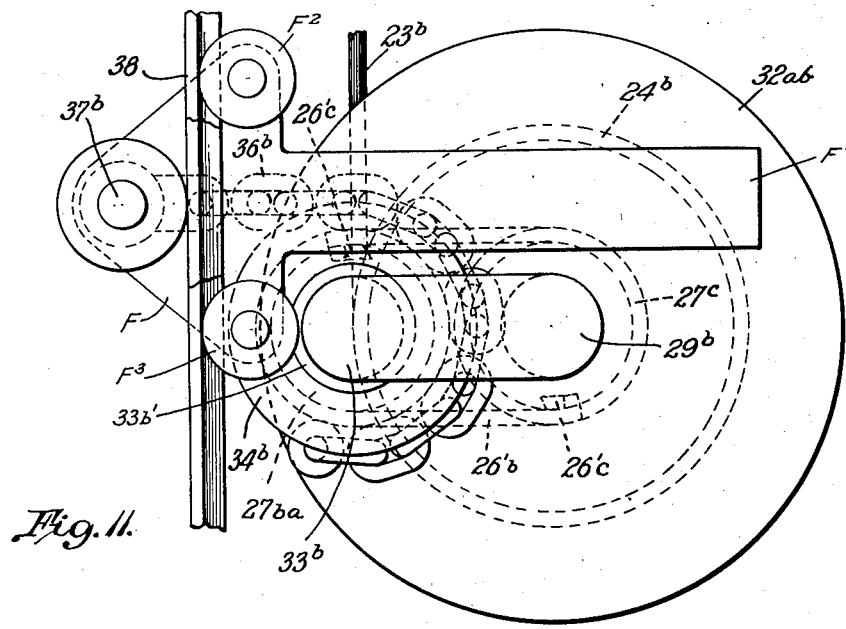
Figure 12:
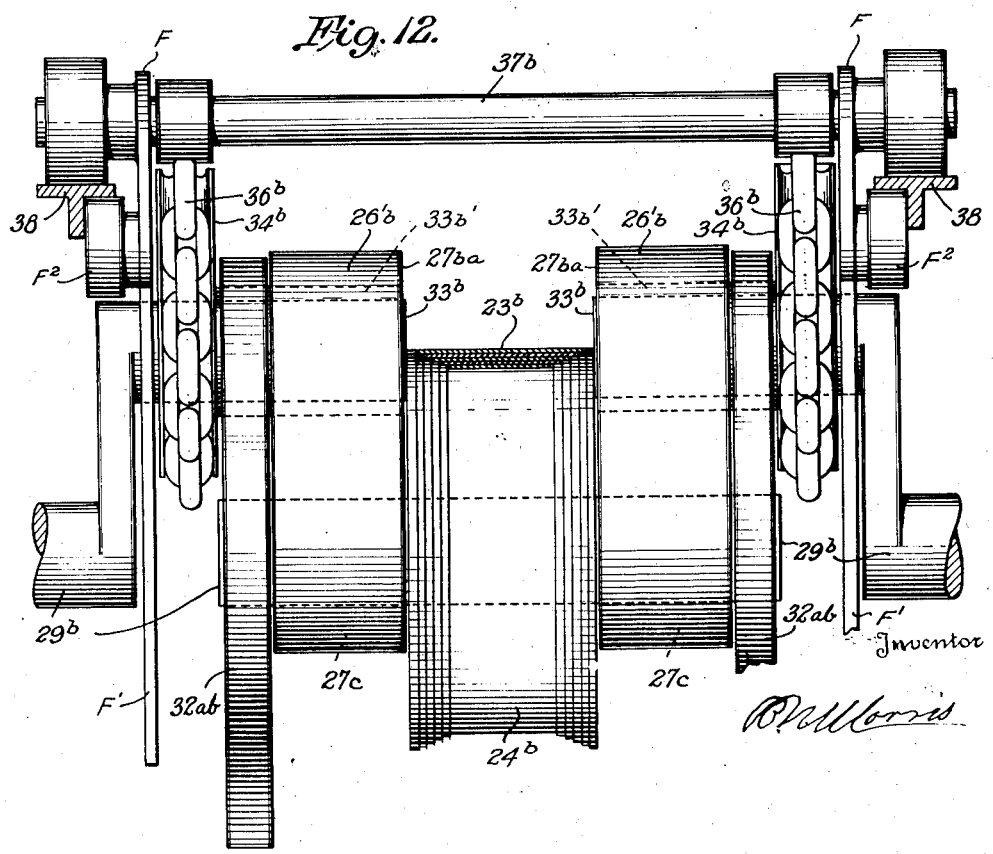

Figs. 11 and 12 are respectively an end view and a top view of a drive drum and its reversing drum strap-connected to each other, each of them being also rotated respectively by a flexible member, that for the drive-drum being a multiple strap and that for the reversing member being a chain.

Fig. 13 is a front view of a four-cylinder, four-stroke engine (part of the cylinders and housings being broken away) having what I call a planetary system of transmitting piston power and returning the pistons to their original position.

Fig. 14 is a plan view (also with parts of the cylinders and housings broken away).

Figs. 15 and 16 are sectional detail views respectively in vertical radial section and in transverse section of a double crown gear and planetary pinion gearing. Fig. 16 being taken on line 16—16 of Fig. 15, Fig. 15 also showing the engine shaft as sectional and having a quartered quadrantal interfit (see also Fig. 20 for this latter feature). These figures also show an incidental roller clutch drive for a crown gear and for the planetary-pinion carrier.

Fig. 17 is a central vertical transverse section of the left-hand cylinder of Fig. 13.

Fig. 18 is a perspective view of part of a rocking counter-balanced checking device storing the momentum of the pistons and driving drum.

Fig. 19 is a vertical transverse section on line 19—19, Figs. 13 and 15 of a double internally toothed crown gear planetary system and showing a roller clutch engagement between an extension, of drum 19x and the planetary pinion carrier.

Fig. 20 is a vertical transverse section on line 20—20 Fig. 13.

Fig. 21 shows a horizontal section, and Fig. 22 a vertical section through a cross head connecting the two pistons shown at the left in Fig. 13, and Fig. 23 shows a transverse section of the same.

Fig. 24 is a perspective view of a yielding stop on a pull band.

Fig. 25 is a plan, partly in section, of a chain of sectional antifriction rollers, and Figs. 26, 27, 28 are respectively sections of such rollers on lines 26—26, 27—27, and 28—28, Fig. 25.

Fig. 29 is an exploded view of the sectional journals of a one-half of a sectional roller and their connecting spline-bars.

Fig. 30 is a side view on a full sized scale of a part of the travelling roller, series of Fig. 25 as they would appear on a flat surface and showing that the axes of the offset journals of each row of rollers lie in an arc.

Figure 32:
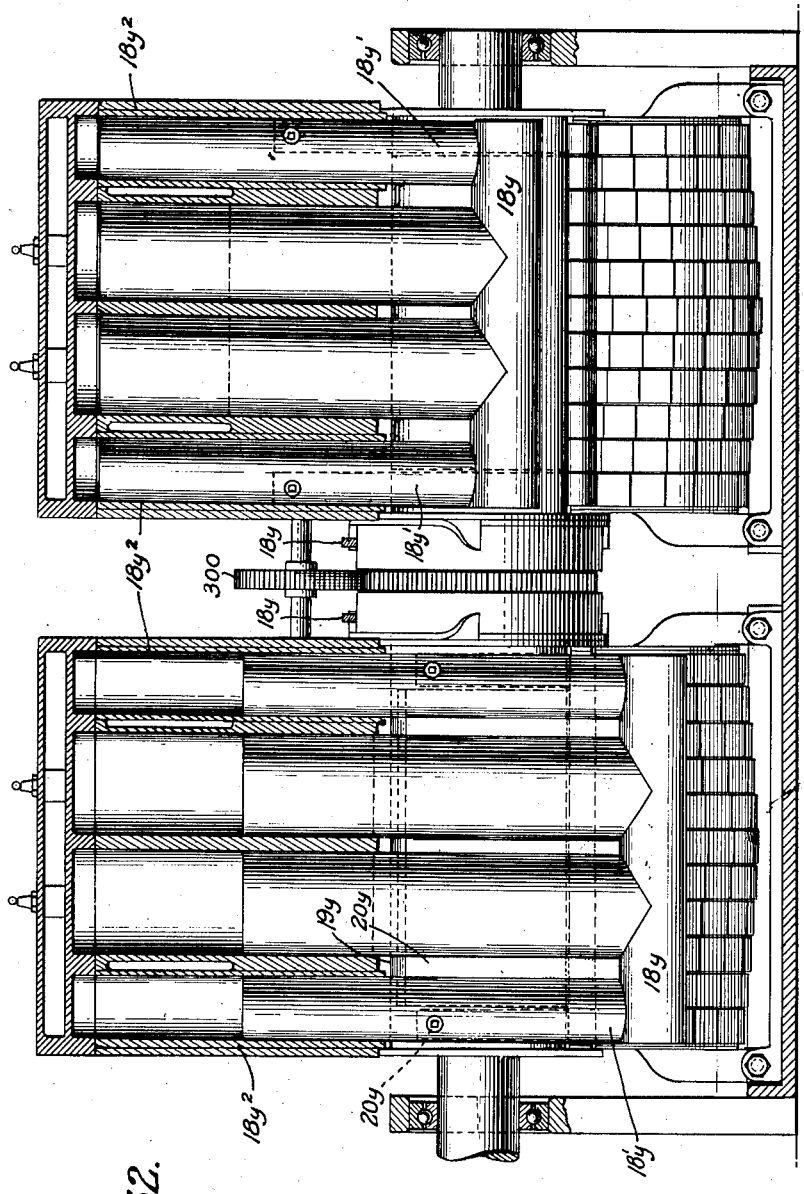

Fig. 31 is a plan view and Fig. 32 a side elevation of an equivalent for the means, shown in Figs. 13 to 29, for causing the pistons of a coupled pair of pistons to move equally and avoid tilting.

Fig. 33 shows a vertical section of one of the cylinders and pistons of the left hand pair in Fig. 33.

Fig. 34 is a vertical sectional view of the left hand head beam guiding extension 18y', showing its connection to the driving drum.

Fig. 35 is a side view, partly in section, of another form of means for equalizing piston travel and of means for controlling planetary pinion mechanism of an engine, otherwise similar to that shown in Figs. 13 to 34, more and more particularly in Figs. 31 to 34.

Fig. 36 is a partial vertical sectional view on line 36—36 of Fig. 35.

Fig. 37 is a vertical sectional view of the upper part of 18b' in Fig. 36.

Fig. 38 is a middle transverse section of Fig. 37.

Fig. 39 is a section on two planes as shown by line 39—39, Fig. 40.

Fig. 40 is a vertical transverse section on line 40—40 of Fig. 39.

Fig. 41 is a detail view of portions of the ring-pairs $33y^3$ and $33y^4$ of Fig. 40, removed from the internally toothed gear and shows how blocks $33y'$ are rigid with ring-pair $33y^3$ and blocks $33y^2$ are reversely rigid with ring-pair $33y^4$.

Fig. 42 is a similar view of the ring-pairs to show their toothed portions engaging pinion $33y^8$.

Fig. 43 is partly an end view and partly in section in different planes, of parts shown in Fig. 44, while Fig. 44 is partly in side view and partly in section of the parts shown in Fig. 43 and of the left-hand portion of the engine shown in Fig. 45 which is a side view of another form of planetary pinion shaft drive and another arrangement of piston-movement equalizing means having the same general operation as the constructions shown in Figs. 31 to 33 and Figs. 35 to 42, but omitting the direct planetary-pinion locking means of Figs. 15 and 16 or Figs. 39 to 42 showing a friction brake for checking the planetary pinion carrier, with a change of position of the piston movement equalizing means to the axial lines of the pistons.

Fig. 46 is a detail view of a multiple disk clutch as a substitute for the strap-brake shown in Figs. 43, 44 and 45.

Description of structure as shown in Figures 1, 2, and 3

Figs. 1 and 2 show, in section, a cylinder and piston which unduplicated would be a theoretically operative structure if supplemented by a flywheel, but Figure 3 shows two cylinders and part of a third (meant to be one of a duplicate of the pair shown) but alternating in operation therewith.

A, B, and C indicate engine cylinders whose pistons, $ao$, $bo$, $co$, have semi-cylindrical extensions, the diametral sides of which lie in an axial plane of the cylinder and piston and extend, longitudinally, tangentially to and closely adjacent to and in a plane parallel to the axis of a drum $19o$ to which it is connected by a steel strap or band $20o$ having one end secured near the lower end of the piston, said strap being wound part way around the drum and its other end detachably secured to the drum by a transverse bar, welded to the inner end of the strap and set in an undercut groove in the periphery of the drum. The piston stroke, the length of the strap and the size of the drum bear such relation that a full stroke of the piston from the position shown in full lines in Fig. 1 to that shown in broken lines, will rotate the drum one-half a rotation. The drum $19o$ has at each end (see Fig. 3½) alined, eccentrically placed, trunnion-like journals $33o$, the outer end portion of each of which is rotatably mounted in a disc-flange or end enlargement $32o$ of alined engine-shaft sections $17o$.

The intermediate portions of the trunnions $33o$ are shown as recessed or slightly reduced at $34o$, so that the unreduced peripheries coincide with the pitch circle of a series of superposed bands $36o$ and constitute reversing drums. Said bands are concentrically looped one about another (see Fig. 1) and their ends conjoined and detachably secured to the periphery of the reversing drums. The loop of the innermost band engagingly surrounds a cylindrical shaft $37o$, partly surrounded by slightly spaced semicylindrical annular sections, each in turn engagingly surrounded by a band loop, said sections and shaft beyond the width of the bands being consolidated into journal ends for revolvable rims travelling on a rigid track 38, parallel to the path of the piston, $ao$, and interposed between the loop ends of the bands and the engine shaft and drums above mentioned.

As shown in Fig. 3 the pistons $ao$ and $bo$ are connected by a rigid bar, $ab$, and descend and rise together, though alternating in the purposes served by such simultaneous movement. While in the positions shown in Figs. 1 and 3, the drums $19o$ engage and are supported by a series of rolls, 200, the ends of which are linked together by chains 201 and which roll on and are supported by a concave-topped bed-bar, 202, rigidly supported by the engine frame.

Description of operation of Figures 1, 2 and 3

As shown in full lines in Fig. 1, piston $ao$ is at the beginning of its stroke, band $20o$ is fully wound up on drum $19o$, reversing drum $34o$ is at that part of its circle of travel about the axis of drive shaft sections $17o$, farthest from the line of track 38. The axis of engine shaft drum $19o$ now coincides with that of shaft sections $17o$. As the piston moves down, carrying the end of strap $20o$ with it, said strap tends to cause drum $19o$ to rotate about the axis of trunnion $33o$ and reversing drum $34o$, but this is resisted by the straps $36o$ and their loop-support on track 38 which will not permit reversing drums $34o$ to turn in this direction unless the drum $34o$ moves toward said loop-support. But drum $34o$ cannot move in a straight line toward the loop support, nor upward, for either would bring the top of drum $19o$ further from piston, which strap $20o$ prevents. Drum $34o$ must therefore move both downward and toward the loop support, that is about the axis of drum $19o$ which coincides with the axis of the engine shaft sections $17o$. As the drum $34o$ and its journal ends $33o$ are mounted in flanges $32o$ of said engine shaft sections $17o$ and spaced from its axis, trunnions $33o$ act as crank wrists and force these engine shaft sections to rotate about their axis until the axis of reversing drum $34o$ has made a fourth of a revolution and the engine-shaft sections a fourth of a rotation about its axis. From this point the top of drum $19o$, which is now diametrically over reversing drum $34o$, will begin to descend as the reversing drum continues to rotate, which permits the latter to rise as it is drawn toward the loop support and complete another fourth of a rotation bringing the parts to the position shown in broken lines, as the piston $ao$ completes its stroke, and bands $36o$ will be completely wound up on reversing drum as shown in broken lines.

If now the engine shaft sections $17o$ continue to rotate either by inertia or because of the operation of a duplicate piston pair suggested at $co$ in Fig. 3—which duplicate pistons begin their stroke as the pistons $ao$, $bo$, finish theirs—said duplicate pistons operating through duplicate connections to another alined engine shaft section $17o$ flanges $32o$ will carry trunnion $33o$ and reversing drum $34o$ away from the loop support of bands $36o$, forcing these bands to unwind and rotating reversing drums $34o$ in the reverse direction, carrying engine shaft drum $19o$ around the axis of said reversing drums, to the position shown in Fig. 2, and from thence on until the parts come again to the position shown in full lines in Fig. 1, the reverse rotation of drum $19o$ winding up band $20a$ which carries the piston $ao$, $bo$, back on their return stroke.

The width of band $20o$ will be at least equal to the diameter of the piston and is shown as equalling that of both pistons, $ao$, $bo$, but to avoid excessive length of trunnions $33o$, the bands $36o$ are much narrower but are multiplied to afford required strength.

The loop support cylinder structure $37o$ rocks, though very slightly, to equalize the tension of all the runs of the band $36o$ and allow for relative creeping as between the inner and outer runs as they successively increase the diameter upon which each of the superposed ones is wound and their loop support $37o$ will also travel upon the track 38 to accord with the vertically shifting position of reversing drum 34o. The diameter of cylindrical support 37o is preferably such that the runs of the bands will not engage forcibly with each other except at the wound portions and the central and annular portions may have a slight independent motion to allow for different effect upon the different loops of the winding and unwinding of the bands.

The proportion of the reversing drum 34o to the circle in which it travels must be such that half the periphery of drum 34o at the effective pitch circle should equal the diameter of the circle about the axis of the engine shaft sections 17o, i. e., Pi/2 equals radius of eccentricity of axis of 34o to axis of 17o.

While the construction just described is fully operative, it presents certain disadvantages. Since the periphery of engine drum 19o can only be twice the stroke of the piston, its radius which defines the lever arm to which the power is applied through the strap can only equal the stroke divided by Pi, instead of being half the stroke as in the case of a crank. Also the size of the reversing drum, which as above explained, is limited by the radius of its eccentricity to the engine drum is further limited by the fact that, if this eccentricity radius be too great, the bodily movement of engine drum 19o in reversing will together with the rewinding of the strap exceed the piston stroke. While insisting upon the value of the invention so far disclosed, the further disclosure will show how these disadvantages may be avoided while still embodying the same inventive conceptions.

There are obvious equivalents for the strap or straps, 36o, as a means for causing the eccentric position of the reversing drum, 34o, on the engine or driving drum, 19o, to produce the desired results. For instance, as shown in Figs. 1a, 2a, and 3a, the reversing drum may be gear-toothed as at 34' and its teeth may engage a toothed-rack, 36', prevented by vertical standards, 38', 38', from moving horizontally although it may slide vertically so as to always rest upon the gear-toothed reversing drum regardless of the vertical components of the circle of travel of the gear-toothed reversing drum, 34', with the driving drum 19o.

In Fig. 1a the toothed rack is shown as describing an upward arc of 90° which lengthens the rack by the difference in length between an arc and its chord, and the pitch line of said arced rack is of a radius equal to the diameter of the circle travelled by the axis of the toothed reversing drum 34'. The pitch circle of the toothed reversing drum has a diameter equal to that of its said circle of travel with the driving drum 19o. The effective radius of the rack, thus being twice that of the toothed drum 34', travel of the latter over the former for one-fourth of a circle will cause a half revolution counter-clockwise of the toothed reversing drum 34 in its travel to the right with the flange 32o of the shaft 17o in which the journal extension 33' of the toothed reversing drum 34' is mounted, while when said toothed reversing drum 34' is carried by the driving drum 19o, to the left, as strap 20o unwinds, the toothed reversing drum 34', because its angular changes of position correspond with those of the driving drum, merely rolls along the rack clockwise from right to left. To maintain the toothed reversing drum 34' all the time engaged with the toothed rack, the latter has a downward extension at each end which not only constitute the slides permitting its vertical travel, but also carry an offset cross-bar $36^2$ which cross-bar with the rack construction resembles a "Scotch-yoke" and has somewhat the same operation, as an intermediate part of the journal extension of the toothed reversing drum 34' rides on the upper face of said offset cross-bar and maintains the drum teeth engaged with the rack. Because of the arcuate contour of the rack the intermediate, cross-bar engaging, part of journal 33o has a cam $Cx$ whose effective radius and contour corresponds to the vertical lift of the arc of the rack.

*General description of structures shown in Figs. 4 and 5*

The construction shown in Figs. 4 and 5 comprises four air-cooled cylinders A', B', C', and D' each having a piston $a'$, $b'$, $c'$ and $d'$, respectively, the skirt of which is so extended in semi-cylindrical form as to project beyond the end of its cylinder even when the piston is fully retracted, as shown in dotted lines in Fig. 4 or at $c'$ and $d'$ in Fig. 5. These cylinders are mounted in a housing divided longitudinally into two sections 10a and 10b and these sections divided transversely into four sections, designated in Fig. 5 as $10a^1$, $10a^2$, $10a^3$. This provides two removable and transversely alined housing sections for each cylinder; each cylinder having a circular flange at the lower end received in registering semi-cylindrical recesses in opposed sections, so that upon the removal of either of its housing sections any cylinder may be removed. Each housing section, at its lower end has an inwardly extending flange or ear by which it is supported upon a rectangular base composed of cross-bars 11 and longitudinal bars 12 notched out to receive the notched out ends of the cross bars as shown in Fig. 4. The housing sections extend down outside of the base 11 and 12 and may be secured thereto by screw bolts 13 and also by screws passing up through base bars 11 and 12 into the ears or flanges of the housing sections. Each of the housing sections, $10a$, $10a^1$, $10a^2$, $10a^3$, has outward extending ears 14 (see Fig. 4, but is indicated in Fig. 5 in dotted lines on sections $10a^1$ and $10a^2$ only) which ears carry pivot shafts 15 for two pairs of arms or links 16, 16, 16, 16. Each pair of links or arms 16, 16 carries an engine shaft section 17 connected to a pair of pistons $a'$ and $b'$ or $c'$ and $d'$, respectively. The pistons of each pair, $a'$ $b'$ or $c'$ $d'$, respectively, are rigidly secured to a common head beam designated 18a or 18c, respectively, which may be of an inverted L-shape.

In this coupling together pistons $a'$ with $b'$ and $c'$ with $d'$, advantage is taken of the fact that in the four-cylinder, four-stroke cycle internal combustion engine, two of the pistons should make their outward strokes simultaneously, for instance that of piston $a'$ being an explosion stroke and that of $b'$ an intake stroke and their inward strokes simultaneously, that of piston $a'$ becoming a scavenging stroke and that of $b'$ becoming a compression stroke, in one cycle, while in the succeeding cycle these functions are reversed as between $a'$ and $b'$ while of course the other pair of pistons $c'$ and $d'$ alternate with $a'$ and $b'$, $c'$ and $d'$ returning together while $a'$ and $b'$ are making their outward stroke and $c'$ and $d'$ making their outward stroke while $a'$ and $b'$ are returning. The rigid connecting of piston $a'$ with $b'$, and of piston $c'$ with $d'$ causes the explosion stroke of each piston to produce the intake stroke of the other piston connected to the same head-beam 18a' or 18c. It is recognized of course that the lines of thrust of such pair of pistons being parallel and laterally offset would tend to cause lateral tilting and binding of the pistons, but attention is called to the fact that the out of line resistance of one piston to the explosion stroke of the other is lessened by the action of gravity on that piston, merely that of friction of the piston rings and of the in-drawn air and gas through the inlet ports and that cross-head guiding for the head beam can be easily provided to prevent tilting of the pistons which are rigid with the head beam. However, I believe, that the manner in which the power of the piston is applied to the engine shaft together with means for distributing the power along the shaft (i. e., bearing rolls 39, 39 and shaft 42 connecting them) that only an extended test would determine whether there is such tendency of the pistons to bind that such cross-head guiding would justify its expense.

The head beams 18a and 18c (and therefore their pistons) are each connected to engine drums 19—19 respectively, mounted upon, or constituting sections or enlargements of engine shafts 17—17 by a thin steel sheet 20, secured at one end to the drum and wound around at least one third of its circumference when the pistons are at the top of their inward stroke as shown in dotted lines in Fig. 4 and at the right in Fig. 5. At the other end these steel sheets are secured as by welding to the vertical flange of an L-iron 21 which is rigidly secured to the head-beam 18ab or 18cd by screws or clamps so as to clamp the sheet 20 forcibly between 21 and the head beam. Also rigidly secured to each engine shaft 17 at each end of the engine drum are larger engine shaft pulleys 22—22—22—22. To each of these engine shaft pulleys 22 is secured one end of a superposed series of independent steel straps 23. These straps are wound partly around the engine shaft pulleys and extend to and are wound partly about and their other ends secured to drive drums 24. These drive drums have tapering guide and strengthening flanges 25 at one end and at the other end thicker flanges 26 which are prolonged into lobes as shown at 26' in Fig. 4 (see also Fig. 6) and apertured to receive a stud 27 on shuttle-shaped slideway providing member 28. There are four of these drive drums 24 (one for each of the engine pulleys) and each drum is mounted to rotate freely on a flanged cylindrical enlargement 32 (see Fig. 6) constituting a drive drum journal section of drive shaft 29.

In Fig. 6 the long intermediate figure shows the drive-shaft, which although it is made up of seven detachable parts, is assembled as shown and operates rotarily as an integral or rigid unit; the long end 29 at the left hand end of the figure being intended to be connected to whatever is to be driven by the engine. The axially alined, smaller, end, and section 29 intermediate, section 29 furnish shaft journals to be mounted in end bearings 30—30 and intermediate bearing 31 (in Fig. 5). Immediately adjacent and at the inner end of the terminal, shaft journal sections 29—29 are larger drive drum journal sections 32 having small flanges 32a on their outer ends or next the outer shaft-journal sections 29, while at each end of the intermediate shaft-journal section 29 there is also a drive-drum-journal-section 32 with its flange 32a next to the adjacent end of said intermediate, shaft-journal section 29. Each intermediate-drive-drum, journal-section 32 is coupled to an outer drive-drum-journal-section 32 by a shaft section 33 (made up of two like sections) so that the entire assemblage shown in this figure is rotated about the axis of the shaft-journal sections 29, 29, 29 and in bearings 30, 30, 31; whenever any element of this assemblage is rotated about such axis.

The two drive-drums 24, 24 shown at the top, to the right, in Fig. 6, are to be mounted, in the relations to each other shown upon the drive-drum journal-sections 32, 32 (shown in the long figure as underlying them) and a like pair of drive-drums 24, 24 are mounted in like manner upon the remaining drive-drum journal-sections of the drive shaft. Upon each of the connecting shaft-sections 33, 33 is mounted a reversing drum 34 (shown in Fig. 6 at the left immediately below the assembled drive-shaft). Each of these reversing drums is likewise made up of two like sections reversed and coupled end to end, and at the outer end has a cross-plate or slide block 35 having two parallel, straight, grooved edges. Upon each of these slide blocks 35 is slidably mounted, the shuttle-shaped slideway, providing member 28, which member consists of a plate having a longitudinal groove or open-ended recess extending throughout its length sufficiently wide and deep to receive the slide block 35 with a travelling ball carrier 28a, revolvably mounting a series of balls, between the grooved edges of the slide block and grooves in the side walls of the slot or recess. These slides have also a long slot 28b extending through the bottom of the slide-block receiving recess, and of such width and length that connecting shaft 33 may pass through said slot 28b and member 28 and permit member 28 to slide on slide-block 35 without interference from shaft 33. Connecting shafts 33 are made in duplicate detachable sections, to permit assembling the parts, but are interlocked so they must rotate together and are also detachably engaged with drum-journal sections 32 by extensions 33' (dove-tailed in cross section) engaging dove-tailed recesses in driving-drum-journal-sections 32 and extending as slots under the flanges 32a. Reversing drums 34 are similarly made in interlocking duplicate sections, so that only one pattern is necessary for making both parts of the reversing drum 34 or connecting shaft 33 and so that each driving drum and the adjacent section of the reversing drum common to two driving drums may be removed without disturbing the other driving drum or its reversing drum section.

As there is a driving-drum and a reversing-drum section, slide, and slide block for each piston, as well as a detachable housing section for each cylinder, all these connections for each piston may thus be removed upon removal of the adjacent bearing 30, or 32, without disturbing the connections for the other pistons.

A single wide thin steel band 36 is attached to each reversing drum 34 (as shown in the middle one of the three lowest figures in Fig. 6). This strap is wound partly around said drum and then extends (transversely to strap 23, as shown in Fig. 4) to a shaft 37, there being a separate shaft 37 for each of the two reversing drums 34, 34. These shafts 37 have anti-frictionally mounted rings or roller surfaces on their ends that may travel on vertical T-iron tracks 38.

Returning to Figs. 4 and 5, between each of the four driving drums 24, and its engine shaft pulley 22, is a roller 39, carried in arms or links 40 pivoting on stud shafts 41 rigid with track-bars 38. These rollers 39 are coupled in pairs by shafts 42, having a middle section concentric with the pulley and crank, end-portions rigid with but eccentric to the rollers 39. These crank ends are necessary in the construction shown to avoid interference with the extensions 26' of the flanges of the driving drums and with slides 28 at certain rotative positions of 26' and 28 as will appear from Fig. 4. The rollers 39 have outside concentric pintle extensions 43 which find bearings in the links 40. Necessity for crank-ends to shaft 42 could be avoided by sufficiently increasing the size of rollers 38, but I have preferred the smaller rollers to lessen the height of the structure and permit shorter belts 23.

The end links 16, 16 for the engine shafts 17, 17 are outside of the housing and the outer ends 17 of the engine shafts have a slight vertical play in slots in the end housing sections (one of which is shown in dotted lines at 44 in Fig. 4). The inside links 16 play through slots in the housing sections 10a¹ and 10a².
Therefore the weight of both engine shafts is carried by the engine-shaft pulleys and these are supported by rollers 39, while these being mounted in pivoted links 40 rest upon the driving drums 24 mounted on the journal sections 32 of the drive shaft which are supported by the shaft journal sections 29 turning in the end bearings 30 and intermediate bearings 31, so that the latter bearings carry the weight of the two engine shafts with everything on said shafts and the drive shaft with everything thereon. This entire weight, however, need not be very great as all these parts should be made of the lightest material, e. g., steel banded or reinforced aluminum and may be considerably hollowed out, so that the entire weight need not be so great as to eliminate maintaining a lubrication film about or under the journals in bearings 30, 30 and 31 by ordinary lubricant pressure cups. But the great pressures ordinarily produced in engine bearings by the power thrusts of the engine, do not act upon any of the bearings in this case because the thrust of the pistons upon straps 20, tending to force the axis of the engine shaft down and also the reactionary down thrust of engine shaft pulleys 22 caused by straps 23 (when resistance is offered to rotation by said straps 23 of drive drums 24), is counter-balanced by upward thrust of the axis of driving shaft 29, due to the up-pull of straps 23 thereon, and instead of these thrusts being of one bearing part against another, between which there is a relative sliding travel, the two thrusts counteract each other so far as concerns the bearings of either the engine shafts, the drive shafts or the pivotal mounting of rollers 39 and result merely in a radial compressive pressure in engine shaft pulleys 22 and drive shaft drums 24 and a balanced diametral compressing pressure on rollers 39 exerted by, between and upon surfaces of 22 and 39 on the one hand, and 24 and 39 on the other, which surfaces, reacting upon each, are travelling in the same direction at the same speed while the motion of either 24 or 22 as transmitted to the other through 39 tends to assist rather than to retard the motion of the other. There is therefore the most rigid support for the forces of reaction against rotation of both the engine shafts and the drive shaft and friction due to the great driving forces of the engine thrust is reduced to the utmost.

*Description of operation as to Figs. 4, 5 and 6*

The intended sizes and proportions of parts in construction shown are mentioned to facilitate understanding the operation.
Pistons, $a'$, $b'$, $c'$, $d'$ are intended to be 3¼" in diameter so that sheets 20, 20 approximately .01" in thickness and 10½" in width and wound at least ⅓ around the drums 19, 19, will, on the explosion stroke of a piston impart to one of the engine shaft drums 17, one-third of a revolution and so likewise to both engine-shaft pulleys 22 on that shaft. These pulleys 22, 22 wind up on themselves for one-third of a rotation, three overlying straps each 1¼" wide.

These pulleys may be 9" in diameter and their proportion to the respective drive-shaft drums 24 to which their straps are connected, as 3 to 2 so that 24 may be 6" in diameter and one-third rotation of pulleys 22 by means of said straps 22 causes drums 24 to make one-half a rotation. Drums 24 tend to rotate on their journal-sections 32 of the drive shaft 29 and their flange extensions or lobes 26' pivotally engaging studs 27 on shuttle-shaped slideway members 28 tend to rotate members 28 and their slide-blocks 35 and the reversing drums 34 (with which said slide-blocks are rigid) on connecting shaft sections 33 of the drive shaft assembly.

Figure 4 being an end view from the left of the engine shown in Fig. 5, shows the parts operated by the pistons $a'$, $b'$, in the positions they occupy at the end of a power stroke of one of these pistons; Fig. 4a being a section through the right hand reversing drum as shown in Fig. 5 shows the position of the drive shaft carried members at the instant piston $c'$ begins to descend. The descent of this piston and the head beam 18c therewith causes pulleys 22, 22 to rotate drive drums 24 clockwise, as will be seen from Fig. 4. Looking now at Fig. 4a this clockwise rotation of drive drums 24 causes through their lobes 26' and studs 27, a like rotation of shuttle-shaped members 28 therewith and members 28 by slides 35 therein tend to rotate clockwise reversing drums 34 on the journal sections 33 on which they are mounted, but this rotation must wind up straps 36, said strap at that stage being nearly unwound from reversing drum 34 but with its end secured thereto. The rotation of drive drum 24 by its straps 23 on engine pulleys 22, therefor tends to wind up straps 36 on drum 34 but this strap cannot be so wound because of its end being fixed to shaft 37 which cannot follow the strap (because of track 38 on which it can only travel vertically) unless said drum 34 and connecting section 33 of the drive shaft assembly, on which drum 34 is journalled can approach shaft 37. Resistance by strap 36 to rotation of drum 34 on its journal shaft section 33 converts the relation of lobe 26' of drive drum 24, stud 27, shuttle-shaped member 28, slide blocks 35, reversing drum 34 and the journalling shaft section 33 of the drive shaft assembly into that of two crank arms of the drive shaft 29, so connected that all must rotate together, as an integral drive shaft, and there will be no rotation of the drive shaft drum 24 on its journal section 32 of the drive shaft nor of reversing drum 34 on its journal section 33 of said drive shaft. But, as the drive-shaft assembly is thus rotated as a solid drive shaft by drum 24, reversing-drum journal section 33 of the drive shaft, revolving about the axis of drive-shaft journal sections 29, is rotated in space as also is reverse drum 34 (though without rotation of 29 and 34 relative to each other) and as throughout this semi-rotation of the drive-shaft-assembly reversing drum 34 and its journalling shaft section 33 must approach shaft 37, the strap 36 is wound up a half turn upon reversing drum 34, co-ordinating the pull of its winding up action with the rotation as a unit of the drive shaft assembly, caused by resistance of the strap to any relative rotation between the parts journalled on the drive shaft sections. The size of reversing drums 34 is such that the periphery of each is equal to four times the radial distance of its axes from the axis of the drive shaft 29d. At such radius as three inches, the circumference of 34 should therefore be twelve inches so that the travel of the axis of reversing drums 34 toward or from shaft 36 in a half rotation of shaft 29 should permit winding or unwinding of strap 36 one-half turn of 34.

At the instant that the power stroke of piston c' thus completes a semi-rotation of the drive shaft assembly (which, as later explained, will have caused a return stroke of piston a', b', the firing of cylinder B' causes a power stroke of piston b' which through the parts shown in the left hand half of Fig. 5 (duplicates of those just described and bearing the same identifying characters) repeats the operation and as the intermediate journal section 29 of the drive shaft assembly rigidly connects the right and left halves of the drive shaft a rotation of the right half is completed by a second half rotation produced by piston b' in the same manner.

At the beginning of down stroke of piston c' just described, the left hand engine mechanism will be in the position shown in Fig. 4 and such semi-rotation of the entire drive shaft assembly by piston c' operates to cause a return stroke of pistons a' and b' from their position shown in Fig. 4 and shifts the parts they operate to the positions above described as presented at the beginning of the power stroke of piston c' so that they may be reoperated in the same manner by the power stroke of piston b', while a third half-rotation of the drive shaft will return piston c' and prepare for the power stroke of piston d'.

This operation of the parts from the positions shown in Fig. 4 by piston c' continues, and completes the rotation which piston a' as shown in Fig. 4 is supposed to have initiated and is as follows:

Strap 36 having been wound up a half turn about reversing drum 34 as shown in Fig. 4, the rotation of the drive shaft-assembly just above described carries connecting shaft section 33 and its reversing drum 34 away from shaft 36, compelling the unwinding of the strap 36 and consequently the reverse rotation of the reversing drum 34 and with it the slide block 35, and the connecting shaft section 33.

The shuttle-shaped slide-way 28 by its pivot stud connection 27 with lobe 26' of drive shaft drum 24 turns said drum 24 on its journalling section 32 of the drive shaft assembly. These respective journalling members 33 and 32 are not concentric; but the axis of 33 lies within the circle of the circumference of 32, so that the flanged cylinder 32 becomes in effect an eccentric cam whose cam axis coincides with that of 33, and flange 26 of drum 24, with its lobe 26' becomes the equivalent of an enclosing strap for such an eccentric, capable (theoretically) of travelling with reversing drum 34 slide-block 35 and slide-way 28 about a common axis which is that of 33 (about which reversing drum 34 is rotated).

In the ordinary applications of such an eccentric and strap device, the center of the circular eccentric part revolves about the eccentric axis, while such circular part also has a relative movement of rotation in the strap; some part of the strap being pivoted to something which is given thereby a reciprocating movement, but in this case, the conditions are merely reversed in that the eccentric axis, i. e., the axis of shaft 33 revolves about the axis of the circular part 32 which lies in the axis of the drive shaft assembly 29 but would give the pin 27 a reciprocating movement were it not for the sliding relation provided between slide-block 35 and shuttle-shaped member 28, and instead of the circular part 32 being thereby made to rotate in the strap, the eccentric strap equivalent, i. e., drum 24 and lobe 26' are given by the circular movement of the axis 33 a rotary movement about said circular part 32 by the rotation of reversing drum 34 in the opposite direction by strap 36 from that in which the axis of 33 travels about the axis of 29. Therefore the travelling of shaft 33 as part of the drive-shaft assembly, during half rotation of said assembly (caused by the power stroke of piston c') carrying reversing drum 34 with it, through the action of strap 36 produced a reverse semi-rotation of reversing drum, which through slide-block 35 shuttle-shaped member 28, pin 27 and lobe 26' gives a reverse half rotation to drive shaft drum 24, winds up straps 23 a half turn on said drum 24, thereby reversely turning engine shaft pulleys 22 and engine shaft 17 a one-third turn (because of the 2 to 3 proportions between 22 and 24) winds belt 20 about engine drum 19 thereby producing a return stroke of pistons a' and b' of which that of piston a' will be a scavenging stroke and that of piston b' a compression stroke which will make cylinder B' ready to fire and pistons b' and d' may then successively repeat the operations described as to pistons c' and a'.

Straps 36 of the reversing drum might well be wider if of same thickness as straps 19 to which the pistons are connected because it is these straps that insure, so far as yet described, that the power strokes of the engine pistons shall turn the drive shaft assembly as a whole rather than turn drive drums 24 on their journal shaft sections 32, but straps 36 have been shown as narrower than engine shaft straps 19 in order to shorten the longitudinal dimensions of the whole structure. When this is not important a proportionally wider strap 36 is theoretically desirable, because the respective leverages, as for instance between engine drum 17, and drive drum 24 are 2 to 3, as between driving drum 24 and its arm carrying pin 27, again 2 to 3 and of said driving drum arm and the shuttle shaped member 28, 5 to 8 the product of which is 20 to 72 or expressed as a fraction $$\frac{20}{72},$$

but this proportion is reversed as between member 28 and the radius of reversing drum 34, where the proportion is 4 to 1, and dividing $$\frac{20}{72} \text{ by } \frac{4}{1}$$

the dividend is 80/72 or 1 1/9 so that straps 36 might well be 1 1/9 times the width of driving band 17 in order that each should be exactly proportioned to the relative stresses thereupon. But straps 36 need not be exactly in this proportion because during the power stroke, during which they act only as a retraining means, part of the stress they would otherwise sustain is absorbed by friction between the stress exerting means, as by that of stud 27 in lobe 26' and that between drive shaft drum 24 on its journalling shaft section 32, when it tends to turn thereon, and also the rotative momentum of lobe 26', shuttle-shaped member 28 slide-block 35 and of both drums 24 and 34 all of which have been rotating in the opposite direction and all of which must be overcome before drum 24 can turn in the opposite direction on its journalling before drum 24 can, through drum 34, bring a stress upon strap 36. Of course in the piston returning operation, all these conditions are reversed and a greater stress is brought on strap 36 than on strap 17, but the resistance to this piston return stroke, being only that of the piston friction and compression resistance in but one cylinder, any size of either strap 36 or 20 that can sustain the stresses of power operation will be more than sufficient for returning the pistons.

However, as a precaution against excessive strain on belt 36 a roller and cam-recess clutch action may be provided between drive drum 24 and its journalling shaft section 32 as shown at $e$ and $f$ in Figs. 15 and 19, and may be so proportioned that the roller will only come into binding operation upon a slight "give" or elastic stretch in strap 36 when undue strain is brought thereon so that under ordinary circumstances the clutch roll will not operate and it may be regarded a mere provision for emergencies; or for reduced widths of strap 36.

*Description of construction shown in Figs. 7, 8, 8a, 9, 10, and 10a*

These figures relate to a water-cooled, four-cylinder, four-stroke internal combustion engine, although only one cylinder and piston appears in the end view (Fig. 4) and in Fig. 5 only one cylinder and piston and part of another cylinder and piston are shown and designated $A^2$, $a^2$ and $B^2$, $b^2$, respectively, corresponding to cylinders A and B and pistons $ao$, $bo$, of Fig. 2, the two more cylinders not shown, corresponding to cylinders C and D of Fig. 5. The four cylinders and pistons operate in the same manner as those described in Figs. 4 and 5; that is, the pistons $a^2$ and $b^2$ make their outward strokes simultaneously and the outward stroke of $a^2$ and $b^2$ are timed with the inward strokes of the two not shown and each piston of the pair not shown is intended to complete the rotation of the drive shaft 29a, half of which rotation has been given by $a^2$ or $b^2$ as pistons $co$ or $do$ have been above described as completing the drive shaft rotations, the first half of which is given by piston $ao$ or $bo$ in Figs. 1, 2 and 3.

To lessen the height of the structure comprising the cylinders, the engine shaft and the drive shaft in Figs. 4 and 5, the cylinder casting whose inlet manifold is shown at I and the inlet valve at $i$ in Fig. 7, is inverted and placed between the engine shaft 17a, corresponding to shaft 17 in Figs. 2 and 3, and the drive shaft 29a, corresponding in general function to 29 in the drive-shaft assembly of Fig. 6. In this modification, engine shaft 17a is mounted at each end in a bearing 16b carried by end beams 16a (the near beam 16a being omitted in Fig. 7 and the far one in Fig. 8). These end beams each rest at each end on a longitudinal I-beam 16c (partly broken away in Fig. 8), and these I-beams rest on vertical plates 16d. There are four of these plates (only two being shown in Fig. 8) one at each end of the I-beams and one near each side of the casting constituting the four cylinders $A^2$, $B^2$, etc. These cylinders may be the ordinary cast-in-block type having, at their upper open ends, as shown in Fig. 8, right and left horizontal extensions 16e, 16e which rest on I-beams 16c, and a semi-cylindric recess in the top to accommodate shaft 17a; an arcuate web 16f forming part of the wall of the said recess and merging with extension 16e.

Each piston, proper, terminates at its upper end in a quadrantal recess (as shown in Fig. 7) extending across one-half of the piston, while the remaining half of the piston is prolonged a distance equal to the stroke of the piston, as a shell, semi-cylindric at its base but the curve of which flattens towards its upper end; the edges of its diametrical open side lying parallel and adjacent to the diametrical plane of the piston. To and across the upper ends of the pair of pistons $a^2$ $b^2$ is welded, or otherwise secured, a hollow head or shell $18a^2$ on which are secured (see Fig. 7) a pair of spaced longitudinal shafts $a^{12}$, $a^{12}$, upon which turn freely a series of rollers $a^{13}$. Between and resting on these rollers and supported thereby are two alined roll shafts $a^{14}$—one for each piston. To these roll-shafts $a^{14}$ are secured the upper ends of a series of superposed straps 20a, 20b, the lower ends of which are secured, to be wound on and unwound from engine shaft drums 19a (see Fig. 7) 19b on engine shaft 17a; one drum for each piston. The details of the connection of the straps to roll shafts $a^{14}$ are shown in Fig. 7a. Each roll $a^{14}$ has solid cylindrical ends rolling on rolls $a^{13}$ and which are connected by six longitudinal bars lenticular in cross-section, the outer peripheries of the outer pair of which also engage the rolls $a^{13}$. Between each pair of such lenticular bars passes one of the straps 20a, the middle of these straps having an enlarged and cylindrical end resting between the inner pair of bars. Each of the other straps 20a passes between a pair of such bars and has an inward hook engaging over the upper edge of this inner bar of the pair. Each of the outer straps has secured to its inner side a block whose thickness is equal to the greatest thickness of the lenticular bar to which it is hooked. As the straps 20a or 20b wind on and unwind from drums 19a, 19b, they travel slightly different distances, and would therefore be individually stressed by pistons $a^2$ or $b^2$ or exert stress upon such pistons to different degrees, but by attaching said straps as above described to shaft $a^{14}$, which can roll slightly on its supporting rollers $a^{13}$, these stresses are equalized; rollers $a^{13}$ engage the outer straps 20a and hold the blocks parallel with light pressure and prevent them from tilting. Shaft $a^{14}$ rocks very slightly.

It will be noted that in Figs. 7, 7a and 8, five overlying straps 20a or 20b are provided for each piston instead of the single strap 20 for a pair of pistons in Figs. 1 to 5. This is to provide for any inability, in any case, to secure a single strap thin enough to be sufficiently flexible and yet strong enough to sustain the necessary tension. The separate groups of straps 20a for each piston $a^2$, $b^2$, etc. also permits independent repair or replacement of the straps for each piston.

Attention is also called to the fact that as shown in Fig. 8 each overlying strap 20a or 20b (and others mentioned later) is slightly wider than the one it overlies and that the surface of each plural strap receiving drum has an annular recess with stepped side walls, the steps equalling in height the thickness of the strap, so that each overlying strap is supported at both edges on its appropriate step of the drum, relieving to a certain extent pressure and friction upon the underlying straps.

In this construction the engine shaft drums 19a, 19b for pistons $a^2$ and $b^2$ are made integral and rigid with each other and with an engine shaft pulley 22a, while the second pair of drums, like 19a, 19b, are to be provided for the second pair of pistons, not shown, and will have an engine shaft pulley 22a, and the drums of each pair and its pulley are to rotate freely on shaft 17 and those of this second set entirely independently of the set shown—in fact, those of one set will be rotated oppositely from those of the other set on said shaft 17.

The engine-shaft pulleys 22a have the ends of three overlying straps 23a secured thereto and wound partly around them, the other ends of which are secured to and wound partly around drive shaft drums 24a (it being noted that both 22a and 24a also have stepped recessed peripheries).

Between said pulleys 22a and drums 24a are rollers 39a only as wide as and engaging only the bottoms of the stepped recesses in both 22a, 24a.

In this construction both drums 22a, 24a and roller 39a are all of the same size and their rates of angular motion will all be equal; engine shaft drum 19a in this case receiving a half rotation from each piston power-stroke and transmitting such half-rotation through pulley 22a straps 23a and drum 24a and other means to be described to the drive shaft 29a, causing a half-rotation thereof.

The drive shaft drums 24a are mounted upon a drive-shaft-assembly of similar structure for the same purposes and to the same general effect as the drive-shaft drums 24 in Figs. 4 and 5 are mounted on their drive-shaft-assembly, but the drive-shaft assemblies of the two structures vary greatly in detail. In the modification now being described, the drive-shaft-assembly comprises the drive shaft proper 29a, composed of a long intermediate section (see Fig. 8) running below the cylinder casting and finding a bearing at each end at 31a, adjacent to and supported by a vertical plate 16d and two short end-sections, only one being shown, each being supported in the other vertical plate 16d and also in bearings 30a in cross-beams 11a (similar to 30 and 11 in Figs. 4 and 5). Each end of the long intermediate section of shaft 29a has keyed to it a large flange or disk 32aa, and the confronting end of the adjacent end-section of shaft 29a has keyed to it a similar disk 32aa. These two disks 32aa are connected together so that not only the two disks 32aa shown in Figs. 8 and 9, but also the two disks understood to be (but not shown) at the right hand end of Fig. 8, the intermediate section of shaft 29a and its two end-sections always rotate together as a rigid integral whole. This connection between the two disks 32aa, 32aa (see Figs. 8a and 9) comprises a double-crank or rectangular U-shaped member, the two arms 33'a, 33'a of which (may also be identified in Fig. 8, one at the right in full lines and that at the left by corresponding dotted lines) each arm having an outwardly extending pintle end 33'b pivoting in an aperture in the adjacent disk, 32aa, as shown in Fig. 9. Both these arms 33'a are also bent into an elbow shape as seen in Figs. 7, 8a, 9 and 10, and at the elbow have another longer outwardly projecting pintle 33'c, each carrying two alined free rollers 33'd of which the one nearest the arm rolls in an arcuate slot 33ab (see Figs. 7, 9 and 10) in the disk 32aa concentric with pintle 33'b so that the whole U-shaped, elbow-armed member, pivoting at 33'b, may swing to bring the connecting bar of the U toward the common axis of the disks 32aa and drive shaft 29a. Each outer roller 33'd rolls in a cam slot 33d (see Fig. 9) in one of the vertical plates 16d immediately adjacent which each disk 32aa rotates. The cross-bar of the elbow-armed U-shaped member, immediately adjacent each arm 33'a, forms a right angle therewith and constitutes a journal-section 33a for a reversing drum 34a. (In Fig. 9 one journal section 33a is shown made in two separable but interkeyed sections to permit assembling and disassembling of the parts shown to right and left.) These journal sections 33a are spaced apart but connected rigidly together by an integral shallow rectangular U-section (see Fig. 8a) the plane of whose loop is nearly at right angles to the adjacent arm part 33a and nearly parallel to the arm-part beyond the elbow. These arms 33a', 33a' of this shallow U lie in the plane of rotation of an eccentric pintle 27a and roller 27b (see Figs. 7 and 10) carried by an ear-like extension 35a from the adjacent end of each of the two reversing drums 34a mounted on the two spaced journal sections 33a of the U-member cross-bar. These arms 33a', 33a' of the shallow U are not thick but gradually widen (see Fig. 10) and are spaced and joined by a bar-part of lens-like cross section (see 32' in Figs. 8a, 9 and 10) one face of which engages and coincides with the inner circle of an annulus constituting the drive-shaft drum 24a above mentioned and the other may be concentric with journal section 33a. This lens-shaped cross-bar 32' is hardly a journal, for said drum 24a though it has some function in locating and guiding it, the real bearing for drum 24a in this construction being an outside bearing on roller 39a. The two disks 32aa, one keyed to the long intermediate section of shaft 29 and one to the end-section thereof, are thus in effect pinned to each other by the rigid, elbowed, U-member (whose two end pintles 33'b engage in aligned perforations in said pair of disks) so that any rotary motion imparted to either or both disks 32aa, at each end of said shaft, and any such motion given a pair of disks at either the end of the shaft shown, or that at the other end of the shaft must rotate the other pair, quite regardless of the capability of the elbowed-U-shaped member to turn, or of the fact that it does turn on occasion (due to cam slots 33d in vertical plates 32aa). Reversing drums 34a, 34a have annularly recessed stepped periphery (not shown in Fig. 9 but shown in Fig. 10a) on which are partly wound superposed straps 36a which extend at a right-angle to the straight run of straps 23a between drive shaft drum 24a and engine shaft pulleys 22a, and are connected to shaft 37 (see Fig. 7) having end rolls or rims which may travel on vertical tracks 38 just as shown in Figs. 1 to 5 and previously described. The rolls 27b on pintles 27a of the reversing drums 34a engage slots in flange extensions or lobes 26'a of drive-shaft drums 24a (see Figs. 9 and 10) to the same effect as the engagement between pins 27 on slide extensions 28 of slide blocks 35 within lobe 61 of drive shaft drum 24 in the construction shown in Fig. 6 as above described.

The roller 39a is mounted on a shaft 42a carried in the ends of a pair of links 40a, 40a (see Fig. 7) which links are pivoted at their other ends to vertical arms 40b, the right-hand one of which is broken away in Fig. 8 and which are pivoted to vertical plate 16d at 40f. The pivot shaft 41a connecting said links 40a and arms 40b extends beyond the latter and projects between two ears 40c (see Fig. 7), each having a bearing screw 40d by which the arm 40b and links 40a may be adjusted to exactly aline the axis of rollers 39a with those of engine shaft pulley 22a and drive shaft drum 24a. It will be noted that the entire friction due to driving strain on shafts 17a and 29a will be taken off their bearings and resolved into rolling friction between engine shaft pulleys 22a and roller 39a and between drive shaft drum 24a and said roller 39a and roller 39a may take even the weight of engine shaft 17a and everything carried by it off the bearings of said shaft.

Engine shaft 17a may either be fixed in its end bearings 16b and both sleeves, comprising drums 19a, 19b and pulleys 24 and their duplicates described but not shown, may turn freely thereon, or the shaft may rotate in its end bearings and one sleeve be rigid with the shaft, and the other free to rotate on said shaft.

*Description of operation of structure in Figures 7, 8, 8a, 9, 10 and 10a*

The operation of this structure is very similar to that of Figs. 4, 5 and 6.

Assuming that the upward or power stroke of piston $a^2$ has brought all the parts to the position shown in Figures 7, 8 and 10, piston $a^2$ by means of the head or shell $18a^2$ having also carried up piston $b^2$ and that a piston not shown now begins its upward power stroke thereby rotating drive shaft 29a (and necessarily, as has been shown, rotating the two disks 32aa, shown in Fig. 8), it will be seen from Fig. 7 that disks 32aa, 32aa will carry the elbowed U-member (see Fig. 8a) with them by its pintle ends 33'b for a semi-rotation toward the right or clockwise and so must carry the reversing drum 34a also with them unless said elbowed U-member can swing backward on said pintle 33'b. But said member cannot swing backward because roller 33'd carried by the long pin 33'c engages the outer wall of slot 33d in the vertical plate 16d, and moreover the contour of said slot is such that said roller 33'd compels the elbowed U-member to move about its pintles 33'b, also toward the right and toward the center of disk 32aa.

The combined effect of these movements with the twin roller 33'd traversing arcuate slot 32ab in disk 32aa is to carry reversing drum 34a away from shaft 37 on track 38, shown in Fig. 7, and because the plural straps 36a have one of their ends secured to said shaft 37 and are wound about and secured to said reversing drums 34a, the latter are compelled to turn to the left or counter-clockwise on their journal sections 33a of the elbowed U-member. In this counter-clockwise turning of reversing drum 34a (see Fig. 10) its eccentric pin 27a and roller 27b which play in the slot of the lobe 26'a of drive shaft drum 24a cause it also to turn counterclockwise winding up straps 23a thereon and unwinding them from engine shaft pulleys 22a and thereby rotating said pulley 22a and with it drums 19a and 19b and rewinding on each of the latter their straps 20a and 20b respectively and thereby forcing both pistons $a^2$ and $b^2$ downward on the scavenging stroke of $a^2$ and the compression stroke of $b^2$. When disks 32aa have made one-fourth rotation, the cam slots 33d in vertical plates 16d (see Figs. 7 and 9) will have so swung the elbowed U-member that the axis of the reversing drums 34a will coincide with that of the driving shaft 29a and its drum 24a and from this point the course of the cam slot 33d recedes from said axis and its inner wall, through pintle 33'c and roll 33'd swings the elbowed U-member, so that the axis of the reversing drum now moves away from the axis of the drive shaft and of disks 32aa but being now on the other side of said axis this movement is still away from shaft 37 and therefore continues to unwind straps 36a and rotate reversing drum 34a counterclockwise, and the carrying of such drum 34a with disks 32aa as they complete a half rotation also facilitates this. When disks 33aa have completed their half rotation, pintles 33'c with their rolls 33'd will have come to the beginning of a part of the course of the cam slot 33d in vertical plates 16d, which is concentric with disks 32aa and which maintains the twin rolls 33'd out at the end of the arcuate slot 32ab in disk 33a and so this slot and the slot 33d, the twin rolls 33'd engaging them respectively, with their pintle 33'c and the pintle 33'b of the elbowed U-member, lock said U-member and the reversing roll 34a in the same position relative to the disks 32aa, shown in Fig. 7, but at the opposite side of drive-shaft 29 and at 180 degrees from the position in which they are shown in Fig. 7. At this instant, cylinder $B^2$ should be fired and piston $b^2$ by straps 20a then turns drum 19b and with it drum 19a and pulley 22a; the latter through straps 23a turning driving shaft drum 24a one half rotation. Drive-shaft drum 24a tends to turn on its own axis and rotate on and about the lenticular section 32' of the elbowed U-member, but to do this its slotted lobe 26'a must turn the pintle 27a of reversing drum 34a and said drum about its journal-section 33a of the cross bar of the elbowed U-member, but they cannot so turn said reversing drum because of its connection by strap 36a to shaft 37.

Therefore in effect the reversing drum 34a is held rigid with the elbowed U-member and the latter being locked by cam slots 33d in vertical plates 16d and by cam slot 32ab, and by pintle 33'b to disks 32aa, the driving-shaft drum 24a must rotate the disks 32aa and the drive shaft 29a, and also like disks 32aa (not shown) at the other end of the intermediate section of shaft 29 and cause the return stroke of the two pistons, not shown, in the same manner as the return stroke of piston $a^2$ was caused as above described by rotation of shaft 29a by piston shown. As reversing drum 34a is thus carried by the second half rotation of disks 32aa by drive-shaft drum 24a, back to the position shown in Fig. 7, but without rotation on its journal section 33a, straps 36a will be wound up again on reversing drum 34a, the pull of the strap in so winding helping to pull disks 32aa around with driving shaft drum 24a.

Because of the lenticular section 32' of the cross-bar of the elbowed U-member travels with driving-shaft drum 24a during this driving half-rotation, there is no friction between it and drum 24a at this time nor between any of the parts causing disks 32aa to rotate with driving-shaft drum 24a except the slight friction between rolls 33'd and the wall of slot 33d because the parts between drum 24a and disks 32aa are all locked against motion relative to each other and although there is some friction between these parts during the unwinding or counterclockwise motion of reversing drum 34a, the only pressure the parts are then under is due to the friction of the pistons and the compression pressure in one cylinder which is very small compared to the power and strain in the driving instead of the driven rotation of disks 32aa.

Lubricating features of Figures 10 and 10a

Where lubricant is to be supplied between the adjacent faces of superposed straps applied to stepped, walled recesses, as in Figs. 10 and 10a, the steps of the walls may be deepened by the thickness of the oil film which permanently separates the faces while the lapping edges of the straps or bands will directly engage the periphery of the step tread and force out any oil. The lubricating means shown in Fig. 10 comprises a hollow interior of pulley 22a constituting an oil chamber, the body of said chamber communicating with a radial cylindrical extension thereof when a plunger $d^{10}$ is partly withdrawn by an eccentric disk $d^9$ secured to shaft 17b, having an annular groove $d^8$, engaging a pin on the side of the plunger.

As pulley 22a turns alternately a half rotation in each direction, this plunger is withdrawn to admit oil to the cylindrical extension and forced forward driving the oil out through a common channel $c^{10}$, to branch channels $c^{11}$ to $c^{15}$, each located back of the end of a strap 23a, and between the outer face of said strap and the inner face of the next overlying strap. It also forces the oil to a lateral outlet at $c^{16}$, from pulley 22a to a short pipe section $c^{17}$ which has a swivelling connection with the upper end of a curved pipe $c^{19}$, the lower end of which has a like swivelling connection $c^{18}$ with a like short section $c^{17}$ leading to a like common channel $c^{16}$ in drive drum 24a similarly leading to a like series of distributing channels $c^{11}$ to $c^{15}$ each discharging between the other ends of two of the superposed straps 23a. In drive drum 24a is a like pump plunger $d^{10}$ for forcing the oil from $c^{16}$ to the distributing channels. This plunger, however, plays through the outside of drive drum 24a and is operated by an anti-friction roller journalled thereon, that engages a cam track $d^{12}$.

It is to be remembered that pulleys 22a and driving drum 24a make only half rotations in opposite directions and the swivel mountings and the curve in pipe $c^{17}$ permit this without interference. While return check valves for pumps $d^{10}$ have not been shown because the outflow is when the straps are relaxed and therefore against small pressure while the belts are tightly compressed during the back strokes of the pump and there will be little suck-back, it would be obvious to supply one in the plunger of pulley 22 or in channels $C^{17}$.

In Fig. 10a the means for injecting oil between the superposed straps is shown as an internal oil chamber in reversing drum 34a, having a shallow semi-annular extension to the right partly surrounding journal section 33a on which drum 24a makes a half rotation counter-clockwise, from the position shown in Fig. 10a, causing the oil chamber to pass beyond a vane $d^7$ projecting from shaft 33 which vane then sweeps oil into and through the semi-annular extension $d^6$ into a channel $d^5$ communicating with the channel $c^{16}$ which is common to distributing channels $c^{11}$ to $c^{15}$ exactly similar to those shown in Fig. 10 in pulley 22a and driving drum 24a. There are two of these vanes $d^7$ diametrically opposite each other in journal section 33a and each is depressible against the force of springs at the bottom of radial recesses in journal section 33a in which said vanes are mounted. Semi-annular channel $d^6$ tapers out at the right-hand end forming a cam surface which depresses the right-hand vane $d^7$ when reversing drum starts its rotation counter-clockwise.

As has been above stated reversing drum 34a does not rotate relatively to journal section 33a in a clockwise direction, but together they make a half-rotation as 33a is revolved with disk flanges 32aa, during a power stroke of one of the engine pistons. A check valve is shown at the inlet end of channel $d^5$ to prevent any return flow of oil and to illustrate its possibility of application in other figures. The contact between the superposed straps six bands is so close that capillary attraction is believed to feed the oil supplied by the pumps which are regarded rather as a source of supply to the capillary spaces than as feed forcing means.

Description of features shown in Figures 11 and 12

Figs. 11 and 12 are fragmentary views illustrating another means of mounting a strap driven drum (whether it be driven directly by straps connected to a piston as drum 19a of Figs. 1, 2 and 3, or through engine shaft pulleys as 22 in Figs. 1 and 5, or 22a in Figs. 7 to 10) which drum is permanently concentric to the driven shaft. Assuming drum 24b in Figs. 11 and 12 to be the equivalent of either drum 19a of Figs. 1 and 2, or 19 of Figs. 4 and 5, or 24a of Figs. 9 and 10a, then shaft sections 29b (Fig. 11) are the equivalent of shaft sections 17 of Figs. 1, 2 and 3, or 29 of Figures 4 and 6, or 29a of Figs. 7 to 10a, disks 32ab are the equivalent of 32o of Figs. 1 to 3; 32a of Figures 4 to 6; 32aa of Figs. 7 to 11. In Figs. 11 and 12 the disks 32ab are rigid with each end of a shaft section 29b and each is connected to another spaced shaft section 29b by a journal stub 33b or crank pin which is rigid with a crank arm on said spaced shaft section. This crank pin or journal stud 33b projects through an aperture of greater diameter than 33b in disk 32ab and reversing drum 34b has a sleeve-hub 33b' not only rotatably mounting it on crank pin 33b but also constituting a journal in the enlarged aperture in disk 32ab and extending beyond this disk and carrying a drum 27ba which serves the same broad function as roller 27b in Figs. 7 and 9 in that it controls the rotation of drive drum 24b which is mounted on the intermediate shaft section 29b, by means of a series of endless superposed straps 26'b belting it to drum 27c integral and concentric with drum 24b, said straps 26'b being anchored as shown at 26'c at one point to each drum.

In these figures reversing drum 34b is shown with a chain receiving and fitting peripheral groove and a chain 36b having one end secured to 34b, runs to a clevis rotatably mounted on a shaft 37b having end rollers travelling on a track 38.

The proportions of the pitch diameters of 34b, 27ba, 27c and of the radial distance of axis of crank pin 33b from that of shaft sections 29b should be such that one semi-rotation of disk 32ab clockwise from the position shown in Fig. 16 will reversely rotate drum 24b counterclockwise, a semi-rotation winding up plural straps 23b on drum 24b. If then straps 23b be forcibly pulled to unwind and rotate drum 24b clockwise said drum will through straps 26'b tend to rotate reversing drum 34b, likewise clockwise, but as chain 36b will not permit this unless drum 34b can wind up chain 36b and approach track 38, bands 26'b must pull crank-pin 33b and with it disks 32ab and the crank arm of the crank-pin and therewith shaft sections 29b around with drum 24 and rewind chain 36'b on 34b to the position shown in Fig. 11.

Pivotally mounted on shaft 37b are triangular heads EE, having an extended arm E' overlying journal studs 33b, 33b and maintained in horizontal position by rollers $F^2$ and $F^3$ spaced respectively above and below shaft 37 and engaging the back of tracks 38. This arm will be engaged by studs 33b in the course of their revolution and will raise shaft 37 and avoids the additional strain on the chains 36b of causing shaft 37 to follow the vertical part of the travel of drum 34b in its revolutions. Of course this lifting means may be applied to shaft 37 in any of the constructions shown in Figs. 1 to 10.

*Description of structure of Figs. 13 to 30*

Fig. 13 shows four cylinders A, B, C, and D, the pistons a, b, c, and d of which have each a semi-cylindrical extension as shown in Fig. 17 and are secured in pairs a, b, and c, d, respectively to semi-cylindrical hollow head beams 18x, 18x, which are each recessed on their diametrical faces to receive a bar 21x to which is rigidly secured one end of a thin metal band or strap 20x the other end of which is wound partly around and secured to a driving drum 19x which is mounted to rotate freely on the through engine shaft 17x; there being two of these straps 20x and drums 19x as shown in Fig. 13. These two drums operate alternately to rotate shaft 17x through the double internally toothed gear 32x (see Fig. 15) keyed to shaft 17x by means which will be described later. Beyond at the right and left of each head beam 18x is a separate auxiliary head beam section 18' 18' and each head beam 18x is alternately connected and made rigid with either the auxiliary head beam section at the right and freed from that on the left, or connected to that on its left and freed from that on its right, (as best shown in Figs. 21 and 22) by an automatically reciprocating shuttle beam $18x^2$. The purpose of these auxiliary head beams 18' 18' is to equalize the strain upon the strap or band 20x of the explosion stroke of one piston of each pair and to prevent the frictional resistance of the other piston of the pair (which would then be making its suction stroke) from tending to tilt the head beam 18x and cant the pistons in their cylinders. To this end, on the power stroke of piston a, for instance, head beam 18x should be coupled, as shown, to the left-hand auxiliary head beam and on the power stroke of piston b, it should then be coupled to the right hand auxiliary head beam. There might be a strap or band for each of the auxiliary head beams, separate from that for the middle head beam 18x but for the purpose of maintaining the alinement at all times of the auxiliary head beams 18' with head beam 18x, I prefer to provide a single band 20x as wide as the three head beams 18', 18x and 18' and connected in one line with all three. The shuttle beam $18x^2$ is reciprocated as follows. Shuttle beam $18x^2$ is hollow (see Fig. 21) and slotted at 18y on its lower side to receive the upper part of two idle wheels 119 which are journalled on the underside of head beam 18x (which is also slotted to permit said wheels to project through into the shuttle beam $18x^2$). On the inside of the shuttle beam are two steel straps 120, 120 (which may be made of watch springs). To each end of the shuttle beam $18x^2$ one end of one of the straps is secured and these straps then pass in opposite direction over said wheels respectively and depend from the head beam 18x so that a pull upon one strap 120 will project the shuttle beam beyond one end of head beam 18x into the adjacent auxiliary head beam 18', and withdraw it from the other auxiliary head beam and a pull upon the other strap 120 will reverse the relations of the shuttle beam to the auxiliary head beams. To cause this pull, each strap 120 is provided with a spring stop 121 (see Figs. 24 and 22) and the straps 120, 120 pass down upon opposite sides of an intermediate slide 122 and between it and an opposing slide 123. These slides 122, 123, 123 are rigidly guided horizontally as shown in Figs. 17 and 23 and the slides 123, 123 are connected to each other by a rod 124 (passing through 122) so that they move together. The positions of these slides are determined by a roller 125 on a crank arm rigid with a shaft 127 which is also rigid with the idler wheels 119, 119, so that the position of said roller is determined by the position of said idler wheels. As best shown in Fig. 22 when the shuttle beam $18x^2$ is projecting to the fullest extent into the left hand auxiliary head beam 18' the roller 125 is to the left and slightly below the level of its shaft 127 and, as shown in Fig. 13 at the end of the descent of the head beam 18x, on the power stroke of piston a, this roller is brought, by the descent of the head beam 18x, between and into engagement with large rollers 128, 129 mounted respectively on left hand slide 123 and intermediate slide 122, thus forcing these slides equally apart but as left hand slide 123 is connected to right hand slide 123 the latter is also moved and being on the other side of slide 122, these two are caused to approach closely toward the right hand band 122 just above the yielding stop 121 thereon. Upon the ascent of head beam 18x (which is caused, as will be later explained, by the power down-stroke of piston c), the engagement of stop 121 on right hand band 122 with the under side of slides 122 and 123 will hold said band and the lifting of idler wheel 119 with head beam 18x will cause the end of said band which is secured to the left-hand end of shuttle beam $18x^2$ to move said shuttle beam out of the left-hand auxiliary head beam 18' and into the right-hand auxiliary head beam. This lift of head beam 18x produces the compression stroke of piston b, but the parts are so proportioned that shuttle beam $18x^2$ has completed its movement before the greatest degree of compression occurs and while there is little resistance to the travel of the shuttle-beam, while after the shuttle-beam has completed its stroke, the yielding of spring supported stop 121, permits further upward movement of the head beams 18x, 18', 18', without further sliding movement of the shuttle-beam $18x^2$. On the next descent of the head-beams 18x the roller 125 having been swung over to the other side of shaft 127 by the rotation of said shaft 127 by the turning of idlers 119 through the band 120 said roller will engage between the intermediate slide-roller 129 and the right-hand slide roller 128 and shift the slides 122, 123, 123, so that the left hand band 120 will be held by its stop 121 as shown at the right in Fig. 13. To prevent slides 122, 123, 123 from slipping out of the positions alternately given them as above described they have, as shown in Fig. 21, notches 122a, 122b, and 123a, 123b in their sides which are alternately engaged by V-ended spring latches 122c and 123c respectively.

I have suggested and shown the use of watch springs for straps, because they can easily have the spring temper reduced throughout the greater part of their length if desired, leaving a tendency of their free ends to coil up out of the way as shown, when the head beam carrying them is in its lowered position, while such coil as remains uncoiled when the head beam is raised is not likely to pull out from between slides 122, and 123.

The driving drums $19x$ alternate with each other in turning the engine shaft $17x$, and alternately shaft $17x$ while being turned all the time by one or the other of said drums in one direction, turns the drum which at the time is not turning it, in the opposite direction and thus through straps $20x$ raises two pistons $a$, $b$, or $c$, $d$, for their scavenging and compression strokes. Shaft $17x$ both is turned by one drum and turns the other drum through a double internally toothed gear wheel $32x$ keyed thereto between the two drums $19x$, $19x$, as best shown in Fig. 15. Each of the drums $19x$ has a reduced extension at the end adjacent gear $32x$ which not only projects under one of the overhanging toothed rims of gear $32x$ but also projects a little into the hub of this gear. Between each of these drum extensions and said overhanging toothed rims are a series of planetary pinion-gears $34x$, rotatable on spindles $33x$ whose ends are secured as by riveting or spot welding in two rings $34cx$ spaced to receive the pinions $34x$ and constituting a planetary pinion carrier. Between the rings of this planetary carrier, a sun gear $26x$ is keyed to the drum extension, to mesh with the planetary pinions $34x$ which in turn mesh with the inturned teeth of the rims of the gear $32x$. The journal portions of the spindles $33x$ of the planetary pinions $34x$ (see Fig. 16) are enlarged, and are recessed eccentrically throughout their length to receive cam-clutch rolls $33x'$ which are themselves eccentrically drilled as are the rivet-ends of the spindles to receive pins to so pivot said cam-clutch rolls eccentrically that any counterclockwise rotation of the planetary pinions, due to a clockwise movement of sun gear $26x$ (as shown in Fig. 16 or 19) is prevented by the jamming of the cam-clutch rolls in the hubs of the pinions, while a clockwise rotation of the planetary pinions by a clockwise rotation of the internally toothed gear wheel $32x$ will rotate the pinions $34x$ freely on their journals and this will rotate the sun gear $26x$ counterclockwise, unless the planetary pinions $34x$ and their carrier are free to revolve clockwise with the internally toothed gear $32x$. The secondary pinions $34x$ and their carrier are alternately prevented from rotation by stop arms $38x$ (see Fig. 19) pivoting on a shaft $38x$ (see Figs. 13, 14, 17) which successively engage radial inverted L-shaped arms $38x^2$ projecting at four equally spaced intervals from the planetary pinion carriers.

As appears from Figs. 13, 14, and 17 the effect of a power-stroke of any of the pistons $a$, $b$, $c$, or $d$ is through one of the straps $20x$ to rotate the corresponding drum $19x$ clockwise as it is shown in Fig. 17 and therefore to rotate the sun gear $26x$ on that drum also clockwise as correspondingly shown in Fig. 19. As just above explained since planetary pinions $34x$ cannot rotate counterclockwise they and their carrier must travel with this sun gear $26x$ and must carry the internally toothed gear $32x$ with them and as gear $32x$ is keyed to the engine shaft $17x$ that shaft must be rotated by one of the drums $19x$ upon every power stroke of any of the pistons.

But while one of the two internally toothed rims of the gear $32x$ impelled by one of the drums $19x$ is thus rotating the engine shaft $17x$ the other of said toothed rims, reversely rotates the other drum $19x$ to wind up its strap and return its pair of pistons. For one of the radial arms $38x^2$ on the planetary pinion carrier is then engaged with stop arm $38x$ and as the planetary pinion carrier and its pinions cannot travel with the sun gear $26x$ the pinions $34x$ rotate clockwise on their own axes and rotate that sun gear $26x$ counterclockwise and so wind up strap $20x$ and carry that piston pair upward, on the scavenging stroke of one piston and the compression stroke of the other.

Each drum $19x$ has an end flange with a shoulder $19x'$ (see Figs. 18 and 19) so placed that when a piston pair has completed its upward stroke this shoulder engages a downward projection on stop arm $38x$ and shifts the stop arm out of the path of radial arm $38x^2$ of the planetary pinion carrier. To facilitate the disengagement of these arms the abutting end of stop arm $38x$ is recessed to receive a roller, whose pintle ends engage loosely in vertical slots in the recess walls while its periphery rolls on the bottom of the recess as the arm is raised until the axis of the roller rises above the upper edge of the radial arm $38x^2$ when the roller snaps up out of the way, as the stop arm completes its lift.

To lessen, or share the strain, upon the teeth of both the gears and of the panetary pinions I have also shown in Figs. 15, 16, and 19, a roller clutch arrangement, between the reduced extension of each drum $19x$ and both, the double gear wheel $32x$ and the planetary pinion carrier disks $34ax$. To this end cam recesses $f$ are formed in each drum extension and cam rollers are mounted therein which project into the hub of gear $32x$ and underlie both the carrier disks $34cx$, $34cx$. The sun gear $26x$ is recessed opposite each cam roller so as not to interfere with the protusion of such cam rollers.

The gear $32x$ between its internally toothed rims has a toothed periphery which meshes with a gear 300 on the cam shaft which controls the engine valves as shown in Fig. 17.

It is obvious that the planetary gearing between the drums $19x$, $19x$ and the shaft $17x$ permits a wide variation as to the degree of rotation which may be given the shaft $17x$, by each piston power stroke. As illustrated, each piston stroke is equal to one-fourth of the periphery of drums $19x$, $19x$ so that the four strokes of a four stroke cycle are necessary to complete a rotation of shaft $17x$, but obviously the piston stroke may equal any selected proportion of the circumference of the drum $19x$, if the number of arms $38x^2$ be made to accord.

The speed of the shaft, $19x$ because the drum, the sun gear, the planetary pinions, and the internal gear travel as a unit during a power stroke is that of the power stroke of the piston, but the reverse rotation of the drums and the consequent return of the pistons will be faster by the proportions between the planetary pinions and the other gears. In the present illustrations the proportions of internal gear, pinions and sun gear are 6, 1, 4, and therefore the return piston strokes are made in two-thirds the time of the power and suction strokes and the cam-shaft timer and gearing is so set that a cylinder fires, when the piston of the precedingly fired cylinder has made five-sixths of its stroke, and the said piston completes its power stroke and then its return stroke, when the piston of the last fired cylinder has only made five-sixths of its power stroke. The proportion of cam-gear to the peripheral gear of the internally-toothed gear $32x$ is therefore 5 to 6; there being one complete rotation of the engine shaft $17x$ for the complete cycle of four cylinders.

To facilitate assembly and disassembly of shaft $17x$, the drums $19x$ and the gears, shaft $17x$ is shown in Figs. 15 and 20 as made in two sections the adjacent ends of which are quartered into lapped quadrants each of which is keyed to the inside of the hub of gear $32x$.

Although both the drums $19x$, $19x$ and the pistons are hollow and are to be as light as possible there will be a certain amount of momentum of each at the end of each power stroke as the drum just directly rotated is checked by the stop arm $38x$, acting through the planetary carrier and the pinions $34x$ when the double gear $32x$, continuing its rotation rotates the pinions; and starts to revolve the drum $19x$ reversely. To absorb this momentum and to some extent reverse its direction, I have added the following features. Each end flange of each drum $19x$ (see Figs. 17 and 19) has not only a backwardly facing shoulder $19x'$ but on the opposite side of the same projection a forward radial face $19x^2$. When a piston has completed its down stroke this radial shoulder occupies the position shown in Fig. 17 (in dotted lines because obscured by other parts; the one shown in full lines being that of the far drum whose piston is just completing its upstroke.) Before reaching this point radial shoulder $19x^2$ has encountered a wrist pin 400 (see Fig. 18) which, when first engaged, is in the position shown in said figure. This wrist-pin is carried by the longer arm 401 of a pair the other arm 402 of which is supported by a wrist 403 constituting a supporting journal for the pair, and having a down turned end on which is adjustably secured a weight 404. The other ends of these two arms 401 and 402 are connected by a cylindrical member 405 which rolls on the vertical face of a rigid standard 406 (see Figs. 13 and 18). The supporting journal 403 is rotatable in a rocking standard 407 secured in place but permitted to have a certain amount of rock by two straps each secured at one end, near opposite side of the standard 407 and traversing an arcuate under surface thereof in opposite directions, and their opposite ends being secured to the engine base. The arc of the rocker base is concentric with the journal 403 so that said journal moves on a straight line horizontally like the axle of a wheel as said standard 407 rocks.

This double crank checking mechanism, shown in Fig. 18 for one end flange of one drum $19x$, is duplicated for the other end flange of said drum and these two double arms are connected by a shaft 408, carried by a crank arm 409 which supports said shaft in alinement with the journals 403. Each drum $19x$ is provided with this check mechanism.

When the shoulders $19x^2$ of a drum $19x$ engages a wrist pin 400 (then in the position shown in Fig. 18 and at the right in Fig. 13), it swings the double cranks 401, 402 about the journals 403, but as the weight 404 tends to oppose such swinging the standard 407 rocks on its arcuate base and causes the cylindrical connection 405 to bear and rock on the fixed standard 406 as the arms 401, 402 swing from the vertical position in Fig. 18 and at the right in Fig. 13 to the horizontal position shown at the left in Fig. 13 and in dotted lines in Fig. 17. The peripheries of wrist pin 400 and of the cylindrical connecting member 405 are so proportioned to the distance of their axes from the journal 403 that they rock without other than rolling friction on the shoulder $19x^2$ and the fixed standard 406 respectively.

The vertical position of the weight carrying ends of journals 403 causes the cranks to yield easily at first to the pressure of the shoulders $19x^2$, but as the weight begins to lift it offers greater and greater resistance until it completes ninety degrees of swing, when wrist pin 400 and cylindrical part 405 come into the same horizontal plane and afford a positive block to any further movement of the drum and piston in that direction, while the weight then tends to start motion in the opposite direction and facilitates the reverse rotation of the drum $19x$ which effect may be speeded up by a spring bumper engaged by the weight at its highest position, see 409 in Fig. 13.

At the right in Fig. 13, in Fig. 17 and in detail Figs. 25 to 29, I have shown a modification of the antifriction support for the driving drum shown in Figs. 1, 2, and 3 which consists in dividing the rolls transversely into sections $200^1$, $200^2$, $200^3$, $200^4$, $200^5$, $200^6$ of which five are offset backwardly from the next preceding, one-sixth of its diameter followed by sections $200^7$, $200^8$, $200^9$, $200^{10}$, $200^{11}$, each offset one-sixth forwardly from the next preceding one so that $200^1$ and $200^{11}$ are in line and have their journals ending in pintles connecting links which links connect a series of rows of such displaced sections, and which links as shown do not necessarily form a closed circuit, such as shown in the preceding figures.

The journals of these sectional rolls are formed as shown in Figs. 26 to 29 but as shown in Fig. 30 and may be gathered from Fig. 17, the axes of these offset journal sections define points in short arcs which lie between the curve of drum $19x$ and that of concave support $202x$ and are concentric with both. It will be noted that every second journal has a polygonal extension of its own length at each end and every other journal section except the end ones have two flat-sided grooves, to receive such extension and the flat sides of one groove are not parallel to the flat sides of the other groove but are slightly canted, and the same is true as to sides of the polygonal extensions so as to bring the axes of the journals into an arc from $200^1$ to $200^6$ and back in the same arc from $200^6$ to $200^{11}$.

The purpose of this dividing the roll into offset sections is to avoid spacing the lines of contact of the rolls peripherally of drum $19x$, by at least the diameter of the rolls as would otherwise be the case. It is advisable to use large rolls say at least an inch in diameter. If they were the length of drum $19x$ there would be a space of more than an inch between the line of contact of each roll with the drum and that of the adjacent roll, with a tendency for the drum, under great pressure to crowd down between the rolls and force them apart. In the construction shown the lines of contact with inch rolls would be but one-sixth of an inch apart. While the lines of contact longitudinally of the roll are broken, that is immaterial because any deflection transverse to the length of the drum if it occurred would not retard rotation as would a deflection of the circle of the drum. It is believed that it is the spacing peripherally of a bearing of balls and rollers that causes the well known hammer action of high speed bearings when there is great transverse strain.

Figs. 31 to 34 show a substitute for the piston movement equalizing means of Figs. 13 to 30, the substitution comprising a hollow head-beam $18y$ for each pair of pistons $a$, $b$, and $c$, $d$, extended at each end beyond the piston pair and having a rearward extension $18y'$ of semi-cylindric cross section of the same length as the semi-cylindric part of the pistons and parallel thereto and further extending in a cylindric cross section which slides in and is guided by renewable sleeves $18y^2$ mounted in lateral extensions of the cylinder castings. At the upper end of the semi-cylindrical part of each of these guide extensions as shown in Fig. 34 is a narrow transverse opening through which is passed the end of a thin steel strap $20'y$ which is held clamped and distorted against the outwardly curved wall of $18y'$ by a clamp-bar $18y^3$ pressed by a set screw $18y^4$. The driving drum $19y$ of these figures corresponding to $19x$ of Figs. 13 to 30, is extended at each end beyond the width of its driving piston-connected strap $20y$ shown in Figs. 33, and straps $18y^2$ are partly wound on each such extended end of drum $19y$ as shown in Fig. 34, but in the opposite direction from the winding of strap $20y$ in Fig. 33.

In the constructions shown in Figures 31 to 34, the drums $19y$ may have the same connection to driving shaft $17y$ by end-gears, planetary pinions and intermediate double internally toothed gears and the same cam-roller clutch journals, planetary carrier, stop arms, and stop lifting cams on end flanges of the drum $19y$ as above described in connection with Figs. 13 to 30 as Figs. 31 and 32 purport to show, while Fig. 33 indicates by the double contact arms that the planetary gear control is of the type next shown in Figs. 35 and 39 to 42.

The drums $17y$, $17y$ are also supported by an adjustable concave surface and interposed staggered roll-sections $200^1$, $200^2$ etc. but in these figures the roll chains are shown connected to form a closed circuit.

It seems obvious that the rear guide extensions $18y'$ of head beams $18y$ will assist in maintaining the alinement of travel of the piston of each pair which will of itself tend to make their movements coincide, but the latter is assured by the strap $20'$ secured to each guide extension $18y'$ because the down stroke of either piston through strap $20y$ must turn the drum $19y$ as a whole and the connection of said drum through strap $20'y$ to guide extension $18y'$ adjacent the other piston of that pair compels it to move simultaneously and to the same extent. Of course on the return stroke the straps $20y$ common to both pistons moves the common head beam $18y$ evenly throughout its length, but even on such return stroke straps $20'y$ will tend to prevent uneven stretching of strap $20y$.

In Figs. 35 to 42 are shown another form of control of a planetary pinion mechanism for alternately rotating a shaft by a piston pair and causing the return movement of such piston pair, and also another form of piston motion equalizing means.

*Piston movement equalizing means of Figures 35 to 38*

Fig. 35 shows each pair of pistons $a$, $b$, and $c$, $d$, rigid with a hollow head-beam $18b$ or $18d$ of truncated segmental form as shown in Fig. 36, and to each of which head-beams is secured as desired one end of a band $20y$ partly wound on and secured at its other end to one of the drums $19y$, which drum, as in Figs. 31 to 34, is longer than strap $20y$ is wide and similarly has reversely wound thereon, (see Fig. 36) six superposed straps $20y^1$, $20y^2$, $20y^3$, $20y^4$, $20y^5$, and $20y^6$, secured at one end to the said drum $20y$ and thence running upward to the top of rearward vertical extensions $18b'$ or $18d'$ of the respective head-beams $18b'$ or $18d'$. These extensions are forked or recessed at their upper ends as shown in Figs. 35 and 38 and also the forked part projects rearwardly to overhang drums $19y$ and have grooved concave upper surfaces in which roll a series of rollers as shown in Figs. 36, 37, and 38. Mounted upon these rollers to rock thereon is a body $a^{20}$ having hollow completely cylindrical ends, connected by a shell portion, shown section-hatched in Fig. 37, of the same outside periphery as the ends, but only extending about two-thirds of this circumference but on the inside hollowed out to a greater amount than the ends, to leave an annular space between such shell and a like shell part of a like smaller body $a^{21}$, whose ends rotatably fit within the cylindric ends of $a^{20}$, and whose shell part similarly leaves a space between its inner face and a cylindrical pin $a^{22}$ whose ends similarly rotatably fit within the ends of $a^{21}$. The inner surfaces of the shell portions of $a^{20}$ and $a^{21}$ merge into reverse curves which intersect their outer peripheries. Over the outer periphery of each of the shells and of pin $a^{22}$ is looped one of three attaching straps $20^7$, $20^8$, and $20^9$. The end portions of these attaching straps are brought parallel and each carried along the outer faces of one of three pairs of spacing blocks $a^{24}$ and an inturned end of the strap hooked into a groove in such block.

The spacing blocks $a^{24}$ of the outer pair and $a^{25}$ of the intermediate pair have inwardly deflected lower portions ending in opposed parallel faces, the intermediate pair being shorter and nested between the blocks of the outer pair. Straps $20y^1$ and $20y^6$ extend up past the parallel end faces of blocks $a^{24}$ and have end hooks engaging grooves in the inner faces of the inbent portions of blocks $a^{24}$, and straps $20y^2$, $20y^5$ are similarly attached to intermediate blocks, $a^{25}$, $a^{25}$. Nested between blocks $a^{25}$, $a^{25}$ are a pair of blocks $a^{26}$ between which are carried up the innermost straps $20y^3$, $20y^{24}$ whose ends are outturned and then hooked into the upper ends of blocks $a^{26}$, while loop attaching strap $20^9$ passing over pin $a^{22}$ has its ends hooked into the lower ends of blocks $a^{26}$.

It is apparent that the facility for easy rocking of the body $a^{20}$ on its supporting rollers will fully equalize all strains between the straps of any connected pair such as $20y^1$, $20y^6$, or $20y^2$, $20y^5$, or $20y^3$, $20y^4$, and that any slight disproportion between the strains of one pair and those of another pair (which can, however, be avoided by proper portioning of $a^{22}$, $a^{21}$ and $a^{20}$ to each other) will be adjusted by the relative rotatability of the solid end parts of $a^{20}$ and $a^{21}$ to each other and to pin $a^{22}$. Because of the spread between straps $20y^1$ to $20y^6$ and their looped attaching straps $20^7$ to $20^9$, there is a tendency for blocks $a^{25}$, $a^{26}$, $a^{27}$ to tilt and bring their diagonals, instead of their outer faces, tangential to $a^{20}$, $a^{21}$, and $a^{22}$, and to prevent this, I have provided rollers $a^{28}$ engaging the outer faces of looped attaching straps $20^7$ and holding all the spacing blocks parallel. These rollers are pivoted in cross arms $a^{29}$ recessed into the inside walls of the forked part of head-beam extensions $18b'$.

The piston power transmitting and piston returning means shown in Figs. 35 and 39 to 42 involves:

Planetary pinion clamping and locking means.

The construction in Fig. 35 involves many elements, fully above described in connection with Figs. 13 to 30, comprising two pairs of pistons, each pair connected to a common head-beam, each strap connected to a drum, both drums having a gear at the adjacent ends, and a double internal gear with a middle external valve shaft operating gear on the driving shaft between the drums and system of planetary pinions between the double internal gear and the gears on the adjacent drum ends, so that alternate rotation of each drum by one of a piston pair, rotates the drive shaft through such gearing, and through the same gearing the drum not being rotated by a piston pair is turned oppositely to give its piston pair their return stroke.

The difference of the constructions of Figs. 35 and 39 to 42 from that of Figs. 13 to 30, lies in the means for preventing the rotation of the planetary pinions on their own axis during the power rotation of the drum, so that the driving drum gear, the planetary pinions and the double internally, toothed gear and the driving shaft rotate as an integral whole, but which rotation preventing means releases the planetary pinions for independent rotation on their own axis when the revolution of planetary pinion series and its carrier are checked at the end of the power rotation of a drum. In Figs. 35, 39, 40, 41, and 42 this means for preventing individual rotation of the pinions is a pair of toothed concave blocks $33y'$ (shown cross-hatched in Fig. 39) and $33y^2$ (unhatched in Fig. 39), one block on each side of each pinion. There being six pinions, there are six of these blocks $33y'$, the ends of which, that are severed by the plane of section in Fig. 39, being secured to or integral with a pair of rings $33y^3$ (seen at the left in Fig. 40), which rings are thus both united and held spaced apart by their rigid connection with the ends of the blocks. The six alternating blocks $33y^2$, at their far ends as they appear in Fig. 39, are similarly connected to a pair of rings $33y^4$, shown in Fig. 40. (See also Fig. 41 for the alternate connection of these blocks to rings $33y^3$ and $33y^4$.) Between the rings of each pair $33y^3$ and $33y^4$, run spaced rings $33y^5$ which, being united by the journals $33x$, constitute a planetary pinion carrier. At diametrically opposite points the rings of the planetary pinion carrier are also connected to each other by blocks $33y^6$ in which are radially journalled stud shafts $33y^7$ of slightly bevelled pinions $33y^8$. These pinions at opposite sides of each engage short sets of rack teeth on the inner faces of the outer rings of each ring pair $33y^3$ and $33y^4$, so that if either ring pair be turned, the other ring pair will instantly turn in the opposite direction and therefore the toothed concave faces of their respective connection blocks $33y^1$ and $33y^2$ will be closed upon or freed from the teeth of adjacent pinions 34$6$.

The ring pair $33y^4$ has four equally spaced angle arms $33y^9$ which project radially beyond and then across a rim of the internally toothed gear and normally are each spaced a little in advance of a like angle arm $38x^2$ projecting from the planetary carrier (just as in the construction shown in Figs. 13 to 19) by an interposed spring $33y^{10}$.

In these Figures 35, 39 to 42 it is an advance arm $33y^9$ that engages and is stopped by stop arm $38x$ (see Figs. 35 and 39) and through the spring $33y^{10}$ yieldably checks angle arm $38x^2$ of the planetary pinion carrier. This consequent relative backward movement of arm $33y^9$ and ring pair $33y^4$, through bevel pinions $33y^8$, causes a forward movement of ring pair $33y^3$ and their respective toothed blocks $33y^2$ and $33y^1$ are thus spread away from the pinion $34x$ as indicated in Fig. 39 (though not to the extent there shown, a mere clearing of the teeth being all that is necessary).

Fig. 35 shows an internally toothed gear at the outer end of each drum and this gear has been shown in section in Fig. 40. The internal arrangement of the double gear between the cylinder pairs is exactly the same except that with the double gear everything (except the intermediate cam shaft driving gear) is doubled.

The operation of the planetary pinion clamping and locking means of Figs. 35 and 39 to 42 is as follows: During the power stroke of any piston, its head beam and strap $20y$ rotates one of the drums $19y'$ and this drum either through a gear at its inner end carries with it one of the internally toothed rims of a double gear on the drive shaft, or by a gear on its outer end carries with it an internally toothed rim of a single gear, on the drive shaft, or as indicated by Fig. 35 gears at each end of the drum carry with them the internally toothed rims of both such single and double gears on the drive shaft, because at this time the springs $33y^{10}$ (Fig. 39) between arms $38x^2$ on the planetary carrier, and arms $33y^9$ on the ring pair $33y^4$ force ring pair $33y^4$ with its blocks $33y^2$ in a direction to hold the teeth of said blocks in between the teeth of planetary pinions $34x$ on one side thereof while through bevelled pinions $33y^8$ the other ring pair $33y^3$ is held with the teeth of its blocks $33y'$ in between the teeth of the planetary pinions $33x$ on the other side.

As therefore the pinions cannot rotate on their axes they act as so many keys to lock the internally toothed rim of the gear keyed on the drive shaft and the drive shaft to rotate as a unit with the drum then being rotated by one piston. To take some of the strain off the pinion teeth, I have also shown in Fig. 40 that the end of the drum $19y$ may extend into the part of the internally toothed gear and have a one-way roller-clutch engagement therewith, such clutch being also shown in Fig. 39, by breaking away the hub in a different plane.

When a piston has completed its stroke, one of the arms $33y^9$ of the ring pair $33y^4$ engages a stop arm $38x$ as shown in Fig. 39, and being arrested thereby compresses springs $33y^{10}$ shifting blocks $33y^2$ and through bevel pinions $33y^8$ shifting ring-pair $33y^3$ and toothed blocks $33y^1$ away from the planetary pinions as shown in Fig. 39. The compressing of spring $33y^{10}$ also results in stopping arm $38x^2$ and the pinion carrier, so that continued rotation of the drive shaft $17x$ and the internally toothed gear thereon then causes planetary pinions $34x$ to rotate (clockwise as shown in Fig. 39) and this causes the sun gear $26x$ on the drum $19y$ and therefore the drum to rotate in the opposite direction winding up strap $20y$ and returning the piston which has completed its stroke.

This continued rotation of drive shaft $17x$ and the internal gear is of course due to the power descent of a piston of an adjacent pair as has been described for the piston pairs previously described.

Description of structural differences between Figs. 43 to 45 and Figs. 13 to 42.

The general operation of the four cylinder engine shown in Fig. 45 is the same as that of Figs. 13 to 42 and it is only necessary therefore to describe the differences of structure and their operation.

The two pair of cylinders $A^3$, $B^3$, $C^3$, $D^3$, may be cast in a single block but as shown in Fig. 45 it is well to space the pairs somewhat. The pistons $a^3$, $b^3$ are connected to each other; as are the pistons $c^3$, $d^3$, by a rigid head beam 18 which is set into a recess having a slanting upper wall in each piston of a pair and welded there. The front face of 18 is irregular so that the ends of straps $20c$ may be crinkled as they are clamped thereto by a bar $21c$ having a face paralleling the front face of 18. There are three of these straps $20c$ for each piston pair, and the other ends of these three are passed over and rigidly secured to one of the drums $19c$ as explained in relation to other figures. These three straps $20c$ are spaced laterally from each other so that other straps $20y^2$ may have their lower ends pass between straps $20c$ down under the drum and have such ends secured to said drum $19c$. Straps $20y^2$ are shown as each consisting of three straps each having both ends secured to drum $19c$ and their middles looped concentrically about a shaft $a^{37}$ having a core and spaced annular shells partly encircling it, somewhat similar to the arrangement shown in Figs. 37 and 38 and also similar to shaft 37 in Fig. 1 and Fig. 2. The ends of shaft $a^{37}$ journal in the walls of the pistons so that the axis of each piston lies in a transverse plane intersecting the looped straps along their center lines.

As in other figures the drum $19c$ has as shown in Figs. 43 and 44, a reduced extension carrying a gear wheel $26y$ surrounded by an internally toothed gear rim $32x$ keyed to the engine or drive shaft with which it is engaged by planetary pinions $34x$ turning on journal pins of a pinion carrier $34cy$ having a sleeve extension $34cz$, between which and the extension of drum $19c$ is a roller clutch comprising rollers $e$ and cam faces $f$. The outer surface of this pinion carrier sleeve $34cz$ is engageable with a brake-strap E made in two sections adjustably united at one end by a screw F and at their other ends by a self locking toggle joint comprising a lever link G and a connecting link which swings past dead center when the brake band is fully contracted. Each half of the brake band is pivoted at $E'$ to one of a pair of opposed arms $E^3$, $E^3$ pivotally mounted at $E^4$, $E^4$ on the engine frame, said arms being connected to each other about their pivots by crossing straps $E^5$ so that both arms must move equally and simultaneously compelling both brake strap sections to engage and release simultaneously.

The lever link G of the toggle has a cam curve on its back and a slanting cam face on its end. A roller H is carried by an arm $H'$, (see Fig. 45) on drum $19c$ in such position that at the close of the power stroke of a piston, as shown in Fig. 43, it engages the cam surface on back of lever link, contracts the brake-band and locks it closed. While upon the return stroke of this piston a roller $H^2$ secured on head beam 18 engages the slant end of lever arm G and throws out said lever arm releasing the brake.

Upon the power, down-stroke of any piston its straps $20c$ turn its drum $19c$ and its gear $26x$ clockwise as shown in Fig. 43. The friction of planetary pinions $34x$ on their journal pins causes them to tend to move collectively and bodily and carry their carrier with them and also the internally toothed gear $32x$ and therefore the shaft $29x$. If the resistance of shaft $29x$ overcomes the friction of pinions $34x$ on their journal pins, the effect of their rotation on their individual axes, would be to cause them to travel on the internally toothed rim $32x$ in a counterclockwise direction, which would carry their journal pins and therefore the pinion-carrier and its sleeve $34cz$ also counter-clockwise though at half the speed, but sleeve $34cz$ cannot travel counterclockwise with reference to shaft $29x$ because of the roller clutch and therefore pinions $34x$ cannot rotate on their own axes but must travel bodily with gear $26x$ and drum $19c$ and cause the internally toothed gear $32x$ and therefore shaft $17x$ to rotate with drum $17x$ on the downstroke of either of its pistons.

The arrangement of internal toothed gears planetary pinions and gear $26x$ being provided for each drum and the drums being so arranged that when one drum has its piston pair at the bottom of the stroke the pistons of the other pair are at the top of their stroke range, and the valve gearing and spark turning being such as to impart power strokes first in one of a pair and then in one of the other pair, it is clear that shaft $17x$ being turned by one internally toothed gear rim $32x$ as above described; itself turns the other gear rim $32x$ but shortly after shaft $17x$ begins to be turned by one gear $32x$ from one drum $19c$, the roller H on the other drum engages the adjacent lever link G and closes brake band H and stops that pinion carrier, so that continued rotation of the adjacent inturned toothed rim $32x$ must rotate the planetary pinions in their own axes and rotate the corresponding gear $26c$ counterclockwise rewinding strap $20c$ and returning both pistons connected to that drum.

To take the downward strain of straps $20c$ from shaft $17x$ drums $17c$ are supported on roller 210, rotating freely on a shaft 211 suitably supported at its ends and between the rollers, and may itself rotate.

Obviously other friction means might be substituted for the strap brake shown in Figs. 43, 44, and 45 and Fig. 46 shows as such an equivalent a multiple disk clutch comprising a fixed ring $38z$ with which are interlocked at their outer periphery friction ring disks alternating with friction ring disks whose internal peripheries are interlocked with a sleeve extension of a planetary pinion carrier corresponding to $34cz$ in Fig. 44. At one side of the stack of friction disks is an annulus $h$ carried by looped arms $h'$, $h'$ from a ring $h^2$ rotatably mounted on a sleeve $h^3$ which is rotatable on a flanged pusher sleeve $h^4$. Between the pusher sleeve $h^4$ and sleeve $h^3$ are a series of balls travelling in spiral grooves in the two sleeves so that upon rotation of sleeve $h^3$ the pusher sleeve is moved axially to clamp the friction disks between its flange and annulus $h$. Sleeve $h^3$ has a radially journalled roller $g$ which is engaged by a shoulder $h^5$ on a flange $h^6$ on a drum such as $19c$ in Fig. 45 when the drum has been turned by the descent of a piston, so that sleeve $h^3$ is rotated the clutch disks clamped and the pinion carrier held stationary so that the planetary pinion may be caused to reversely rotate the drum as above explained in connection with Figs. 43 and 45. An opposing stop $h^6$ on the drum flange engages roller $g$ when the drum has been turned back sufficiently and releases the clutch disks.

*General features applicable to more than one of the specific structures disclosed*

It is obvious that the plural strap equalizing means shown in Fig. 7a as applied to driving straps, and that shown in Figs. 36, 37, 38 applied to a piston movement equalizing straps may interchangeably apply to either or to the reversing drum straps of Figs. 1 to 3 or 4 to 6.

Whether a single strap or superposed straps are used in any of the specific applications disclosed I propose to lessen the difference in stress between the inner surface and the outer surface of the drum engaging portion of the strap, due to the difference in distance which such surfaces travel in winding and unwinding, by so tempering, annealing, rolling, heat-treating or otherwise "tensioning" the metal of each strap that it tends to assume the curve in which it lies when wound upon the drum.

In view of the fact that the interposition of caoutchouc between moving parts of "antifriction" bearings is now well known and the theory that the elastic resistance of the rubber is not friction, is generally accepted, I regard the substitution of a thin layer of caoutchouc vulcanized or otherwise made rigid with adjacent surfaces of said straps are the equivalent of interposing lubricant between them and therefore the term antifriction when used hereinafter is meant to include such equivalent.

An especial peculiarity inherent in this means of producing rotary motion in each of the forms disclosed is its effect upon the mounting of the rotary parts and the means which thus permits to be employed for lessening friction in such mountings.

Where there is both an engine shaft and a drive-shaft with a drive band from one to the other (see Figs. 4 to 10) the stress of such band tends to draw them diametrically toward each other so that the force exerted on either is necessarily exactly equal to and counterbalances the force oppositely exerted upon the other and an antifriction roller between them is merely subjected to compressive strain which if the roller be strong enough to sustain it without deforming, has no effect to cause friction on the bearings of either the roller or of the pulleys to which the bands are connected; all of which bearings therefore become merely locating devices to maintain the parts in their operative relations instead of sustaining directly the driving force of the engine. Even where the upward power thrust of the piston on the engine shaft is opposed to the pull of the band connecting the engine shaft and the drive (as in Figs. 7 to 10) the two necessarily counter balance each other so long as the engine shaft resists deflection which relieves friction in the driving shaft bearings, which yet does not lessen the counter-balancing of the opposed stresses of the belt upon the two shafts, although it does increase the strain upon the band connecting the shafts. In Figs. 4 and 5 the downward power thrust of the pistons merely tends to increase the pressure upon the roller between the pulleys.

While the driving drum supporting rollers of Figs. 17 and 30, do not serve as antifriction devices between oppositely moving parts yet the peculiarity of the purely tangent application of power to a rotating part (which characterizes all the embodiments disclosed) makes possible and therefore lends function to and makes a new combination with such tangential drive of an open bearing having a limited roller travel-course which does not encircle the axis of the element it rotatably supports and need only define a short arc of less than ninety degrees. By proper vertical adjustment of this open bearing the driving shaft may be exactly centered in its bearings in the engine base and so preserve an oil film completely surrounding said shaft.

It is obvious that any of the drums directly band driven from the pistons in any of the figures might instead be driven by such pulleys 22 and straps 23 in Fig. 4, from an engine shaft instead of directly and that the driving drums 24 of Fig. 4 could be supported by the open roller bearing of Fig. 13 so that the use of interposed rollers as 39 in Fig. 4 does not exclude the use also of the open bearing type.

It is also obvious that the various means for equalizing the movements of the pistons of a pair shown in Figs. 33 to 42 may be applied to the pistons of the preceding constructions 1 to 10.

To the structures shown in Figs. 13 to 46 and particularly in Figs. 43 to 46, the pertinence of the fourth object of the invention, above enumerated is not so obvious as it is to Figs. 1 to 12, but attention is called to the fact that in each of the structures of Figs. 13 to 46 the planetary pinions remain in unbroken and unchanged engagement with both the internal gear on the shaft and the sun gear on the piston drive drum, and whether such planetary pinions can or cannot move bodily is a modification of their structural relation to a fixed point rather than between them and either the shaft or the drum although it affects the functional relation to both, while in Figs. 13 to 42 the means preventing individual axial rotation of the pinions involves a variation of structural relation between them and their carrier rather than between the pinions and the shaft or drum, so that in all these structures even, there is no structural change of the direct connection between the drum and shaft.

I claim:

1. The combination with a shaft of a curved surface member, a flexible member attached to the latter so as to be windable thereon and unwindable therefrom, and means connecting the curved surfaced member and the shaft comprising a part moved by the curved surfaced member, but set off from an axis, about which the curved surfaced member moves, so that said part not only derives angular movement from the member but also moves bodily toward and from a fixed point, a fixed element, and means relating said part to said fixed element, such that, upon turning the curved surfaced member, as by a pull on the flexible member wound thereon, it will turn the shaft to a certain extent and that a further turning by the shaft will turn the curved surfaced member in the opposite direction and wind the flexible member thereon.

2. A construction such as defined in claim 1 in which the flexible member comprises a plurality of separate superposed bands capable of shifting upon each other, to accommodate variations of travel due to differences in radius of their arcs of travel.

3. A construction such as defined in claim 1 in which the flexible member is a plurality of separate superposed bands capable of shifting upon each other, to accommodate variations of travel, due to differences in radius of their arcs of travel, said bands being connected in pairs, each inner band to an outer band in their successive order as inner and outer, by a rockable equalizer.

4. A construction such as defined in claim 1 in which the flexible member is a plurality of separate superposed bands capable of shifting upon each other, to accommodate variations of travel, due to differences in radius of their arcs of travel and there is an antifriction medium between the bands.

5. A construction such as defined in claim 1 in which the flexible member is a plurality of separate superposed bands in combination with means for supplying lubricant between the bands.

6. A construction such as defined in claim 1 in which the flexible member is a series of separate superposed bands of successively greater widths and the curved surfaced member is stepped recessed to receive the underlying bands so that the superposed bands are supported at their edges to lessen their pressure on the bands beneath.

7. A construction such as defined in claim 1 in which the flexible member, the curved surfaced member and the connections of the latter to the shaft are duplicated and operate alternately so that either of the duplicates may continue the motion of the shaft and so rewind the flexible member of the other.

8. A construction such as defined in claim 1 in which a supporting means with a travelling surface engages a limited portion of the curved surface in a diametrical plane parallel to that plane tangent to said curved surface in which the unwound portion of the flexible member travels.

9. A construction such as defined in claim 1 in which the curved surfaced member is a cylindrical drum, in combination with an open supporting bearing including antifriction rollers supportingly engageable with the drum in a diametric plane parallel to the tangent plane in which the flexible member travels as it unwinds.

10. A construction such as defined in claim 1 in which the curved surfaced member is a cylindrical drum, in combination with an open supporting bearing, including sectional anti-friction rollers, supportingly engageable with the drum in a diametric plane parallel to the tangent plane in which the flexible member travels as it unwinds; the successive sections of each roller being displaced peripherally of the drum a fraction of the distance spacing a section of one roller from a corresponding section of the next roller.

11. A construction such as defined in claim 1 in which the means connecting the curved surfaced member to the shaft to be driven comprises another curved surfaced member connected by a strap or straps to that first mentioned member to be alternately rotated thereby and to rotate that first mentioned member and a rotatable roller between and in the common diametric plane of both such members.

12. A construction such as recited in claim 1 in which the means connecting the curved surfaced member and the shaft comprises a part eccentric to the axes of the shaft and curved member and having therefore a circle of revolution involving not only an angular motion about said axes but also a bodily movement measurable across the circle (on a chord or diameter thereof) toward and from a fixed point outside said circle.

13. A construction such as defined in claim 1 in which the means connecting the curved surfaced member and the shaft comprises an element eccentric to the shaft so that it may have a relative bodily movement toward and from a fixed point spaced from the axis of the shaft and means so relating said element to the shaft to the curved surfaced member and to said fixed point that the element may alternately rotate the shaft, or itself be rotated on its axis and rotate the curved surfaced member in the reverse direction.

14. A construction such as defined in claim 1 in which the means connecting the curved surfaced member and the shaft comprises an element eccentric to the shaft, so that it may have a relative bodily movement toward and from a fixed point spaced from the shaft axis and means including a flexible device so relating said element to the fixed point, to the curved surface member and to the shaft that the element will alternately rotate the shaft or be itself rotated on its own axes and rotate the curved surface member in the reverse direction.

15. A construction such as defined in claim 1 in which the means connecting the curved surfaced member and the shaft comprises an element eccentric to the shaft, so that it may have a relatively bodily movement toward and from a fixed point spaced from the shaft axis and means including a toothed device so relating said element to the fixed point, to the curved surface member and to the shaft that the element will alternately rotate the shaft or be itself rotated on its own axes and rotate the curved surface member in the reverse direction.

16. In combination with the construction defined in claim 1, means for absorbing momentum and overcoming inertia to movement in the opposite direction of the curved surfaced member, comprising a double crank and wrist pin construction, a fixed surface with which one wrist pin has rolling contact, a projection travelling with the curved surfaced member making roller contact with the other wrist pin, a travelling fulcrum for the double crank construction, means for causing the crank arms yieldingly to stand normal to the line of travel of said projection and parallel to the fixed surface so that upon engagement of said projection with one wrist pin, further travel causes said wrist pin to roll on the projection and the fulcrum to travel, and the other wrist pin to roll on the fixed surface bringing the crank beyond the fixed surface to aline at right angles thereto so that the two wrist pins and crank positively check further movement of the curved surfaced member, whereby the means for causing the normal position of the crank arm initiates reverse movement.

17. The combination with the construction defined in claim 1, of two pistons the power stroke of one of which coincides with an intermediate stroke of the other as to time and direction of motion as toward and from the shaft and of means for connecting said pistons so that the power stroke of either directly causes the other stroke of the other, the flexible member being a sheet or band and being connected to and common to both pistons, so that the power stroke of either piston unwinds said sheet or band and causes a simultaneous stroke of the other piston, and the rewinding of the sheet or band causes the return stroke of both pistons.

18. The combination with the construction defined in claim 1, of two pistons the power stroke of one of which coincides with an intermediate stroke of the other as to time and direction of motion as toward and from the shaft and of means for connecting said pistons so that the power stroke of either directly causes the other stroke of the other, the flexible member being a sheet or band and being connected to and common to both pistons, so that the power stroke of either piston unwinds said sheet or band and causes a simultaneous stroke of the other piston, and the rewinding of the sheet or band causes the return stroke of both pistons, the width of the sheet or band being at least equal to the sum of the diameter of the two pistons plus the space between the pistons.

19. The combination with the construction defined in claim 1, of two pistons the power stroke of one of which coincides with an intermediate stroke of the other as to time and direction of motion as toward and from the shaft and of means for connecting said pistons so that the power stroke of either directly causes the other stroke of the other, the flexible member being a sheet or band and being connected to and common to both pistons, so that the power stroke of either piston unwinds said sheet or band and causes a simultaneous stroke of the other piston, and the rewinding of the sheet or band causes the return stroke of both pistons, the width of the sheet or band being at least equal to the sum of the diameter of the two pistons plus the space between the pistons, and means for lessening any tendency to distortion of the band due to one piston being forcibly impelled and the resistance of the other piston to travel with it.

20. The combination with a driving drum having a strap attached thereto to be wound and unwound thereon and therefrom, of a shaft whose axis is parallel or alineable with that of said drum, and means connecting said drum and shaft so that one may be rotated by the other, comprising a spindle parallel with said drum and said shaft, a reversing drum on said spindle and rotatable with reference to said shaft and a strap attached at one end to this drum and wound thereon reversely to the winding of the strap on the driving drum, and means at its other end to restrain said end from movement towards or from the shaft, said spindle and reversing drum being spaced at times at least from the axis of the shaft and means connecting said reversing drum to the driving drum so that rotation given the driving drum will rotate the shaft by the spindle, as by a crank and wrist pin, during one-half rotation of the driving drum, and winding up the strap on the reversing drum as the spindle approaches the restraining means for the strap end, while a succeeding half rotation of the shaft, carrying the spindle and reversing drum away from the restraining means will force the reversing drum to unwind; there being means to cause this unwinding motion of the reversing drum to cause the driving drum to wind up its strap thereon.

21. The combination with a driving drum having a strap attached thereto to be wound and unwound thereon and therefrom, of a shaft whose axis is parallel or alineable with that of said drum, and means connecting said drum and shaft so that one may be rotated by the other, comprising a spindle parallel with said drum and said shaft, a reversing drum on said spindle and rotatable with reference to said shaft and a strap attached at one end to this drum and wound thereon reversely to the winding of the strap on the driving drum, and means at its other end to restrain said end from movement towards or from the shaft said spindle and reversing drum being spaced at times at least from the axis of the shaft and means connecting said reversing drum to the driving drum so that rotation given the driving drum will rotate the shaft by the spindle, as by a crank and wrist pin, during one-half rotation of the driving drum, and winding up the strap on the reversing drum as the spindle approaches the restraining means for the strap end, while a succeeding half rotation of the shaft, carrying the spindle and reversing drum away from the restraining means will force the reversing drum to unwind; there being means to cause this unwinding motion of the reversing drum to cause the driving drum to wind up its strap thereon; the connection between the reversing drum and driving drum being a shifting one, radially of the driving drums, so as to permit a variation of distance between the axes of said drums, the connection of the reversing drum to the drum shaft being slidable radially of the shaft.

22. The combination with a driving drum having a strap attached thereto to be wound and unwound thereon and therefrom, of a shaft whose axis is parallel or alineable with that of said drum, and means connecting said drum and shaft so that one may be rotated by the other, comprising a spindle parallel with said drum and said shaft, a reversing drum on said spindle and rotatable with reference to said shaft and a strap attached at one end to this drum and wound thereon reversely to the winding of the strap on the driving drum, and means at its other end to restrain said end from movement towards or from the shaft, said spindle and reversing drum being spaced at times at least from the axis of the shaft, and means connecting said reversing drum to the driving drum so that rotation given the driving drum will rotate the shaft by the spindle, as by a crank and wrist pin, during one-half rotation of the driving drum, and winding up the strap on the reversing drum as the spindle approaches the restraining means for the strap end, while a succeeding half rotation of the shaft, carrying the spindel and reversing drum away from the restraining means will force the reversing drum to unwind; there being means to cause this unwinding motion of the reversing drum to cause the driving drum to wind up its strap thereon; the connection between the reversing drum and driving drum being a shifting one, radially of the driving drums, so as to permit a variation of distance between the axes of said drums, the connection of the reversing drum both to the shaft and to the driving drum being slidable radially of the reversing drum and of the driving drum respectively and at a fixed angle to each other.

23. The combination with a drum having a strap attached thereto and windable thereon, so that a pull on the strap will cause the drum to turn, of a shaft to be driven by the drum, coaxial gears carried respectively by the drum and the shaft and means engaging both said gears interchangeably revolubly therewith or rotatable with reference thereto to transmit rotation from one gear to the other in the same direction when revoluble and in opposite directions when rotatable.

24. The combination with a drum having a strap attached thereto and windable thereon, so that a pull on the strap will cause the drum to turn, of a shaft to be driven by the drum, coaxial gears carried respectively by the drum and the shaft and means engaging both said gears interchangeably revolubly therewith or rotatable with reference to transmit rotation from one gear to the other in the same direction when revoluble and in opposite directions when rotatable, means appropriately timed to check the revoluble motion and thereby cause the rotating motion.

25. The combination with a drum having a strap attached thereto and windable thereon, so that a pull on the strap will cause the drum to turn, of a shaft to be driven by the drum, coaxial gears carried respectively by the drum and the shaft and means engaging both said gears interchangeably revolubly therewith or rotatable with reference thereto to transmit rotation from one gear to the other in the same direction when revoluble and in opposite directions when rotatable, means whereby the driving rotation of the drive drum turns the checking means.

26. The combination with a drum having a strap attached thereto and windable thereon, so that a pull on the strap will cause the drum to turn, of a shaft to be driven by the drum, coaxial gears carried respectively by the drum and the shaft and means engaging both said gears interchangeably revolubly therewith or rotatable with reference thereto to transmit rotation from one gear to the other in the same direction when revoluble and in opposite directions when rotatable, means to check the revoluble motion and means turned by the reversing motion of the driving drum to release the checking means.

27. The combination with a drum having a strap attached thereto and windable thereon, so that a pull on the strap will cause the drum to turn, of a shaft to be driven by the drum, an internally toothed gear on the shaft and an externally toothed gear on the drum concentric with the internally toothed gear and one or more planetary pinions meshing with both of said gears and means for alternately causing said pinion or pinions to travel with the drum gear making both gears to rotate in the same direction, or to remain stationary so that the internally toothed gear causes the drum gear to rotate in the opposite direction.

28. A shaft rotating means, for a four stroke to the cycle, internal combustion engine, having at least two parallel pistons, of which when either one is making a power stroke, the other is making a suction stroke and when either is making a return exhaust stroke the other is making a compression stroke, which shaft rotating means comprises the combination with such two pistons of means connecting said pistons in common to a band so wound upon and secured to a drum that the power stroke of a piston turns the drum, a shaft, means so connecting said drum and shaft that such turning of the drum turns the shaft and that further turning of said shaft then turns the drum in the opposite direction and returns the pistons and further means so connecting the drums and pistons as to counterbalance the otherwise one sided action of the power stroke of the one piston.

29. A shaft rotating means for a four-stroke to the cycle internal combustion engine, comprising at least two parallel pistons of which when either one is making a power stroke, the other is making a suction stroke and when either is making an exhaust stroke, the other is making a compression stroke, comprising the combination with such two pistons of means connecting said pistons in common to a band so wound upon and secured to a drum, that the power stroke of a piston turns the drum, a shaft, means so connecting said drum and shaft that such turning of the drum turns said shaft, and that further turning of said shaft then turns the drum in the opposite direction and returns the pistons and further means so connecting the drum and pistons as to cause the piston then on the suction stroke, to move uniformly with the other.

30. A shaft rotating means for a four-stroke to the cycle internal combustion engine, comprising at least two parallel pistons of which when either one is making a power stroke, the other is making a suction stroke and when either is making an exhaust stroke, the other is making a compression stroke, comprising the combination with such two pistons of means connecting said pistons in common to a band so wound upon and secured to a drum, that the power stroke of a piston turns the drum, a shaft, means so connecting said drum and shaft that such turning of the drum turns said shaft, and that further turning of said shaft then turns the drum in the opposite direction and returns the pistons and further means so connecting the drum and pistons as to cause the piston then on the suction stroke, to move uniformly with the other, comprising straps wound on the drum reversely to the bank and connected to the common pistons.

31. A shaft rotating means for internal combustion engines, comprising a shaft a drum whose surface is parallel to said shaft, a band secured to the drum and windable thereon and attachable to a piston, a rotary element whose axis is eccentric at times at least to those of the shaft and the drum, a device establishing a fixed point spaced from the axes of drum and shaft, means between the rotatable element and the fixed point, means between the rotatable element and the shaft and means between the rotatable element and the drum, one at least of these three means having a shiftable relation such that while there is maintained at all times an unbroken driving engagement between the shaft, the drum and the rotatable element so that the drum must rotate the shaft if the drum be rotated and the shaft must rotate the drum if the shaft be rotated, and the direct engagement by which this drive is effectuated is never interrupted, yet when the drum is rotated as by the strap, the shaft is rotated and when the shaft rotates the drum the drum rotates in the opposite direction, this effect being due to a shift in the relation of the rotating element to the fixed point which is brought about by the preceding motion of the parts.

BALLARD N. MORRIS.